United States Patent
Keidar et al.

(10) Patent No.: US 12,407,494 B2
(45) Date of Patent: Sep. 2, 2025

(54) SECURE KEY DELIVERY

(71) Applicant: Nvidia Corporation, Santa Clara, CA (US)

(72) Inventors: Ron Keidar, San Diego, CA (US); Xinxing Hu, Shanghai (CN); Hye Su Lee, Santa Clara, CA (US)

(73) Assignee: Nvidia Corporation, Santa Clara, CA (US)

( * ) Notice: Subject to any disclaimer, the term of this patent is extended or adjusted under 35 U.S.C. 154(b) by 207 days.

(21) Appl. No.: 18/186,442

(22) Filed: Mar. 20, 2023

(65) Prior Publication Data

US 2024/0305447 A1 Sep. 12, 2024

(30) Foreign Application Priority Data

Feb. 23, 2023 (WO) ................ PCT/CN2023/077970

(51) Int. Cl.
*H04L 9/08* (2006.01)
*H04L 9/14* (2006.01)

(52) U.S. Cl.
CPC .......... *H04L 9/0822* (2013.01); *H04L 9/0825* (2013.01); *H04L 9/14* (2013.01)

(58) Field of Classification Search
CPC ....... H04L 9/0822; H04L 9/0825; H04L 9/14; H04L 9/0897
See application file for complete search history.

(56) References Cited

U.S. PATENT DOCUMENTS

| | | | |
|---|---|---|---|
| 11,968,295 B2* | 4/2024 | Migault | ................ H04L 9/0891 |
| 2008/0063209 A1* | 3/2008 | Jaquette | ................. G06F 21/80 |
| | | | 380/284 |
| 2021/0176632 A1* | 6/2021 | Liu | ................... H04W 12/0471 |
| 2022/0141026 A1* | 5/2022 | Smith | ................... H04L 9/0891 |
| | | | 713/181 |

OTHER PUBLICATIONS

European Search Report issued in corresponding EP Application No. 24159411.8, dated Jul. 12, 2024.
Han et al., "Scalable and Secure Virtualization of HSM With ScaleTrust", IEEE/ACM Transactions on Networking, vol. 31, No. 4, Aug. 2023, pp. 1595-1610, XP011947062, doi: 10.1109/TNET.2022.3220427.

* cited by examiner

*Primary Examiner* — Abiy Getachew
(74) *Attorney, Agent, or Firm* — Hogan Lovells US LLP

(57) ABSTRACT

Approaches in accordance with various illustrative embodiments provide for the encryption of communications going into and out of a device, such as a chip or proprietary bus. The encryption can occur in a central Root-of-Trust (RoT), which can include agents for individual communication protocols to generate session keys used to encrypt communications for individual sessions, and the data can be sent to a crypto engine for the respective communication protocol. A key tunnel unit can be used to receive a wrapped session key over the public bus and then unwrap the key in hardware, then able to then transmit the unwrapped session key to the corresponding crypto engine without exposing the session key to software executing on the device outside the RoT. The receiving inline crypto engine can then use that session key to encrypt session data to be transmitted to a separate device or destination.

20 Claims, 24 Drawing Sheets

SECURE KEY DELIVERY

CROSS-REFERENCE TO RELATED APPLICATIONS

This application claims priority to PCT Application Serial No. PCT/CN2023/077970, filed Feb. 23, 2023, and entitled "Secure Key Delivery Over a Non-Secure Connection," which is hereby incorporated herein in its entirety and for all purposes.

BACKGROUND

As data security becomes increasingly important, there is movement toward encrypting most, if not all, of the communications going into, or out of, a computing device or system-on-chip (SoC). For various communications interfaces, a central Root-of-Trust (RoT) needs to send encryption keys to the crypto engines of those interfaces. The delivery of those keys raises various potential issues, as the crypto engines are typically located at the edge of the die (next to the pads or soldering points out of the silicon) and the distance from RoT is significant, making dedicated wires or a dedicated bus for key delivery too expensive in many instances. Sending the keys over a public bus can avoid the expense of a dedicated wire or bus, but increases the risk of attacks on a bus optimized for performance and not security. Further, a micro-controller unit (MCU) managing the crypto engines is typically limited in its ability to perform a standard security protocol (e.g., TLS) with the RoT. The MCUs are also typically not trusted, so even if an MCU can handle secure delivery it should have no access to the value of those keys.

BRIEF DESCRIPTION OF THE DRAWINGS

Various embodiments in accordance with the present disclosure will be described with reference to the drawings, in which.

DETAILED DESCRIPTION

Figure 1:
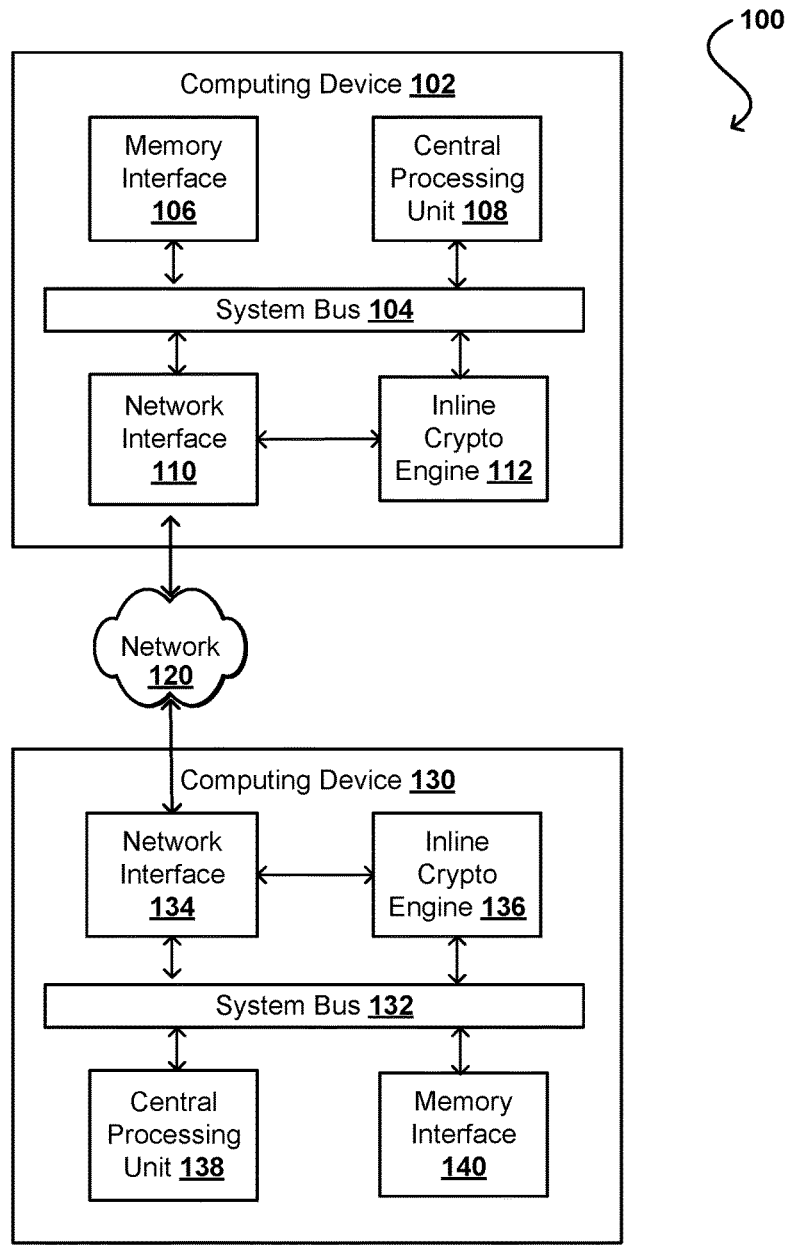
FIG. 1 illustrates an example system allowing for secure network communication between devices that can be used to implement aspects of various embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches in accordance with various illustrative embodiments provide for the encryption of communications going into and out of a device, such as a chip or a proprietary bus. The encryption can occur in a central Root-of-Trust (RoT), such as may correspond to at least one secure processor, which can include or host one or more agents for individual communication protocols to generate session keys used to encrypt communications for individual sessions, and the data can be sent to a crypto engine for the respective communication protocol on the device. Because there can be a significant distance between the RoT and the crypto engine, it can be beneficial to use an existing public bus to send the data rather than using a dedicated bus or wire for key delivery. In order to minimize the likelihood of exposure of the key when sent over a public bus, each session key can be wrapped (e.g., encrypted) within the RoT using a wrapping key. A hardware block (as may correspond to or provide a "key tunnel unit" (KTU)) can be used to receive a wrapped session key over the public bus and then unwrap the key in hardware, being able to then transmit the unwrapped session key to the corresponding crypto-engine without exposing the session key to software executing on the device outside the RoT. The receiving inline crypto engine (or other inline encryption hardware) can then use that session key to encrypt session data to be transmitted to a separate device or destination.

In order to establish a shared secret, an initial wrapping key can be sent over a public bus to the KTU, followed by a first wrapping key that is wrapped by the initial wrapping key (which may have been exposed due to transmission over the public bus). A second wrapping key can be sent that is wrapped using the first wrapping key, and the second wrapping key (once unwrapped) can become the current wrapping key to be used to wrap session keys. This process can continue for a series of wrapping keys sent before any session keys are sent, in order to reduce a likelihood that someone intercepting the initial wrapping key sent over the public bus will be able to intercept and unwrap any or all of the sequence of wrapping keys. Once one or more wrapping keys has been sent, a current (or most recently sent or received) wrapping key can be used to wrap or encrypt one or more session keys sent subsequent to the current wrapping key, and those encrypted session keys can then be transmitted over a public system bus. An IP block, or key tunnel unit, can then unwrap the session key(s) in hardware for use in encrypting data to be transmitted to another device. The wrapping keys can be rotated over time as well, such as to send a new wrapping key after a period of time or number of session keys.

Variations of this and other such functionality can be used as well within the scope of the various embodiments as would be apparent to one of ordinary skill in the art in light of the teachings and suggestions contained herein.

FIG. 1 illustrates a system 100 allowing for secure network communication between devices that can be used to implement aspects of various embodiments. In this example, a first computing device 102 is to securely exchange or communicate data with a second computing device 130 over at least one network. The computing devices can be similar or different devices, and may include any appropriate devices capable of performing operations such as encrypting, decrypting, transmitting, receiving, and/or processing data. Such devices may include, for example, servers, desktop computers, or compute instances, among other such options. These devices can include processors (such as one or more central processing units (CPUs) 108, 138 or graphics processing units (GPUs) and memory that can connect to a central system bus 104, 132 using a memory interface 106, 140, and can communicate with the network 120 using respective network interfaces 110, 134. The network(s) 120 may include any appropriate wired and/or wireless network, as may include the Internet, a cellular network, an ethernet, a local area network (LAN), or a peer-to-peer network, among other such options.

These devices 102, 130 can establish a secure communication path between them even if the path is across a public or otherwise unsecure network 120. In at least one embodiment, this can include performing a control, secret. or key exchange. This exchange may occur in accordance with a key management protocol supported by each device, which may be specified by the device 102 attempting to establish the secure communication path. The key management protocol can be managed by one or more trusted components that operate in a trusted zone or portion of the device typically referred to as a root of trust (RoT), which can correspond to a secure processor or set of secure components on each device. This can include, for example, inline secure hardware such as an inline crypto engine 112, 136 on each device. These trusted components can exchange protocol information during a key establishment phase. After authentication of both devices, these devices can exchange data and configuration information, and can agree on a session key that is unique for a specific communication session. One of the devices can go to the data plane, which can encrypt and decrypt data, provide the session key to be used for the current session. In some embodiments, the data plane encryption component(s) will not be a separate component or have high throughput, although for low level encryption the data plane might be separate or capable of high throughput that might require its own space and hardware implementation. In at least one embodiment, an inline crypto engine managing the data plane will need to be very close to the location of the RoT, as may be embedded near the pins. The inline crypto engines 112, 136 on the devices 102, 130 can perform operations such as a protocol exchange or key exchange to establish keys within this root of trust.

As mentioned, the distance to the inline crypto engine from an RoT can be important for at least some devices. If keys are to be delivered to something nearby, or over a short distance, then one or more additional wires could be used to transmit the data. For large, modern chips, however, the distance over which the keys may need to be transmitted can be significant, and might even involve separate dies in a single package. It is still beneficial to be able to protect the keys as they are transmitted from this root of trust to the inline encryption engine (such as an ICE-based key tunnel unit (KTU)), regardless of the distance the keys are to travel.

Figure 2:
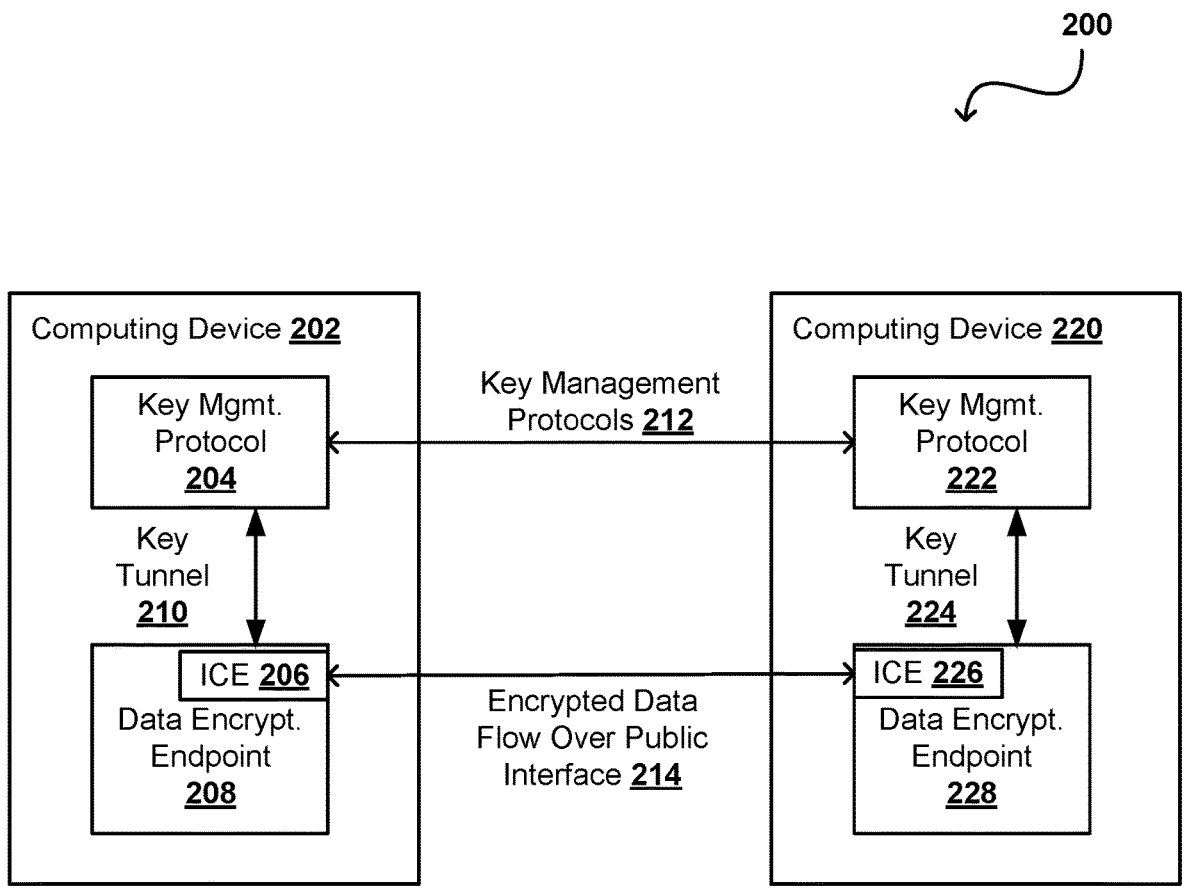
FIG. 2 illustrates an example communication of session keys between devices, which can be used in accordance with various embodiments.

One approach that can be used to secure data transmitted over a communication channel is to use a shared secret. FIG. 2 illustrates an example implementation 200 that can be used to securely manage such shared secrets in accordance with at least one embodiment. A public interface 214 between the two devices can support data plane encryption, where data to be transmitted is encrypted on a first device 202 then transmitted over the public interface 214 to a second device 220, which has the shared secret and can then decrypt the data. In at least one embodiment, standard data plane protocols can be used to protect the data. The same, or separate, communication channel 212 can be used to exchange information relating to the key management protocols, such as to specify on or agree to the (e.g., standard) key management protocols to be used to protect the session keys to be used for one or more sessions.

In this example, a key management protocol component 204 on the initiating computing device 202 is to provide for key delivery within the computing device 202, such as within a system on chip (SoC). This communication can involve communicating a session key to an inline crypto engine 206 that may be a significant distance from the key management protocol component 204 on the device 202. In this example, a (virtual) key tunnel 210 can be used to protect the key delivery inside the SoC, where those keys are to be used to encrypt or decrypt data within the device 202. The key tunnels 210, 224 can support a proprietary or non-public implementation. A key tunnel 210 can be responsible for moving session keys from the root of trust, such as a trusted agent that supports the key management protocol 204, to a remote engine, such as an inline crypto engine 206.

As mentioned the distance between the RoT and the ICE may be significant, so it may be undesirable to add or use one or more dedicated wires for the key tunnel. Using a publicly accessible bus does not provide adequate trust when delivering keys, particularly keys in plaintext. Further, the ICE 206 may use a local controller or microcontroller that is not trusted and, as such, should not have access to the session keys or other shared secrets. An approach in accordance with at least one embodiment can prevent the microcontroller from having access to the keys in unencrypted form, and can instead ensure that the microcontroller only receives encrypted keys over the key tunnel and can push those encrypted keys into the ICE 206, or other encryption hardware, without having access to the unencrypted session keys. The root of trust will typically have the ability to encrypt keys, and the ICE can receive the encrypted keys through the key tunnel unit 364 (in hardware), and can unwrap and decrypt the keys in such a way that the key in plaintext is only visible to the ICE engine in the hardware, without the keys being exposed to the software. In at least one embodiment, the plaintext key will be sent very early during an early execution process (e.g., boot or production), such that its exposure will be limited because there should not be any non-boot-related applications or processes running on the device at that point. In an embodiment using an RTL key, for example, there may be a pre-shared secret stored such that there is no need to send an initial plaintext key.

In at least one embodiment, the hardware can inspect (e.g., passively check the correctness of a software input) the behavior of the software, and if the software attempts to perform an unauthorized operation such as to skip a key, insert a key twice, or change a key, for example, the hardware will detect the attacks and ensure that it will not accept those modified keys through modification attacks. The root of trust can therefore determine that it can trust the key tunnel hardware because the local microcontroller is not permitted to access or modify the keys or other secret information, and that the RoT will also be able to determine any time keys are modified, one or more counters 358 are incremented, or other such actions occur. The counters can be used in at least one embodiment to ensure that key identifiers are monotonically increasingly, where any gaps or reuse of key identifiers can be indicative of a wrapped key being reused or skipped. A key tunnel 224 can perform similar operations on the second device 220, providing a secure path between an agent (supporting the key management protocol 222) of the root of trust and an ICE 226 on the device. As mentioned, the keys can be used to encrypt data to be transmitted over the public interface 214 using data encryption endpoints 208, 228 on the devices that are parties to the communication.

In at least one embodiment, the root of trust includes an IP block that can unwrap keys in hardware and send them to the hardware of the crypto engine without exposing the keys to the software executing on the device. Session keys can be wrapped by the root of trust using wrapping keys, and this wrapping can be performed in a trusted environment. Because the session keys will be wrapped, there is no need for a dedicated bus between the root of trust and the encryption hardware. By wrapping the keys at the RoT and enabling the keys to be unwrapped at the key tunnel 210, the wrapped keys can be delivered on public busses without risk of exposure. The respective microcontroller unit (MCU) does not need to perform any complex operations, as these operations can be offloaded to the key tunnel. The key tunnel can isolate the keys and is not dependent on the security of the MCU, such that the encryption approach can be supported even for an untrusted MCU. A key tunnel can offer other benefits as well, as there may be different ways to initialize shared secrets, and a key tunnel can provide built-in protection and detection against a variety of attacks. A key tunnel can also provide a mechanism to deliver secret keys or entropy to the MCU, as in some cases the MCU may need one or more secrets or entropy (e.g., random values) in addition to those sent to the crypto engine. A key tunnel can also provide a way to deliver authenticated commands to different hardware blocks, as well as a way to rotate wrapping keys and handover ownership, such as for RoT management. A key tunnel can also occupy only a small hardware area, which can be important for many devices where real estate is at a premium.

Figure 3A:
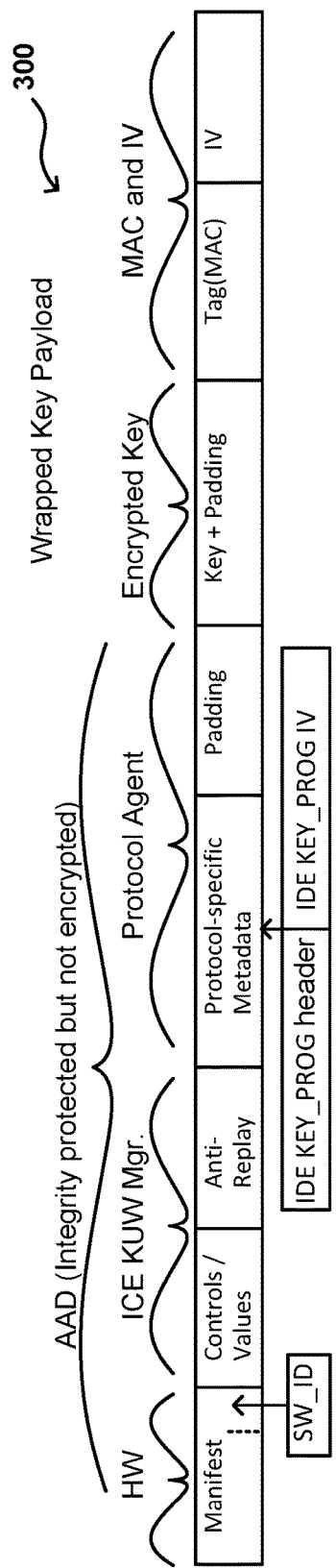
FIGS. 3A and 3B illustrate an ethe format of a wrapped key and a key tunnel unit for processing such a wrapped key, in accordance with various embodiments.

FIG. 3A illustrates an example of a wrapped key payload 300 that can be generated in accordance with at least one embodiment. In this example, it can be seen that a portion of the payload is not encrypted but is integrity protected, as may include the manifest, controls, and metadata. An encrypted portion of the payload may include the wrapped key and any necessary padding, as well as any MAC or initialization vector (IV) data to be transmitted.

Figure 3B:
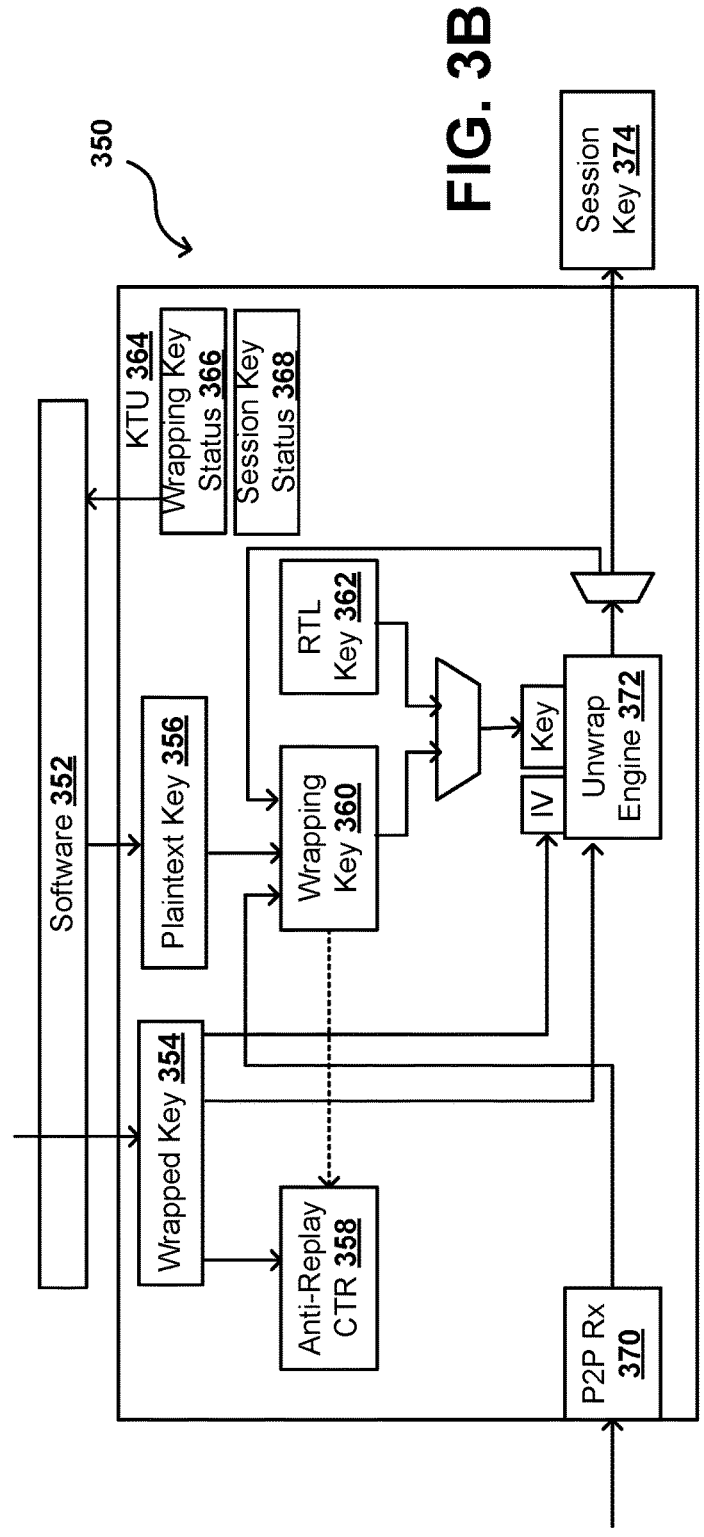

FIG. 3B illustrates an example key tunnel unit implementation 350 that can be utilized in accordance with various embodiments. A key tunnel unit (KTU) 364, which may include or provide an inline crypto engine, can support various secure operations, as may include inserting a plaintext wrapping key via serial interface or a register, as well as inserting a wrapped wrapping key with an RTL key or key from fuses. Such a block can also support the rotation of a wrapping key, as well as the insertion of a wrapped session key. The key tunnel unit can correspond to a piece of hardware at a data encryption endpoint, proximate the ICE, which in a least one embodiment can receive wrapped keys, unwrap or decrypt those keys, and then push those keys (such as unwrapped session keys 374) to the ICE or other encryption hardware. This unwrapping and providing of the session key in hardware can occur without exposing the unwrapped session key to software 352 on the respective computing device.

In at least one embodiment, a primary function of such a key tunnel unit (KTU) is to deliver session keys for use on corresponding sessions. There may be many such session keys, provided by large agents that manage keys for many different sessions. There might be a separate session for each destination, and for each destination there may be multiple virtual destinations or applications. A key unwrap engine 364 of the KTU can be responsible for unwrapping many wrapped keys 354 and providing them to the appropriate crypto engine associated with the appropriate session. As illustrated, the key tunnel unit 364 can receive many types of keys, as may include plaintext keys 356 from the software 352, as well as other keys such as RTL keys 362 and the like. The block 364 can maintain a status 366, 368 of the current wrapping key(s) and session key(s), and can use the appropriate current wrapping key 360 to unwrap a wrapped key 354 using an appropriate unwrap block 372 or operation to extract the session key. By receiving only wrapped session keys 354, the ability for an unintended party to obtain the session key from the transmission will be minimized. In at least one embodiment, a given KTU will only store the current wrapping key, unless there are multiple current wrapping keys to be stored to use to wrap different sets of session keys. When a wrapped key is received, that key passes through the unwrap engine 372, which is the engine that performs the unwrapping and verification of the tag or signature. After a key is unwrapped and verified, the determination is made as to whether that key is a session key 374 or a new wrapping key 360. If it is a session key 374, that key is transmitted to/through the ICE to the hardware that is integrated with the key tunnel. If the key is a new wrapping key 360, the key will go back and replace the current wrapping key.

Figure 4:
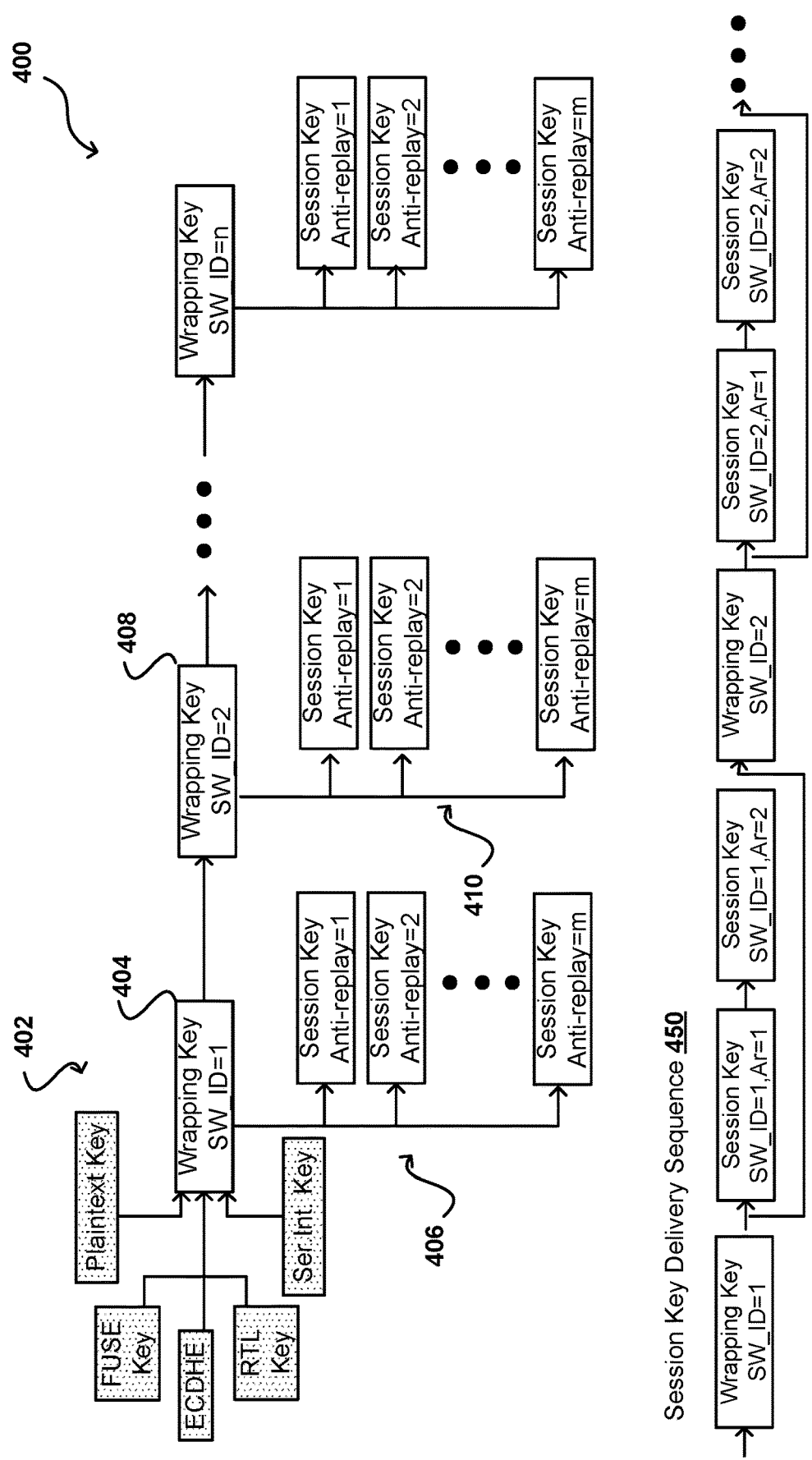
FIG. 4 illustrates an example flow of wrapping and session keys that can be produced in accordance with various embodiments.

In order to further minimize the likelihood of a session key being intercepted or otherwise obtained by an unintended party or recipient, there can be a number of additional steps taken to provide additional security. This may include rotation of the wrapping keys and session keys, for example, but can also include the transmission and usage of a sequence of keys for the purpose of making it difficult for an unintended party to receive and decrypt all relevant keys. FIG. 4 illustrates example flows 400, 450 of keys that can be provided in accordance with various embodiments. In this example, there can be an initial key 402 (the fundamental shared secret agreed upon per the protocol) sent that is unwrapped. This can be a plaintext key, for example, or other keys such as a FUSE key, Elliptic-curve Diffie-Hellman (ECDHE) key, register transfer level (RTL) key, or serial interface key, among other such options. This key can be sent over a public bus or interface to the ICE that can be stored as a current key associated with a session.

In this example, a first wrapping key can be sent (with an identifier such as SW_ID=1) that can be used to wrap one or more session keys 406 for one or more sessions. In order to reduce the likelihood of an unintended party obtaining the wrapping key 404, the wrapping key can be wrapped with the initial key 402, such as a received plaintext key. This wrapping would require an unintended party to intercept both the plaintext key and the wrapping key to be able to unwrap the wrapping key, then use that wrapping key to unwrap the session key. Further protection can be provided by, although now illustrated in FIG. 4, sending a series of wrapping keys that are each wrapped by the prior wrapping key. In this way, unless an unintended party is able to intercept or obtain all of these keys, the unintended party will not be able to unwrap the session key(s) that are wrapped with the final wrapping key in that sequence.

In the example illustrated in FIG. 4, once a wrapping key 404 is sent that is to be used to wrap session keys, and that wrapping key is unwrapped using any other prior wrapping key, that wrapping key 404 can be used to wrap one or more session keys 406. These may be session keys for sessions associated with the same or different recipients in various embodiments. The KTU (or other hardware) can unwrap these session keys using the current wrapping key, and can provide the unwrapped session keys to the ICE.

In at least one embodiment, it will be desirable to rotate or otherwise change the wrapping key used over time, such that if an unintended party obtains a wrapping key they will likely only be able to unwrap a limited number of session keys without also obtaining the subsequent new wrapping key, which will also be wrapped. The rotation or change can come at any appropriate time, such as after a specified length of time or a number of wrapped session keys, or upon manual instruction, among other such options. In this case, a new wrapping key 408 can be sent through the key tunnel that is wrapped using the prior wrapping key 404. Once unwrapped, the new wrapping key 408 can be used to wrap one or more subsequent session keys 410. In at least one embodiment, a sequence of wrapped wrapping keys may be sent for each rotation as well. The process can continue as illustrated, with new wrapping keys sent as part of a key rotation process to encrypt one or more session keys. As mentioned, there may be many different wrapping keys used at any given time, such that the wrapping key used for session keys of one user or party cannot be used to unwrap session keys for another user or party. As illustrated in the example key delivery sequence 450, a sequence of wrapping keys can be received by the KTU, where each wrapping key can wrap session keys until a new wrapping key is received that is to be used to wrap one or more subsequent session keys. Each individual session key can be unique in this example, and session keys may either be required to each be unique and may be rotated after an amount of time or other such factor. In at least one embodiment, each key can have a flag (or other indicator) set to indicate whether that key is to be used as a session key or a wrapping key. A session key can also have associated metadata that indicates, for example, the appropriate session to which that key belongs, whether it replaces a prior session key for that session, or other such information. In at least some embodiments, this metadata will not be encrypted but can still be authenticated so that, for example, intermediate controllers can view but not change the metadata. In at least one embodiment, the software can control how often new wrapping keys are generated and used, using an exposed hardware option.

Figure 5:
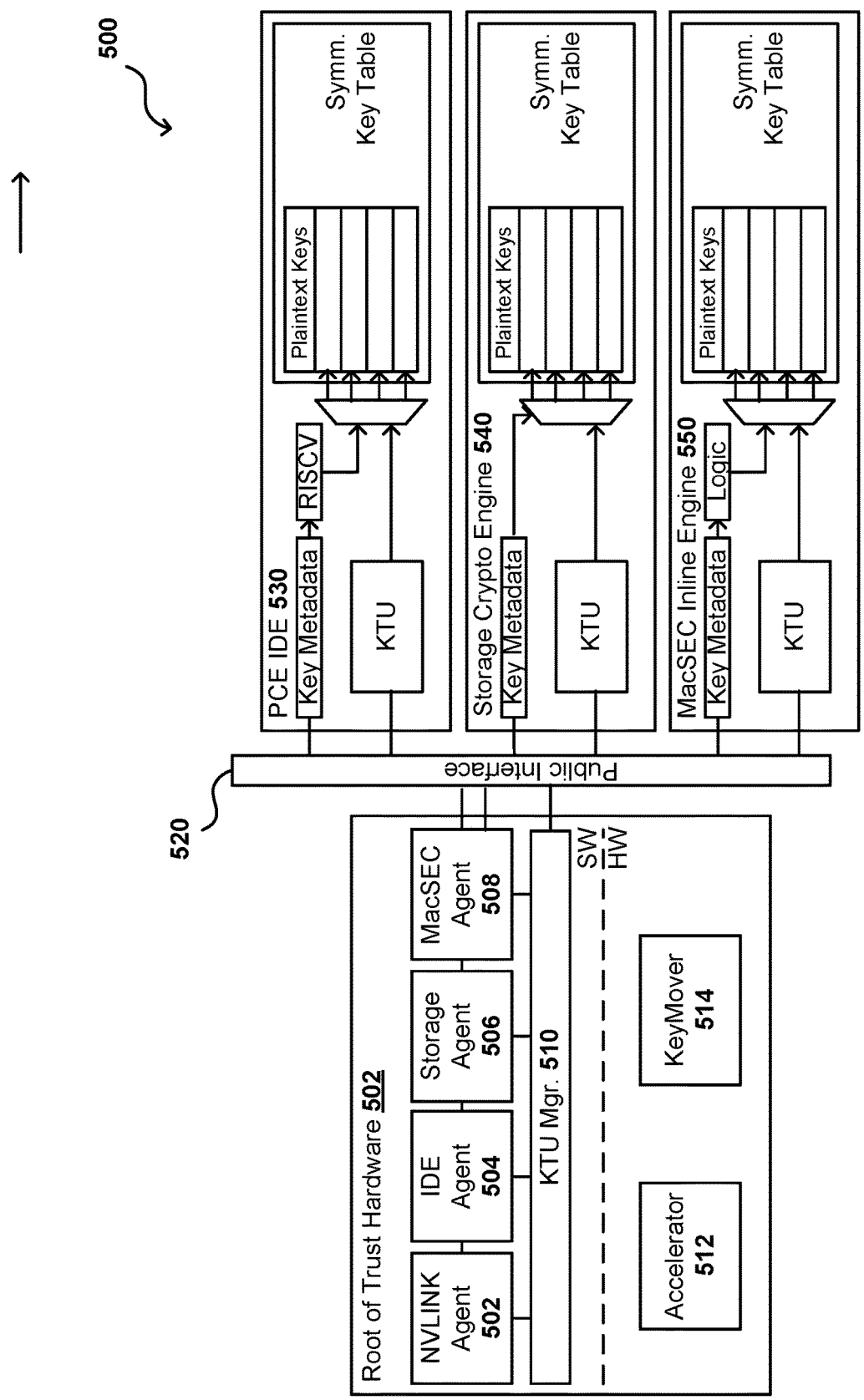
FIG. 5 illustrates components of an example system for transmitting wrapped session keys over a public interface, in accordance with at least one embodiment.

FIG. 5 illustrates an example system 500 that can be used to store session keys in at least one embodiment. As illustrated, the root of trust hardware 502 (e.g., a secure processor on chip) may operate or host several agents 502, 504, 506, 508 as discussed previously, which may be tasked with managing keys for various sessions, in cooperation with an KTU manager 510 on the software side, as well as other components (e.g., a crypto accelerator 512 and Key Mover component 514) on the hardware side. The keys (wrapped or otherwise), key metadata, and other relevant data can be transmitted over at least one public interface 520 or bus (or at least partially unsecure interface or bus) to be received to the respective recipients, which in this case can include a PCI Express-Integrity and Data Encryption (PCIe-IDE) component 530, a storage crypto engine 540, and a MacSEC inline engine 550, among other such options (e.g., other crypto hardware). In this example the session keys (stored in plaintext form in the key tables) are stored in respective symmetric key tables, using the keys unwrapped by the components (e.g., 364 in FIG. 3B) and the associated authenticated key metadata. In this example, each KTU block or component would store the current respective wrapping key(s) to use to unwrap corresponding session keys. In this example, the agents create manage the session keys while the KTU manager 510 manages the wrapping keys within the root of trust 502. The KTU manager can also be responsible for rotating the wrapping keys and performing the wrapping in at least one embodiment, although in other embodiments the wrapping keys may be provided to the individual agents for the agents to wrap the session keys. Agents for other or alternative protocols can be used as well within the scope of various embodiments. For an example protocol option 530, a small microcontroller (RISCV) may perform some of the management, such as to read the metadata and use it for routing the key to the correct location in the key table. In the second case, the index is read directly by the hardware as a pure index, which can be used to control the routing of the key. For the MacSEC engine 550, there is some hardware logic that analyzes the metadata and not the pure index, such as to determine a session ID or key type flag. The logic can convert or translate this metadata using a local indexing mechanism. Other approaches to processing wrapped keys received over a public interface (e.g., an on-chip system bus) can be used as well within the scope of various embodiments.

In at least one embodiment there may be a handover mechanism and multiple roots of trust. A first root of trust might start the initialization to generate the first wrapping key or perform the first key rotation. The actual session keys might, however, be handled by a different root of trust. The handover mechanism can be a secure hardware mechanism to handover ownership of the key tunnels between roots of trust by, for example, handing over the current wrapping key. The root of trust receiving the handover can the function as the new or current root of trust that can send session keys. Upon taking ownership, that root of trust might first rotate the wrapping key to a new wrapping key, such that the prior root of trust does not know the shared secret and cannot do anything until it again obtains ownership. Such functionality can be important, as there may be different roots of trust for the system at different times, such as during boot versus at runtime. Further, such an approach can be important for operations involving confidential compute, for example, where only the current root of trust is to be able to access certain information. The current wrapping key can thus be passed between secure processors, which can take over as the current root of trust. Such an approach can be used to encrypt any or all communications going in and out of a chip, including DRAM, PCIe, Video, ethernet, and proprietary busses like NVLINK and Chip2Chip, among other such options.

Figure 6:
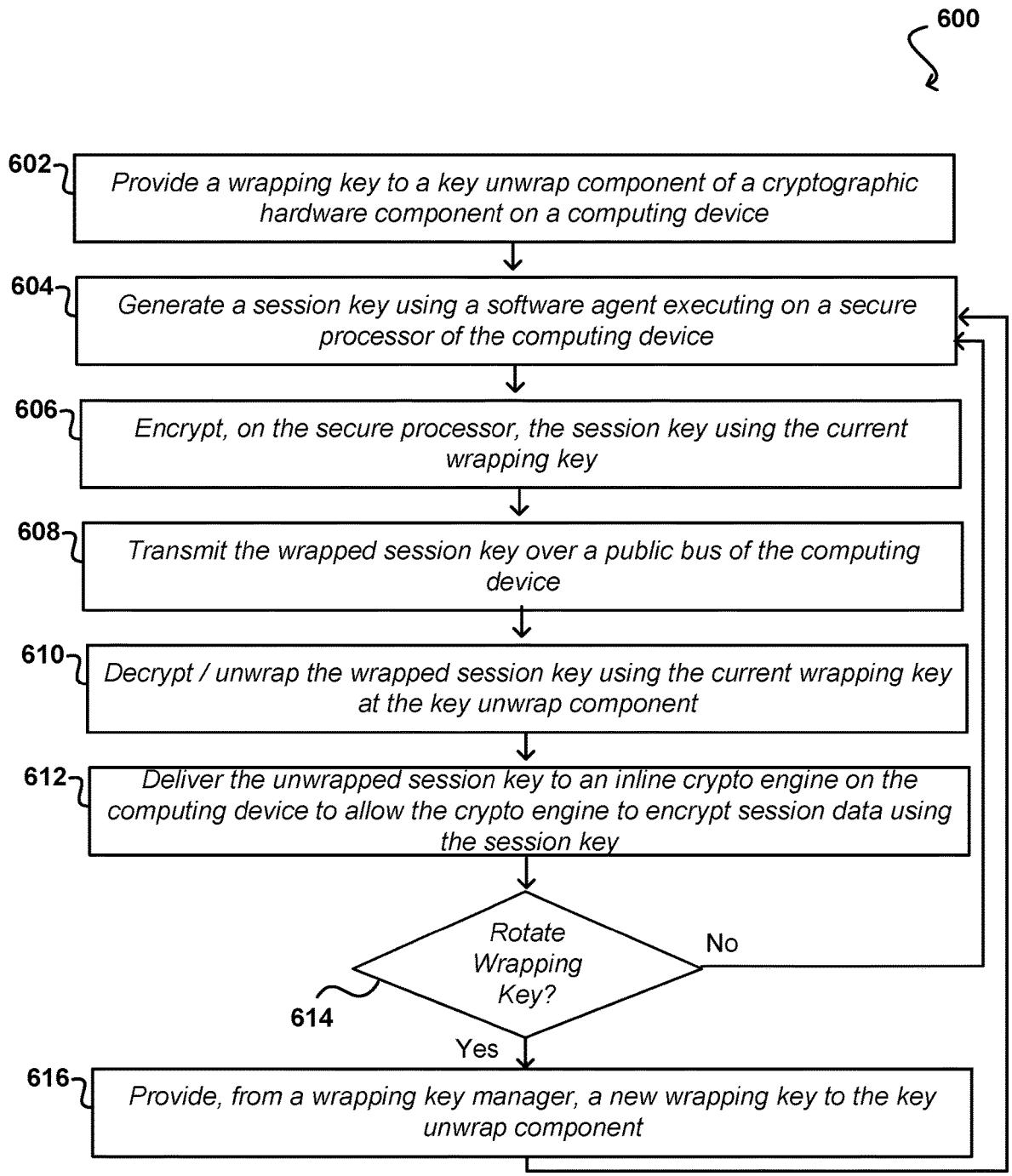
FIG. 6 illustrates an example process for transmitting wrapped session keys over an interface that can be performed in accordance with at least one embodiment.

FIG. 6 illustrates an example process 600 for securely transmitting session keys over a public interface that can be performed in accordance with various embodiments. It should be understood that for this and other processes presented herein that there may be additional, fewer, or alternative steps performed or similar or alternative orders, or at least partially in parallel, within the scope of the various embodiments unless otherwise specifically stated. Further, although this example is described with respect to session keys, various other types of data may be secured advantageously for similar or other purposes as well within the scope of the various embodiments. In this example, a wrapping key is provided 602 to a key tunnel unit (KTU) component of cryptographic hardware on a computing device. As discussed previously herein, this may include one of a sequence of wrapping keys that were also each encrypted with a prior wrapping key or other shared secret, among other such options. A session key can then be generated 604 using a software agent executing on a secure processor (or otherwise within a root of trust) on the computing device. There may be several agents each managing session keys for different sessions in at least one embodiment. The session key can then be encrypted 606, or "wrapped," on the secure processor using the current wrapping key. The wrapped session key can then be transmitted 608 over a public bus (or other at least partially unsecure interface) of the computing device.

In this example, the wrapped session key can be received to the key tunnel unit of the crypto hardware. The wrapped session key can be decrypted 610 or "unwrapped" using the current wrapping key stored by the key tunnel unit. The unwrapped session key can then be delivered 612 to an inline crypto engine, for example, on the computing device to allow the crypto engine to encrypt corresponding session data using the unwrapped (e.g., plaintext) session key. A determination can be made 614 as to whether the wrapping key should be rotated or otherwise changed to a new wrapping key. If not, the process can continue with the next session key being wrapped using the current wrapping key. If the wrapping key is to be rotated, then a new wrapping key can be provided 616 from a wrapping key manager to the key tunnel unit to be used as the current wrapping key. The key tunnel unit can analyze a flag or value for the key to determine that the key is to be treated as a new wrapping key and not another session key. The process can then continue using the "new" current wrapping key. In other embodiments, a new wrapping key may not be generated until after a new session key is generated or received, and that new session key is to be transmitted using a new wrapping key, where by the new wrapping key will be transmitted first, then used to wrap the new session key to be transmitted. Various other orderings or approaches can be used as well within the scope of the various embodiments.

In at least one embodiment, data to be transferred using these data connections between peer devices can be received from, or transmitted to, any number of a variety of computing systems, devices, and services, and this functionality can be implemented in various types of systems or networked environments. For example, transmitting client devices can include any appropriate computing devices, as may include a desktop computer, notebook computer, set-top box, streaming device, gaming console, smartphone, tablet computer, VR headset, AR goggles, wearable computer, or a smart television. Each client device can submit a request across at least one wired or wireless network, as may include the Internet, an Ethernet, a local area network (LAN), or a cellular network, among other such options, which may include a variety of interconnected network devices. In one example, these requests can be submitted to an address associated with a cloud provider, who may operate or control one or more electronic resources in a cloud provider environment, such as may include a data center or server farm. In at least one embodiment, the request may be received or processed by at least one edge server, that sits on a network edge and is outside at least one security layer associated with the cloud provider environment.

In at least one embodiment, such a system can be used for performing graphical rendering operations. In other embodiments, such a system can be used for other purposes, such as for providing image or video content to test or validate autonomous machine applications, or for performing deep learning operations. In at least one embodiment, such a system can be implemented using an edge device, or may incorporate one or more Virtual Machines (VMs). In at least one embodiment, such a system can be implemented at least partially in a data center or at least partially using cloud computing resources. Such a system can also be used to generate or present virtual reality (VR), augmented reality (AR), or enhanced reality (ER) content. In other embodiments, such a system can be used to perform hardware testing using simulation, to generate synthetic data, or as part of a collaborative content creation platform for 3D assets, among other such options.

Data Center

Figure 7:
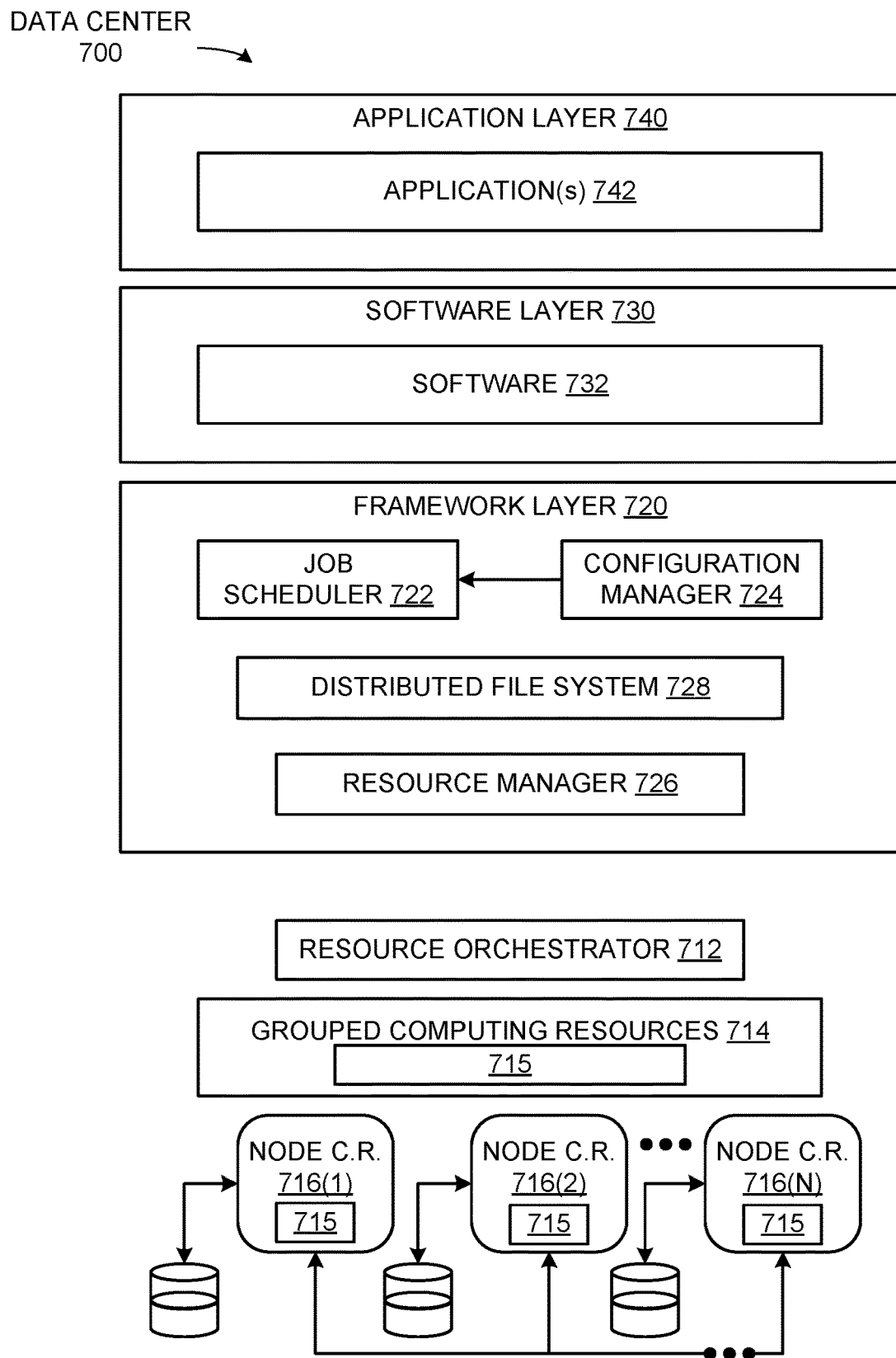
FIG. 7 illustrates an example data center system, according to at least one embodiment.

FIG. 7 illustrates an example data center 700, in which at least one embodiment may be used. In at least one embodiment, data center 700 includes a data center infrastructure layer 710, a framework layer 720, a software layer 730 and an application layer 740.

In at least one embodiment, as shown in FIG. 7, data center infrastructure layer 710 may include a resource orchestrator 712, grouped computing resources 714, and node computing resources ("node C.R.s") 716(1)-716(N), where "N" represents a positive integer (which may be a different integer "N" than used in other figures). In at least one embodiment, node C.R.s 716(1)-716(N) may include, but are not limited to, any number of central processing units ("CPUs") or other processors (including accelerators, field programmable gate arrays (FPGAs), graphics processors, etc.), memory storage devices 718(1)-718(N) (e.g., dynamic read-only memory, solid state storage or disk drives), network input/output ("NW I/O") devices, network switches, virtual machines ("VMs"), power modules, and cooling modules, etc. In at least one embodiment, one or more node C.R.s from among node C.R.s 716(1)-716(N) may be a server having one or more of above-mentioned computing resources.

In at least one embodiment, grouped computing resources 714 may include separate groupings of node C.R.s housed within one or more racks (not shown), or many racks housed in data centers at various geographical locations (also not shown). In at least one embodiment, separate groupings of node C.R.s within grouped computing resources 714 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 712 may configure or otherwise control one or more node C.R.s 716(1)-716(N) and/or grouped computing resources 714. In at least one embodiment, resource orchestrator 712 may include a software design infrastructure ("SDI") management entity for data center 700. In at least one embodiment, resource orchestrator 712 may include hardware, software or some combination thereof.

In at least one embodiment, as shown in FIG. 7, framework layer 720 includes a job scheduler 722, a configuration manager 724, a resource manager 726 and a distributed file system 728. In at least one embodiment, framework layer 720 may include a framework to support software 732 of software layer 730 and/or one or more application(s) 742 of application layer 740. In at least one embodiment, software 732 or application(s) 742 may respectively include web-based service software or applications, such as those provided by Amazon Web Services, Google Cloud and Microsoft Azure. In at least one embodiment, framework layer 720 may be, but is not limited to, a type of free and open-source software web application framework such as Apache Spark™ (hereinafter "Spark") that may utilize distributed file system 728 for large-scale data processing (e.g., "big data"). In at least one embodiment, job scheduler 722 may include a Spark driver to facilitate scheduling of workloads supported by various layers of data center 700. In at least one embodiment, configuration manager 724 may be capable of configuring different layers such as software layer 730 and framework layer 720 including Spark and distributed file system 728 for supporting large-scale data processing. In at least one embodiment, resource manager 726 may be capable of managing clustered or grouped computing resources mapped to or allocated for support of distributed file system 728 and job scheduler 722. In at least one embodiment, clustered or grouped computing resources may include grouped computing resources 714 at data center infrastructure layer 710. In at least one embodiment, resource manager 726 may coordinate with resource orchestrator 712 to manage these mapped or allocated computing resources.

In at least one embodiment, software 732 included in software layer 730 may include software used by at least portions of node C.R.s 716(1)-716(N), grouped computing resources 714, and/or distributed file system 728 of framework layer 720. In at least one embodiment, one or more types of software may include, but are not limited to, Internet web page search software, e-mail virus scan software, database software, and streaming video content software.

In at least one embodiment, application(s) 742 included in application layer 740 may include one or more types of applications used by at least portions of node C.R.s 716(1)-716(N), grouped computing resources 714, and/or distributed file system 728 of framework layer 720. In at least one embodiment, one or more types of applications may include, but are not limited to, any number of a genomics application, a cognitive compute, application and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 724, resource manager 726, and resource orchestrator 712 may implement any number and type of self-modifying actions based on any amount and type of data acquired in any technically feasible fashion. In at least one embodiment, self-modifying actions may relieve a data center operator of data center 700 from making possibly bad configuration decisions and possibly avoiding underutilized and/or poor performing portions of a data center.

In at least one embodiment, data center 700 may include tools, services, software or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 700. In at least one embodiment, trained machine learning models corresponding to one or more neural networks may be used to infer or predict information using resources described above with respect to data center 700 by using weight parameters calculated through one or more training techniques described herein.

In at least one embodiment, data center may use CPUs, application-specific integrated circuits (ASICs), GPUs, FPGAs, or other hardware to perform training and/or inferencing using above-described resources. Moreover, one or more software and/or hardware resources described above may be configured as a service to allow users to train or performing inferencing of information, such as image recognition, speech recognition, or other artificial intelligence services.

Inference and/or training logic 715 are used to perform inferencing and/or training operations associated with one or more embodiments. In at least one embodiment, inference and/or training logic 715 may be used in data center 700 for inferencing or predicting operations based, at least in part, on weight parameters calculated using neural network training operations, neural network functions and/or architectures, or neural network use cases described herein.

Figure 8:
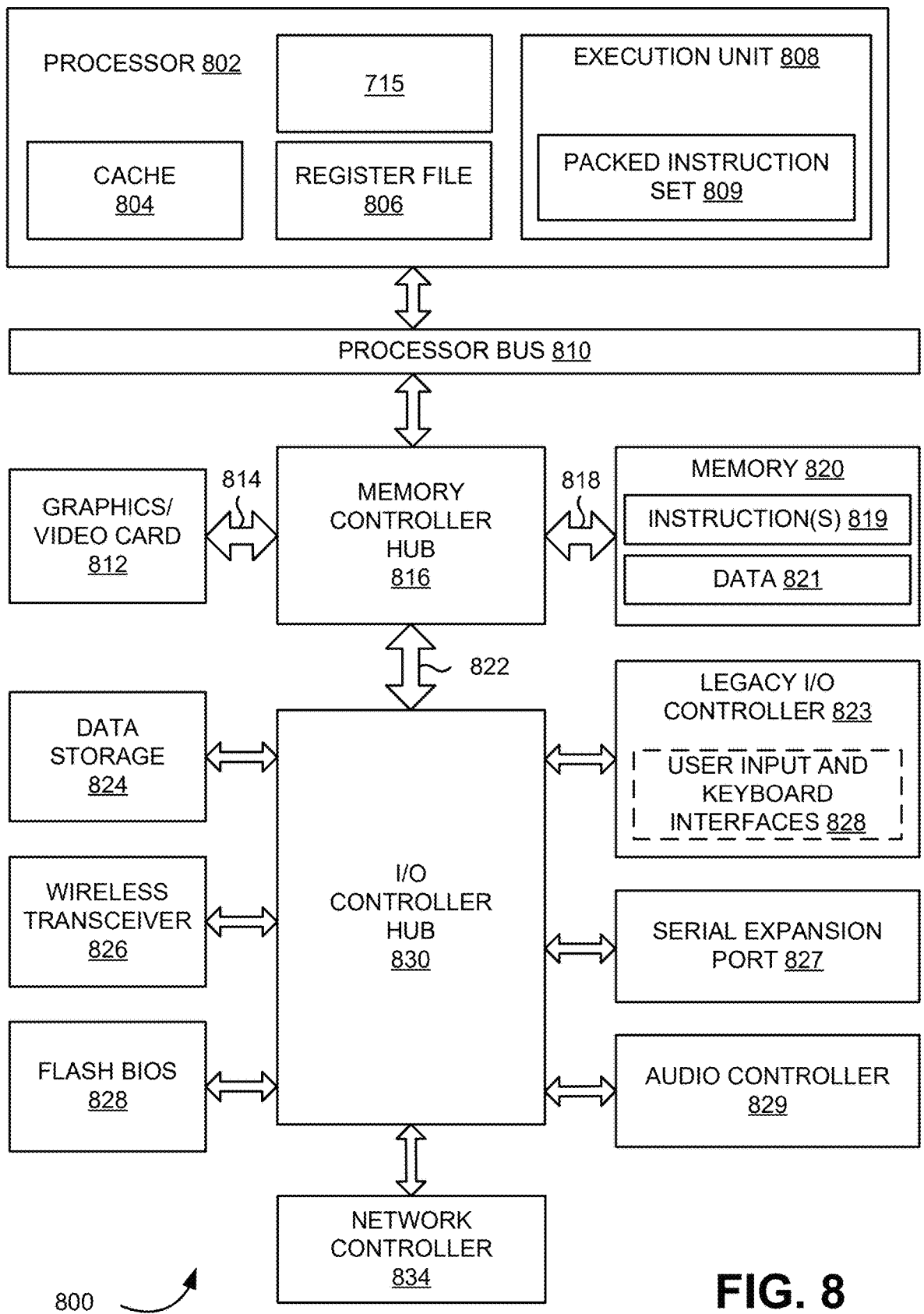
FIG. 8 is a block diagram illustrating a computer system, according to at least one embodiment.

Embodiments presented herein can allow for session keys to be wrapped using a sequence of wrapping keys to provide a secure tunnel for transmission of the wrapped session keys Computer Systems FIG. 8 is a block diagram illustrating an exemplary computer system, which may be a system with interconnected devices and components, a system-on-a-chip (SOC) or some combination thereof formed with a processor that may include execution units to execute an instruction, according to at least one embodiment. In at least one embodiment, a computer system 800 may include, without limitation, a component, such as a processor 802 to employ execution units including logic to perform algorithms for process data, in accordance with present disclosure, such as in embodiment described herein. In at least one embodiment, computer system 800 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 800 may execute a version of WINDOWS operating system available from Microsoft Corporation of Redmond, Wash., although other operating systems (UNIX and Linux, for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), system on a chip, network computers ("NetPCs"), set-top boxes, network hubs, wide area network ("WAN") switches, or any other system that may perform one or more instructions in accordance with at least one embodiment.

In at least one embodiment, computer system 800 may include, without limitation, processor 802 that may include, without limitation, one or more execution units 808 to perform machine learning model training and/or inferencing according to techniques described herein. In at least one embodiment, computer system 800 is a single processor desktop or server system, but in another embodiment, computer system 800 may be a multiprocessor system. In at least one embodiment, processor 802 may include, without limitation, a complex instruction set computer ("CISC") microprocessor, a reduced instruction set computing ("RISC") microprocessor, a very long instruction word ("VLIW") microprocessor, a processor implementing a combination of instruction sets, or any other processor device, such as a digital signal processor, for example. In at least one embodiment, processor 802 may be coupled to a processor bus 810 that may transmit data signals between processor 802 and other components in computer system 800.

In at least one embodiment, processor 802 may include, without limitation, a Level 1 ("L1") internal cache memory ("cache") 804. In at least one embodiment, processor 802 may have a single internal cache or multiple levels of internal cache. In at least one embodiment, cache memory may reside external to processor 802. Other embodiments may also include a combination of both internal and external caches depending on particular implementation and needs. In at least one embodiment, a register file 806 may store different types of data in various registers including, without limitation, integer registers, floating point registers, status registers, and an instruction pointer register.

In at least one embodiment, execution unit 808, including, without limitation, logic to perform integer and floating point operations, also resides in processor 802. In at least one embodiment, processor 802 may also include a microcode ("ucode") read only memory ("ROM") that stores microcode for certain macro instructions. In at least one embodiment, execution unit 808 may include logic to handle a packed instruction set 809. In at least one embodiment, by including packed instruction set 809 in an instruction set of a general-purpose processor, along with associated circuitry to execute instructions, operations used by many multimedia applications may be performed using packed data in processor 802. In at least one embodiment, many multimedia applications may be accelerated and executed more efficiently by using a full width of a processor's data bus for performing operations on packed data, which may eliminate a need to transfer smaller units of data across that processor's data bus to perform one or more operations one data element at a time.

In at least one embodiment, execution unit 808 may also be used in microcontrollers, embedded processors, graphics devices, DSPs, and other types of logic circuits. In at least one embodiment, computer system 800 may include, without limitation, a memory 820. In at least one embodiment, memory 820 may be a Dynamic Random Access Memory ("DRAM") device, a Static Random Access Memory ("SRAM") device, a flash memory device, or another memory device. In at least one embodiment, memory 820 may store instruction(s) 819 and/or data 821 represented by data signals that may be executed by processor 802.

In at least one embodiment, a system logic chip may be coupled to processor bus 810 and memory 820. In at least one embodiment, a system logic chip may include, without limitation, a memory controller hub ("MCH") 816, and processor 802 may communicate with MCH 816 via processor bus 810. In at least one embodiment, MCH 816 may provide a high bandwidth memory path 818 to memory 820 for instruction and data storage and for storage of graphics commands, data and textures. In at least one embodiment, MCH 816 may direct data signals between processor 802, memory 820, and other components in computer system 800 and to bridge data signals between processor bus 810, memory 820, and a system I/O interface 822. In at least one embodiment, a system logic chip may provide a graphics port for coupling to a graphics controller. In at least one embodiment, MCH 816 may be coupled to memory 820 through high bandwidth memory path 818 and a graphics/video card 812 may be coupled to MCH 816 through an Accelerated Graphics Port ("AGP") interconnect 814.

In at least one embodiment, computer system 800 may use system I/O interface 822 as a proprietary hub interface bus to couple MCH 816 to an I/O controller hub ("ICH") 830. In at least one embodiment, ICH 830 may provide direct connections to some I/O devices via a local I/O bus. In at least one embodiment, a local I/O bus may include, without limitation, a high-speed I/O bus for connecting peripherals to memory 820, a chipset, and processor 802. Examples may include, without limitation, an audio controller 829, a firmware hub ("flash BIOS") 828, a wireless transceiver 826, a data storage 824, a legacy I/O controller 823 containing user input and keyboard interfaces 825, a serial expansion port 827, such as a Universal Serial Bus ("USB") port, and a network controller 834. In at least one embodiment, data storage 824 may comprise a hard disk drive, a floppy disk drive, a CD-ROM device, a flash memory device, or other mass storage device.

In at least one embodiment, FIG. 8 illustrates a system, which includes interconnected hardware devices or "chips", whereas in other embodiments, FIG. 8 may illustrate an exemplary SoC. In at least one embodiment, devices illustrated in FIG. 8 may be interconnected with proprietary interconnects, standardized interconnects (e.g., PCIe) or some combination thereof. In at least one embodiment, one or more components of computer system 800 are interconnected using compute express link (CXL) interconnects.

Inference and/or training logic 715 are used to perform inferencing and/or training operations associated with one or more embodiments. In at least one embodiment, inference and/or training logic 715 may be used in computer system 800 for inferencing or predicting operations based, at least in part, on weight parameters calculated using neural network training operations, neural network functions and/or architectures, or neural network use cases described herein.

Figure 9:
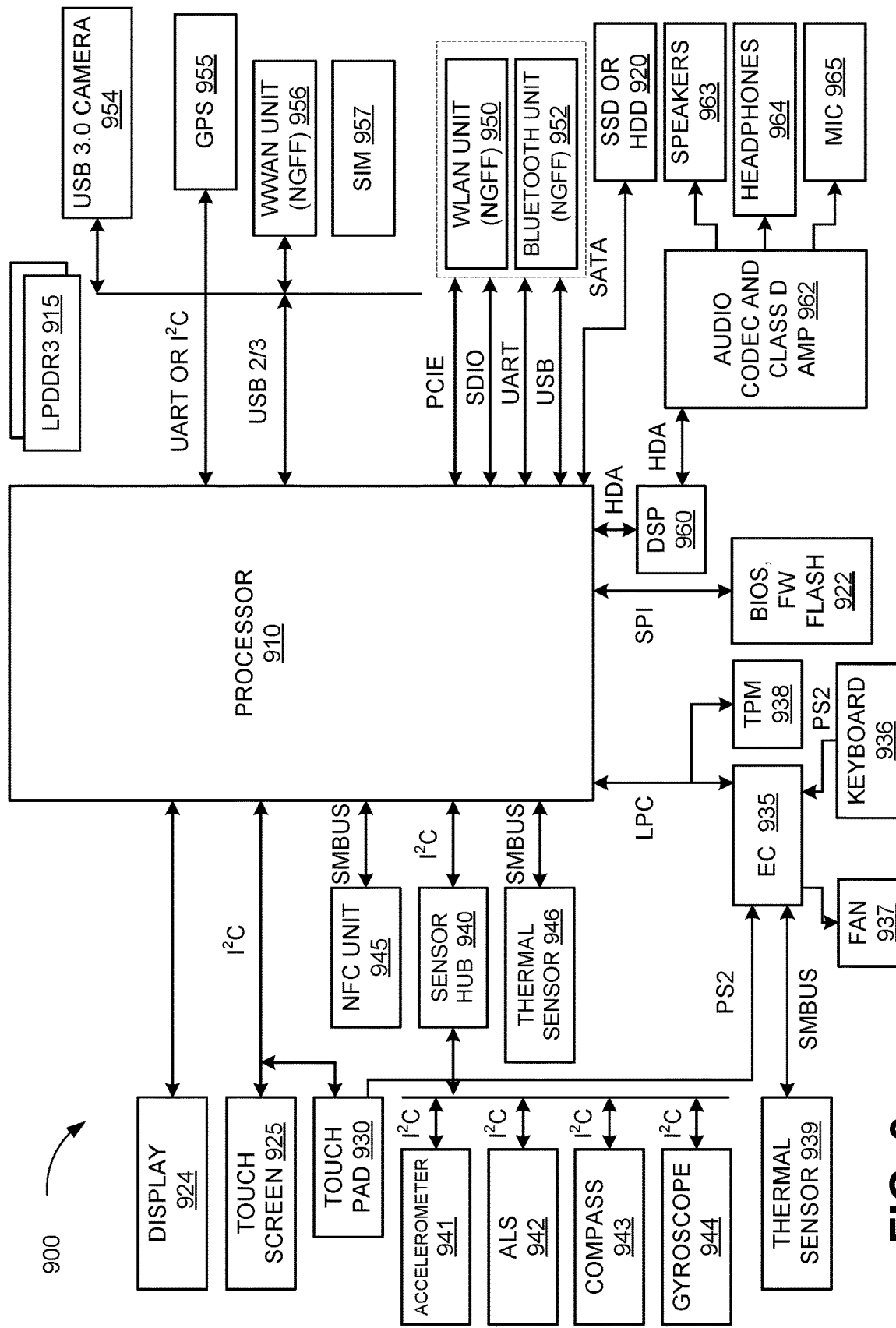
FIG. 9 is a block diagram illustrating a computer system, according to at least one embodiment.

Embodiments presented herein can allow for session keys to be wrapped using a sequence of wrapping keys to provide a secure tunnel for transmission of the wrapped session keys FIG. 9 is a block diagram illustrating an electronic device 900 for utilizing a processor 910, according to at least one embodiment. In at least one embodiment, electronic device

900 may be, for example and without limitation, a notebook, a tower server, a rack server, a blade server, a laptop, a desktop, a tablet, a mobile device, a phone, an embedded computer, or any other suitable electronic device.

In at least one embodiment, electronic device 900 may include, without limitation, processor 910 communicatively coupled to any suitable number or kind of components, peripherals, modules, or devices. In at least one embodiment, processor 910 is coupled using a bus or interface, such as a I²C bus, a System Management Bus ("SMBus"), a Low Pin Count (LPC) bus, a Serial Peripheral Interface ("SPI"), a High Definition Audio ("HDA") bus, a Serial Advance Technology Attachment ("SATA") bus, a Universal Serial Bus ("USB") (versions 1, 2, 3, etc.), or a Universal Asynchronous Receiver/Transmitter ("UART") bus. In at least one embodiment, FIG. 9 illustrates a system, which includes interconnected hardware devices or "chips", whereas in other embodiments, FIG. 9 may illustrate an exemplary SoC. In at least one embodiment, devices illustrated in FIG. 9 may be interconnected with proprietary interconnects, standardized interconnects (e.g., PCIe) or some combination thereof. In at least one embodiment, one or more components of FIG. 9 are interconnected using compute express link (CXL) interconnects.

In at least one embodiment, FIG. 9 may include a display 924, a touch screen 925, a touch pad 930, a Near Field Communications unit ("NFC") 945, a sensor hub 940, a thermal sensor 946, an Express Chipset ("EC") 935, a Trusted Platform Module ("TPM") 938, BIOS/firmware/flash memory ("BIOS, FW Flash") 922, a DSP 960, a drive 920 such as a Solid State Disk ("SSD") or a Hard Disk Drive ("HDD"), a wireless local area network unit ("WLAN") 950, a Bluetooth unit 952, a Wireless Wide Area Network unit ("WWAN") 956, a Global Positioning System (GPS) unit 955, a camera ("USB 3.0 camera") 954 such as a USB 3.0 camera, and/or a Low Power Double Data Rate ("LPDDR") memory unit ("LPDDR3") 915 implemented in, for example, an LPDDR3 standard. These components may each be implemented in any suitable manner.

In at least one embodiment, other components may be communicatively coupled to processor 910 through components described herein. In at least one embodiment, an accelerometer 941, an ambient light sensor ("ALS") 942, a compass 943, and a gyroscope 944 may be communicatively coupled to sensor hub 940. In at least one embodiment, a thermal sensor 939, a fan 937, a keyboard 936, and touch pad 930 may be communicatively coupled to EC 935. In at least one embodiment, speakers 963, headphones 964, and a microphone ("mic") 965 may be communicatively coupled to an audio unit ("audio codec and class D amp") 962, which may in turn be communicatively coupled to DSP 960. In at least one embodiment, audio unit 962 may include, for example and without limitation, an audio coder/decoder ("codec") and a class D amplifier. In at least one embodiment, a SIM card ("SIM") 957 may be communicatively coupled to WWAN unit 956. In at least one embodiment, components such as WLAN unit 950 and Bluetooth unit 952, as well as WWAN unit 956 may be implemented in a Next Generation Form Factor ("NGFF").

Figure 10:
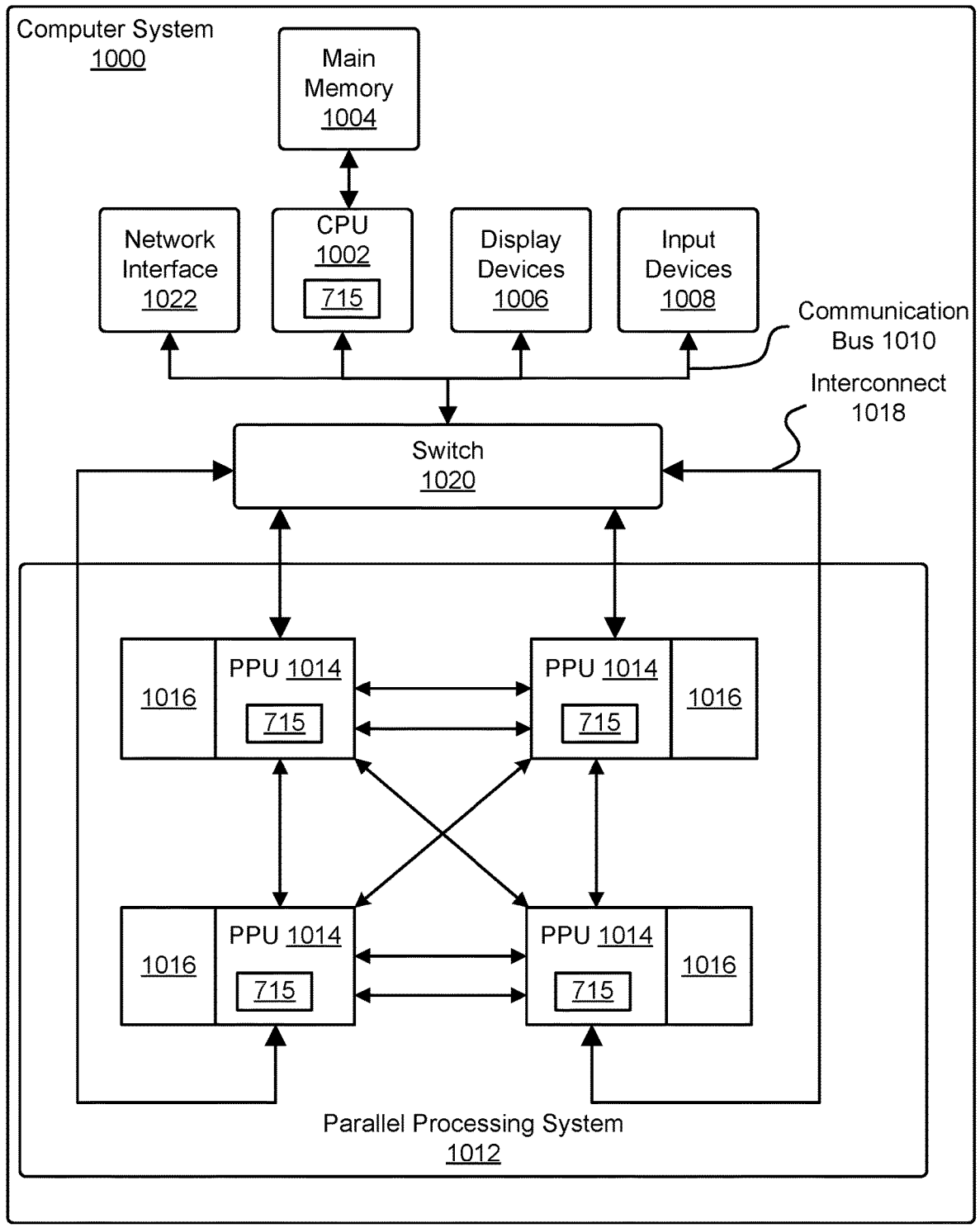
FIG. 10 illustrates a computer system, according to at least one embodiment.

Inference and/or training logic 715 are used to perform inferencing and/or training operations associated with one or more embodiments. In at least one embodiment, inference and/or training logic 715 may be used in electronic device 900 or inferencing or predicting operations based, at least in part, on weight parameters calculated using neural network training operations, neural network functions and/or architectures, or neural network use cases described herein. Embodiments presented herein can allow for session keys to be wrapped using a sequence of wrapping keys to provide a secure tunnel for transmission of the wrapped session keys FIG. 10 illustrates a computer system 1000, according to at least one embodiment. In at least one embodiment, computer system 1000 is configured to implement various processes and methods described throughout this disclosure.

In at least one embodiment, computer system 1000 comprises, without limitation, at least one central processing unit ("CPU") 1002 that is connected to a communication bus 1010 implemented using any suitable protocol, such as PCI ("Peripheral Component Interconnect"), peripheral component interconnect express ("PCI-Express"), AGP ("Accelerated Graphics Port"), HyperTransport, or any other bus or point-to-point communication protocol(s). In at least one embodiment, computer system 1000 includes, without limitation, a main memory 1004 and control logic (e.g., implemented as hardware, software, or a combination thereof) and data are stored in main memory 1004, which may take form of random access memory ("RAM"). In at least one embodiment, a network interface subsystem ("network interface") 1022 provides an interface to other computing devices and networks for receiving data from and transmitting data to other systems with computer system 1000.

In at least one embodiment, computer system 1000, in at least one embodiment, includes, without limitation, input devices 1008, a parallel processing system 1012, and display devices 1006 that can be implemented using a conventional cathode ray tube ("CRT"), a liquid crystal display ("LCD"), a light emitting diode ("LED") display, a plasma display, or other suitable display technologies. In at least one embodiment, user input is received from input devices 1008 such as keyboard, mouse, touchpad, microphone, etc. In at least one embodiment, each module described herein can be situated on a single semiconductor platform to form a processing system.

Figure 11:
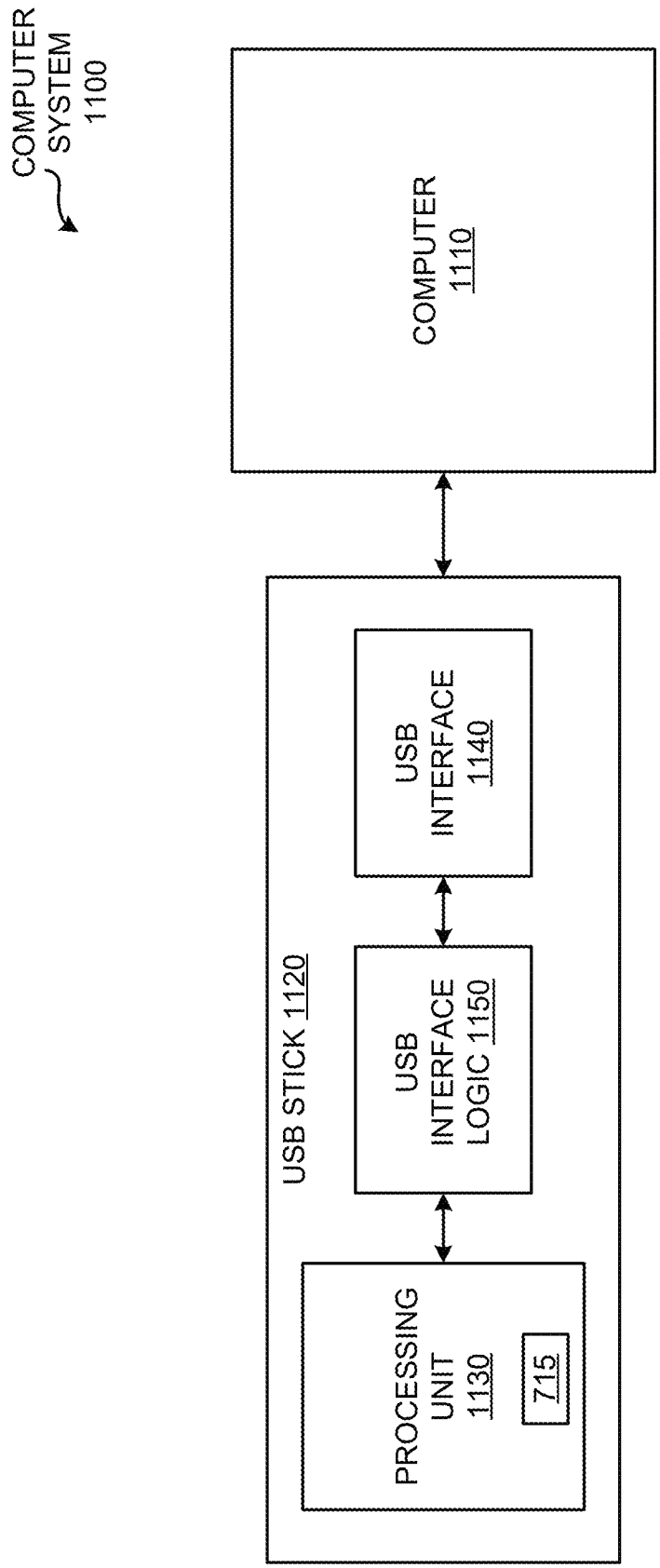
FIG. 11 illustrates a computer system, according to at least one embodiment.

Inference and/or training logic 715 are used to perform inferencing and/or training operations associated with one or more embodiments. In at least one embodiment, inference and/or training logic 715 may be used in computer system 1000 for inferencing or predicting operations based, at least in part, on weight parameters calculated using neural network training operations, neural network functions and/or architectures, or neural network use cases described herein. Embodiments presented herein can allow for session keys to be wrapped using a sequence of wrapping keys to provide a secure tunnel for transmission of the wrapped session keys FIG. 11 illustrates a computer system 1100, according to at least one embodiment. In at least one embodiment, computer system 1100 includes, without limitation, a computer 1110 and a USB stick 1120. In at least one embodiment, computer 1110 may include, without limitation, any number and type of processor(s) (not shown) and a memory (not shown). In at least one embodiment, computer 1110 includes, without limitation, a server, a cloud instance, a laptop, and a desktop computer.

In at least one embodiment, USB stick 1120 includes, without limitation, a processing unit 1130, a USB interface 1140, and USB interface logic 1150. In at least one embodiment, processing unit 1130 may be any instruction execution system, apparatus, or device capable of executing instructions. In at least one embodiment, processing unit 1130 may include, without limitation, any number and type of processing cores (not shown). In at least one embodiment, processing unit 1130 comprises an application specific integrated circuit ("ASIC") that is optimized to perform any amount and type of operations associated with machine learning. For instance, in at least one embodiment, processing unit 1130 is a tensor processing unit ("TPC") that is optimized to perform machine learning inference operations. In at least one embodiment, processing unit 1130 is a vision processing unit ("VPU") that is optimized to perform machine vision and machine learning inference operations.

In at least one embodiment, USB interface 1140 may be any type of USB connector or USB socket. For instance, in at least one embodiment, USB interface 1140 is a USB 3.0 Type-C socket for data and power. In at least one embodiment, USB interface 1140 is a USB 3.0 Type-A connector. In at least one embodiment, USB interface logic 1150 may include any amount and type of logic that enables processing unit 1130 to interface with devices (e.g., computer 1110) via USB connector 1140.

Figure 12A:
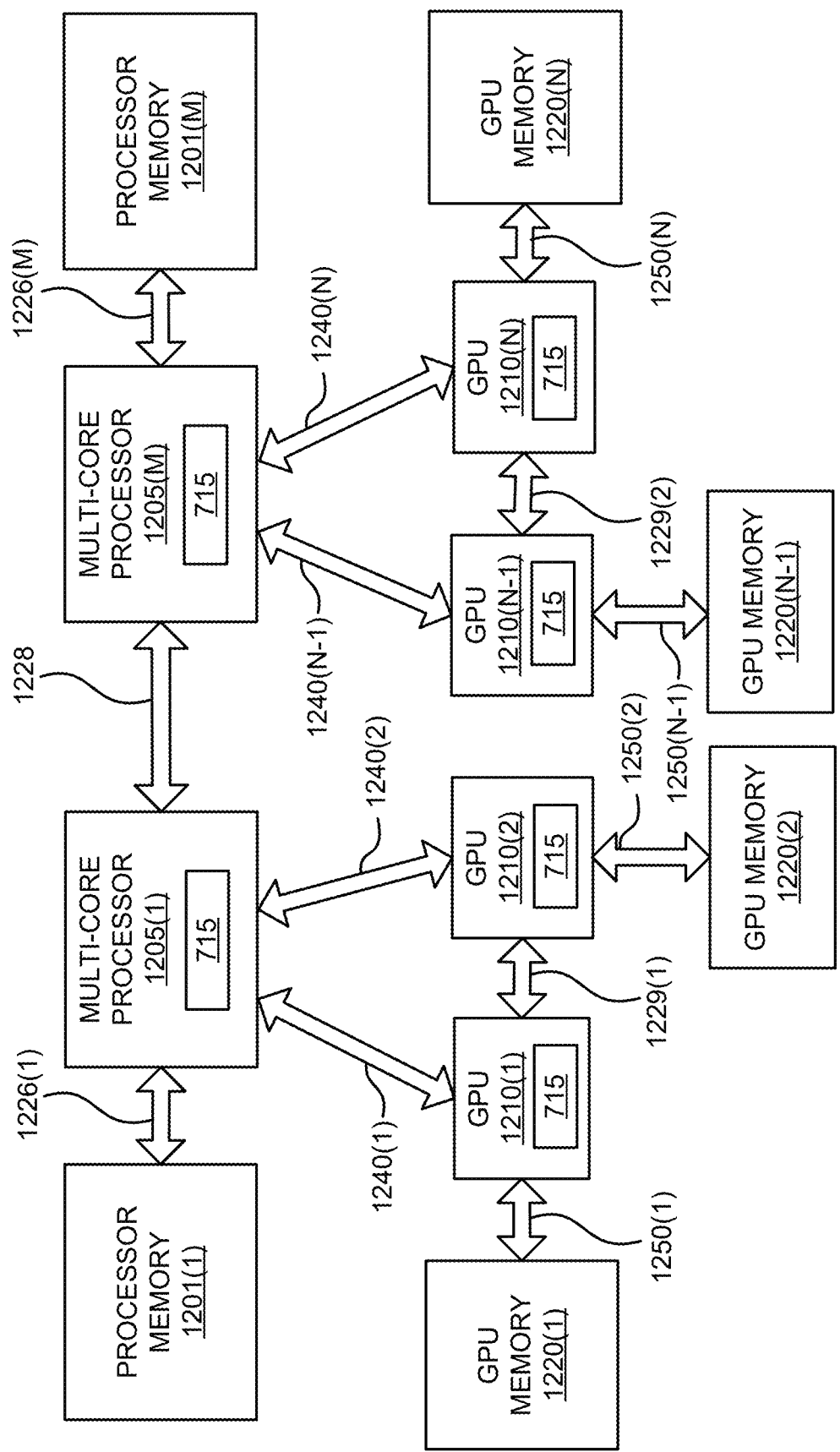
FIG. 12A illustrates a computer system, according to at least one embodiment.

Inference and/or training logic 715 are used to perform inferencing and/or training operations associated with one or more embodiments. In at least one embodiment, inference and/or training logic 715 may be used in computer system 1100 for inferencing or predicting operations based, at least in part, on weight parameters calculated using neural network training operations, neural network functions and/or architectures, or neural network use cases described herein. Embodiments presented herein can allow for session keys to be wrapped using a sequence of wrapping keys to provide a secure tunnel for transmission of the wrapped session keys FIG. 12A illustrates an exemplary architecture in which a plurality of GPUs 1210(1)-1210(N) is communicatively coupled to a plurality of multi-core processors 1205(1)-1205(M) over high-speed links 1240(1)-1240(N) (e.g., buses, point-to-point interconnects, etc.). In at least one embodiment, high-speed links 1240(1)-1240(N) support a communication throughput of 4 GB/s, 30 GB/s, 80 GB/s or higher. In at least one embodiment, various interconnect protocols may be used including, but not limited to, PCIe 4.0 or 5.0 and NVLink 2.0. In various figures, "N" and "M" represent positive integers, values of which may be different from figure to figure. In at least one embodiment, one or more GPUs in a plurality of GPUs 1210(1)-1210(N) includes one or more graphics cores (also referred to simply as "cores") 1500 as disclosed in FIGS. 15A and 15B. In at least one embodiment, one or more graphics cores 1500 may be referred to as streaming multiprocessors ("SMs"), stream processors ("SPs"), stream processing units ("SPUs"), compute units ("CUs"), execution units ("EUs"), and/or slices, where a slice in this context can refer to a portion of processing resources in a processing unit (e.g., 16 cores, a ray tracing unit, a thread director or scheduler).

In addition, and in at least one embodiment, two or more of GPUs 1210 are interconnected over high-speed links 1229(1)-1229(2), which may be implemented using similar or different protocols/links than those used for high-speed links 1240(1)-1240(N). Similarly, two or more of multi-core processors 1205 may be connected over a high-speed link 1228 which may be symmetric multi-processor (SMP) buses operating at 20 GB/s, 30 GB/s, 120 GB/s or higher. Alternatively, all communication between various system components shown in FIG. 12A may be accomplished using similar protocols/links (e.g., over a common interconnection fabric).

In at least one embodiment, each multi-core processor 1205 is communicatively coupled to a processor memory 1201(1)-1201(M), via memory interconnects 1226(1)-1226(M), respectively, and each GPU 1210(1)-1210(N) is communicatively coupled to GPU memory 1220(1)-1220(N) over GPU memory interconnects 1250(1)-1250(N), respectively. In at least one embodiment, memory interconnects 1226 and 1250 may utilize similar or different memory access technologies. By way of example, and not limitation, processor memories 1201(1)-1201(M) and GPU memories 1220 may be volatile memories such as dynamic random access memories (DRAMs) (including stacked DRAMs), Graphics DDR SDRAM (GDDR) (e.g., GDDR5, GDDR6), or High Bandwidth Memory (HBM) and/or may be non-volatile memories such as 3D XPoint or Nano-Ram. In at least one embodiment, some portion of processor memories 1201 may be volatile memory and another portion may be non-volatile memory (e.g., using a two-level memory (2LM) hierarchy).

As described herein, although various multi-core processors 1205 and GPUs 1210 may be physically coupled to a particular memory 1201, 1220, respectively, and/or a unified memory architecture may be implemented in which a virtual system address space (also referred to as "effective address" space) is distributed among various physical memories. For example, processor memories 1201(1)-1201(M) may each comprise 64 GB of system memory address space and GPU memories 1220(1)-1220(N) may each comprise 32 GB of system memory address space resulting in a total of 256 GB addressable memory when M=2 and N=4. Other values for N and M are possible.

Figure 12B:
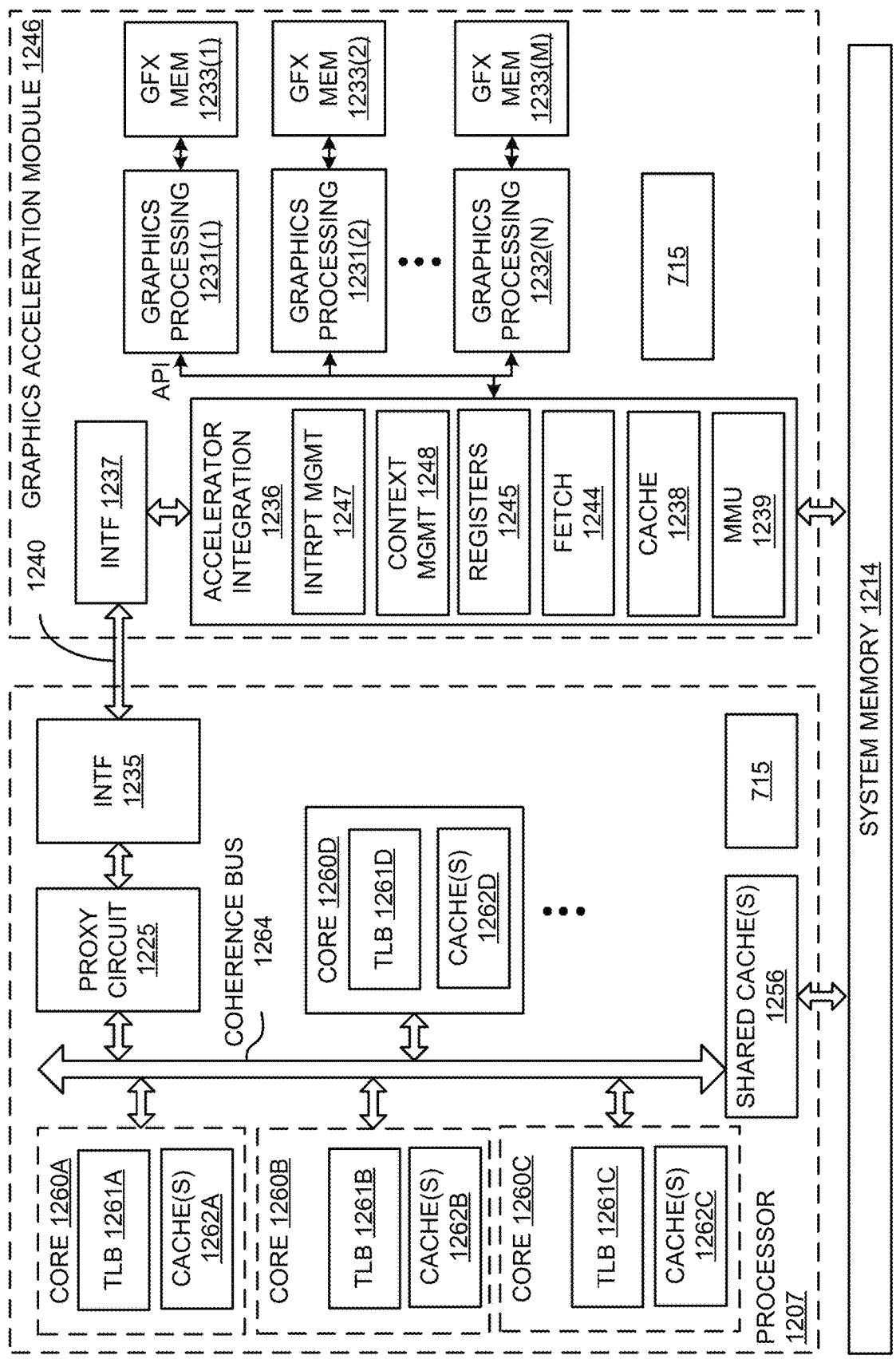
FIG. 12B illustrates a computer system, according to at least one embodiment.

FIG. 12B illustrates additional details for an interconnection between a multi-core processor 1207 and a graphics acceleration module 1246 in accordance with one exemplary embodiment. In at least one embodiment, graphics acceleration module 1246 may include one or more GPU chips integrated on a line card which is coupled to processor 1207 via high-speed link 1240 (e.g., a PCIe bus, NVLink, etc.). In at least one embodiment, graphics acceleration module 1246 may alternatively be integrated on a package or chip with processor 1207.

In at least one embodiment, processor 1207 includes a plurality of cores 1260A-1260D (which may be referred to as "execution units"), each with a translation lookaside buffer ("TLB") 1261A-1261D and one or more caches 1262A-1262D. In at least one embodiment, cores 1260A-1260D may include various other components for executing instructions and processing data that are not illustrated. In at least one embodiment, caches 1262A-1262D may comprise Level 1 (L1) and Level 2 (L2) caches. In addition, one or more shared caches 1256 may be included in caches 1262A-1262D and shared by sets of cores 1260A-1260D. For example, one embodiment of processor 1207 includes 24 cores, each with its own L1 cache, twelve shared L2 caches, and twelve shared L3 caches. In this embodiment, one or more L2 and L3 caches are shared by two adjacent cores. In at least one embodiment, processor 1207 and graphics acceleration module 1246 connect with system memory 1214, which may include processor memories 1201(1)-1201(M) of FIG. 12A.

In at least one embodiment, coherency is maintained for data and instructions stored in various caches 1262A-1262D, 1256 and system memory 1214 via inter-core communication over a coherence bus 1264. In at least one embodiment, for example, each cache may have cache coherency logic/circuitry associated therewith to communicate to over coherence bus 1264 in response to detected reads or writes to particular cache lines. In at least one embodiment, a cache snooping protocol is implemented over coherence bus 1264 to snoop cache accesses.

In at least one embodiment, a proxy circuit 1225 communicatively couples graphics acceleration module 1246 to coherence bus 1264, allowing graphics acceleration module 1246 to participate in a cache coherence protocol as a peer of cores 1260A-1260D. In particular, in at least one embodiment, an interface 1235 provides connectivity to proxy circuit 1225 over high-speed link 1240 and an interface 1237 connects graphics acceleration module 1246 to high-speed link 1240.

In at least one embodiment, an accelerator integration circuit 1236 provides cache management, memory access, context management, and interrupt management services on behalf of a plurality of graphics processing engines 1231(1)-1231(N) of graphics acceleration module 1246. In at least one embodiment, graphics processing engines 1231(1)-1231(N) may each comprise a separate graphics processing unit (GPU). In at least one embodiment, plurality of graphics processing engines 1231(1)-1231(N) of graphics acceleration module 1246 include one or more graphics cores 1500 as discussed in connection with FIGS. 15A and 15B. In at least one embodiment, graphics processing engines 1231(1)-1231(N) alternatively may comprise different types of graphics processing engines within a GPU, such as graphics execution units, media processing engines (e.g., video encoders/decoders), samplers, and blit engines. In at least one embodiment, graphics acceleration module 1246 may be a GPU with a plurality of graphics processing engines 1231(1)-1231(N) or graphics processing engines 1231(1)-1231(N) may be individual GPUs integrated on a common package, line card, or chip.

In at least one embodiment, accelerator integration circuit 1236 includes a memory management unit (MMU) 1239 for performing various memory management functions such as virtual-to-physical memory translations (also referred to as effective-to-real memory translations) and memory access protocols for accessing system memory 1214. In at least one embodiment, MMU 1239 may also include a translation lookaside buffer (TLB) (not shown) for caching virtual/effective to physical/real address translations. In at least one embodiment, a cache 1238 can store commands and data for efficient access by graphics processing engines 1231(1)-1231(N). In at least one embodiment, data stored in cache 1238 and graphics memories 1233(1)-1233(M) is kept coherent with core caches 1262A-1262D, 1256 and system memory 1214, possibly using a fetch unit 1244. As mentioned, this may be accomplished via proxy circuit 1225 on behalf of cache 1238 and memories 1233(1)-1233(M) (e.g., sending updates to cache 1238 related to modifications/accesses of cache lines on processor caches 1262A-1262D, 1256 and receiving updates from cache 1238).

In at least one embodiment, a set of registers 1245 store context data for threads executed by graphics processing engines 1231(1)-1231(N) and a context management circuit 1248 manages thread contexts. For example, context management circuit 1248 may perform save and restore operations to save and restore contexts of various threads during contexts switches (e.g., where a first thread is saved and a second thread is stored so that a second thread can be execute by a graphics processing engine). For example, on a context switch, context management circuit 1248 may store current register values to a designated region in memory (e.g., identified by a context pointer). It may then restore register values when returning to a context. In at least one embodiment, an interrupt management circuit 1247 receives and processes interrupts received from system devices.

In at least one embodiment, virtual/effective addresses from a graphics processing engine 1231 are translated to real/physical addresses in system memory 1214 by MMU 1239. In at least one embodiment, accelerator integration circuit 1236 supports multiple (e.g., 4, 8, 16) graphics accelerator modules 1246 and/or other accelerator devices. In at least one embodiment, graphics accelerator module 1246 may be dedicated to a single application executed on processor 1207 or may be shared between multiple applications. In at least one embodiment, a virtualized graphics execution environment is presented in which resources of graphics processing engines 1231(1)-1231(N) are shared with multiple applications or virtual machines (VMs). In at least one embodiment, resources may be subdivided into "slices" which are allocated to different VMs and/or applications based on processing requirements and priorities associated with VMs and/or applications.

In at least one embodiment, accelerator integration circuit 1236 performs as a bridge to a system for graphics acceleration module 1246 and provides address translation and system memory cache services. In addition, in at least one embodiment, accelerator integration circuit 1236 may provide virtualization facilities for a host processor to manage virtualization of graphics processing engines 1231(1)-1231(N), interrupts, and memory management.

In at least one embodiment, because hardware resources of graphics processing engines 1231(1)-1231(N) are mapped explicitly to a real address space seen by host processor 1207, any host processor can address these resources directly using an effective address value. In at least one embodiment, one function of accelerator integration circuit 1236 is physical separation of graphics processing engines 1231(1)-1231(N) so that they appear to a system as independent units.

In at least one embodiment, one or more graphics memories 1233(1)-1233(M) are coupled to each of graphics processing engines 1231(1)-1231(N), respectively and N=M. In at least one embodiment, graphics memories 1233(1)-1233(M) store instructions and data being processed by each of graphics processing engines 1231(1)-1231(N). In at least one embodiment, graphics memories 1233(1)-1233(M) may be volatile memories such as DRAMs (including stacked DRAMs), GDDR memory (e.g., GDDR5, GDDR6), or HBM, and/or may be non-volatile memories such as 3D XPoint or Nano-Ram.

In at least one embodiment, to reduce data traffic over high-speed link 1240, biasing techniques can be used to ensure that data stored in graphics memories 1233(1)-1233(M) is data that will be used most frequently by graphics processing engines 1231(1)-1231(N) and preferably not used by cores 1260A-1260D (at least not frequently). Similarly, in at least one embodiment, a biasing mechanism attempts to keep data needed by cores (and preferably not graphics processing engines 1231(1)-1231(N)) within caches 1262A-1262D, 1256 and system memory 1214.

Figure 13:
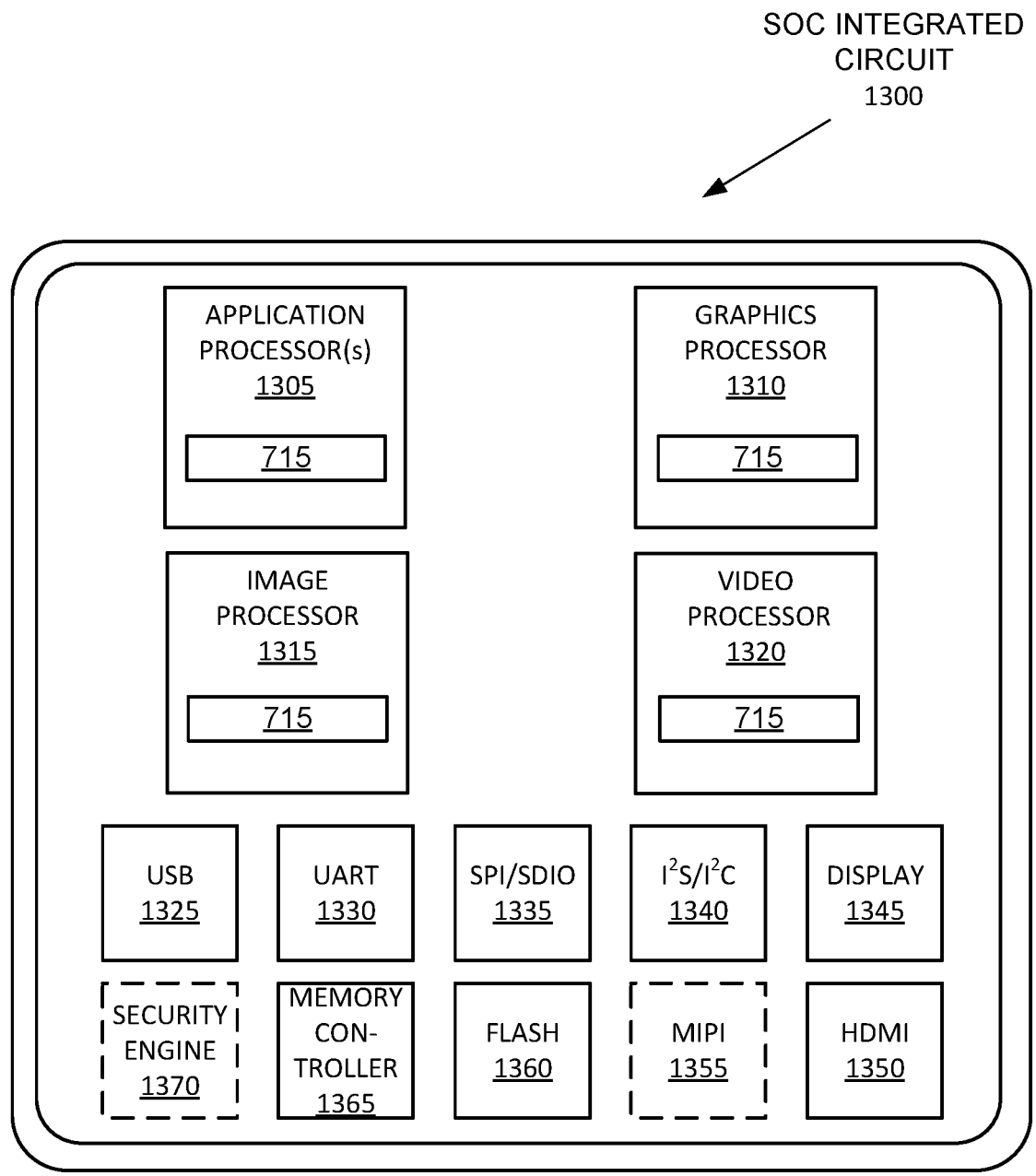
FIG. 13 illustrates exemplary integrated circuits and associated graphics processors, according to at least one embodiment.

FIG. 13 illustrates exemplary integrated circuits and associated graphics processors that may be fabricated using one or more IP cores, according to various embodiments described herein. In addition to what is illustrated, other logic and circuits may be included in at least one embodiment, including additional graphics processors/cores, peripheral interface controllers, or general-purpose processor cores.

FIG. 13 is a block diagram illustrating an exemplary system on a chip integrated circuit 1300 that may be fabricated using one or more IP cores, according to at least one embodiment. In at least one embodiment, integrated circuit 1300 includes one or more application processor(s) 1305 (e.g., CPUs), at least one graphics processor 1310, and may additionally include an image processor 1315 and/or a video processor 1320, any of which may be a modular IP core. In at least one embodiment, integrated circuit 1300 includes peripheral or bus logic including a USB controller 1325, a UART controller 1330, an SPI/SDIO controller 1335, and an I²S/I²C controller 1340. In at least one embodiment, integrated circuit 1300 can include a display device 1345 coupled to one or more of a high-definition multimedia interface (HDMI) controller 1350 and a mobile industry processor interface (MIPI) display interface 1355. In at least one embodiment, storage may be provided by a flash memory subsystem 1360 including flash memory and a flash memory controller. In at least one embodiment, a memory interface may be provided via a memory controller 1365 for access to SDRAM or SRAM memory devices. In at least one embodiment, some integrated circuits additionally include an embedded security engine 1370.

Figure 14A:
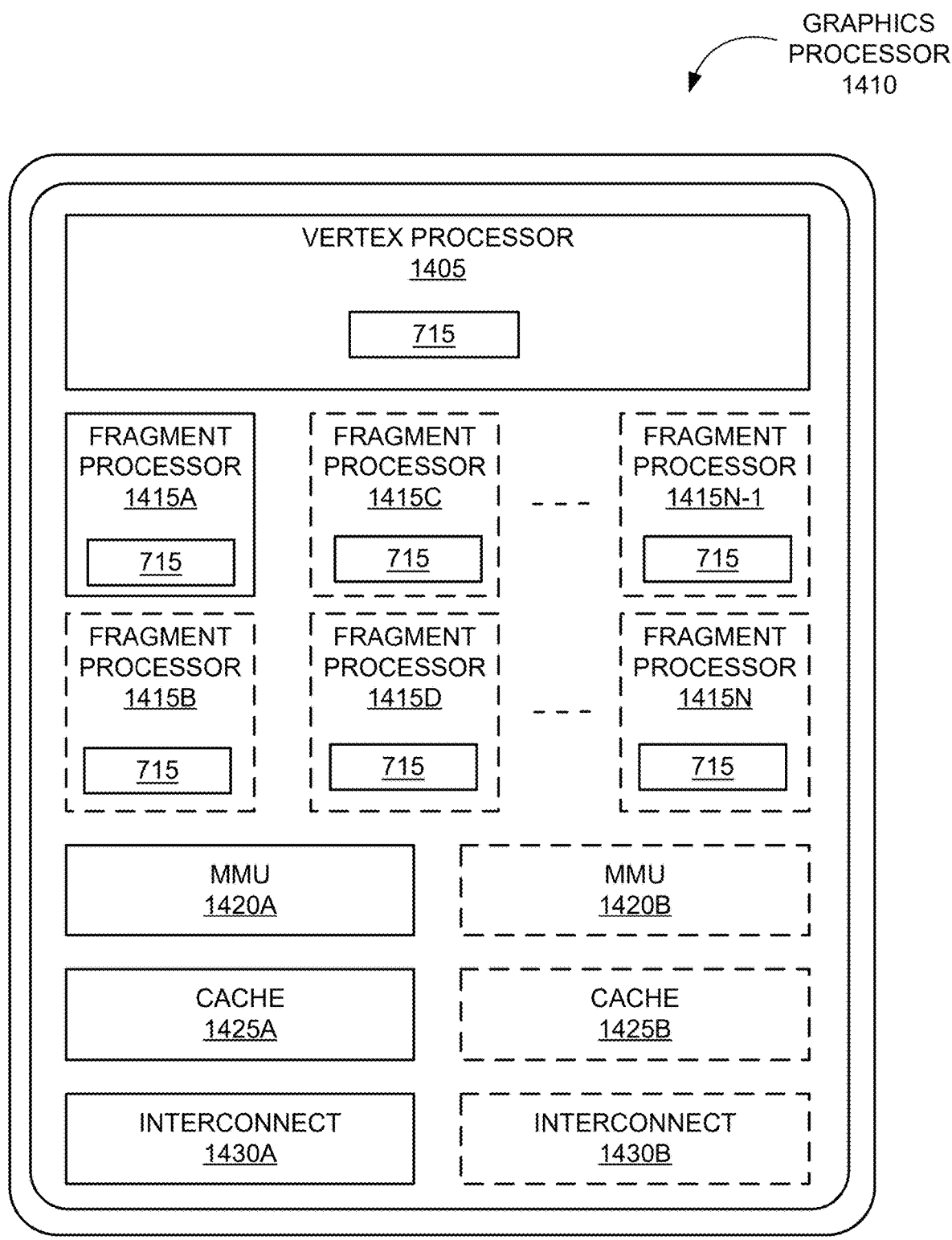
FIGS. 14A-14B illustrate exemplary integrated circuits and associated graphics processors, according to at least one embodiment.
Figure 14B:
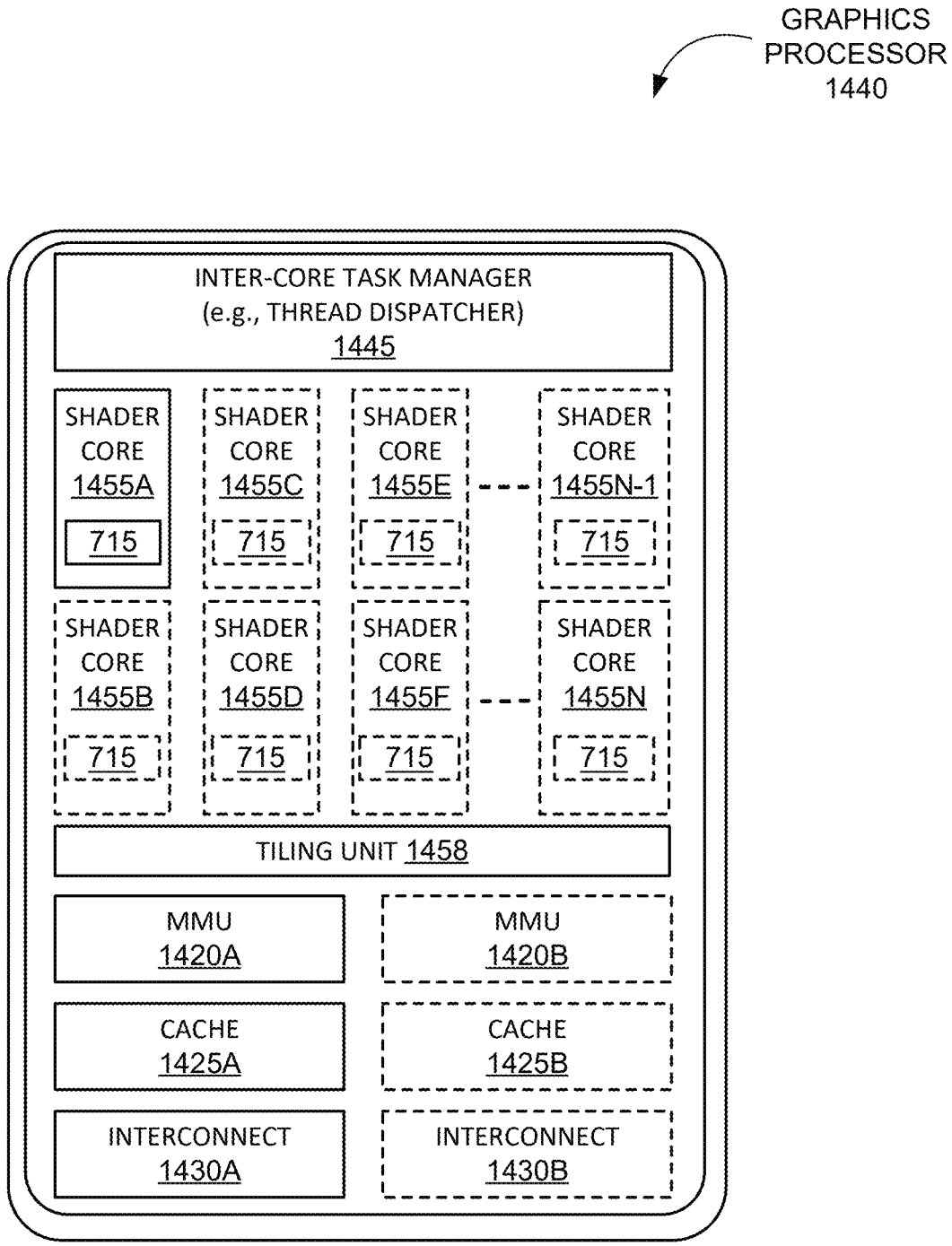

Inference and/or training logic 715 are used to perform inferencing and/or training operations associated with one or more embodiments. In at least one embodiment, inference and/or training logic 715 may be used in integrated circuit 1300 for inferencing or predicting operations based, at least in part, on weight parameters calculated using neural network training operations, neural network functions and/or architectures, or neural network use cases described herein. Embodiments presented herein can allow for session keys to be wrapped using a sequence of wrapping keys to provide a secure tunnel for transmission of the wrapped session keys FIGS. 14A-14B illustrate exemplary integrated circuits and associated graphics processors that may be fabricated using one or more IP cores, according to various embodiments described herein. In addition to what is illustrated, other logic and circuits may be included in at least one embodiment, including additional graphics processors/cores, peripheral interface controllers, or general-purpose processor cores.

FIGS. 14A-14B are block diagrams illustrating exemplary graphics processors for use within an SoC, according to embodiments described herein. FIG. 14A illustrates an exemplary graphics processor 1410 of a system on a chip integrated circuit that may be fabricated using one or more IP cores, according to at least one embodiment. FIG. 14B illustrates an additional exemplary graphics processor 1440 of a system on a chip integrated circuit that may be fabricated using one or more IP cores, according to at least one embodiment. In at least one embodiment, graphics processor 1410 of FIG. 14A is a low power graphics processor core. In at least one embodiment, graphics processor 1440 of FIG. 14B is a higher performance graphics processor core. In at least one embodiment, each of graphics processors 1410, 1440 can be variants of graphics processor 1310 of FIG. 13.

In at least one embodiment, graphics processor 1410 includes a vertex processor 1405 and one or more fragment processor(s) 1415A-1415N (e.g., 1415A, 1415B, 1415C, 1415D, through 1415N-1, and 1415N). In at least one embodiment, graphics processor 1410 can execute different shader programs via separate logic, such that vertex processor 1405 is optimized to execute operations for vertex shader programs, while one or more fragment processor(s) 1415A-1415N execute fragment (e.g., pixel) shading operations for fragment or pixel shader programs. In at least one embodiment, vertex processor 1405 performs a vertex processing stage of a 3D graphics pipeline and generates primitives and vertex data. In at least one embodiment, fragment processor(s) 1415A-1415N use primitive and vertex data generated by vertex processor 1405 to produce a framebuffer that is displayed on a display device. In at least one embodiment, fragment processor(s) 1415A-1415N are optimized to execute fragment shader programs as provided for in an OpenGL API, which may be used to perform similar operations as a pixel shader program as provided for in a Direct 3D API.

In at least one embodiment, graphics processor 1410 additionally includes one or more memory management units (MMUs) 1420A-1420B, cache(s) 1425A-1425B, and circuit interconnect(s) 1430A-1430B. In at least one embodiment, one or more MMU(s) 1420A-1420B provide for virtual to physical address mapping for graphics processor 1410, including for vertex processor 1405 and/or fragment processor(s) 1415A-1415N, which may reference vertex or image/texture data stored in memory, in addition to vertex or image/texture data stored in one or more cache(s) 1425A-1425B. In at least one embodiment, one or more MMU(s) 1420A-1420B may be synchronized with other MMUs within a system, including one or more MMUs associated with one or more application processor(s) 1305, image processors 1315, and/or video processors 1320 of FIG. 13, such that each processor 1305-1320 can participate in a shared or unified virtual memory system. In at least one embodiment, one or more circuit interconnect(s) 1430A-1430B enable graphics processor 1410 to interface with other IP cores within SoC, either via an internal bus of SoC or via a direct connection.

In at least one embodiment, graphics processor 1440 includes one or more shader core(s) 1455A-1455N (e.g., 1455A, 1455B, 1455C, 1455D, 1455E, 1455F, through 1455N-1, and 1455N) as shown in FIG. 14B, which provides for a unified shader core architecture in which a single core or type or core can execute all types of programmable shader code, including shader program code to implement vertex shaders, fragment shaders, and/or compute shaders. In at least one embodiment, a number of shader cores can vary. In at least one embodiment, graphics processor 1440 includes an inter-core task manager 1445, which acts as a thread dispatcher to dispatch execution threads to one or more shader cores 1455A-1455N and a tiling unit 1458 to accelerate tiling operations for tile-based rendering, in which rendering operations for a scene are subdivided in image space, for example to exploit local spatial coherence within a scene or to optimize use of internal caches.

Inference and/or training logic 715 are used to perform inferencing and/or training operations associated with one or more embodiments. In at least one embodiment, inference and/or training logic 715 may be used in graphics processors 1410 and/or 1140 for inferencing or predicting operations based, at least in part, on weight parameters calculated using neural network training operations, neural network functions and/or architectures, or neural network use cases described herein.

Figure 15A:
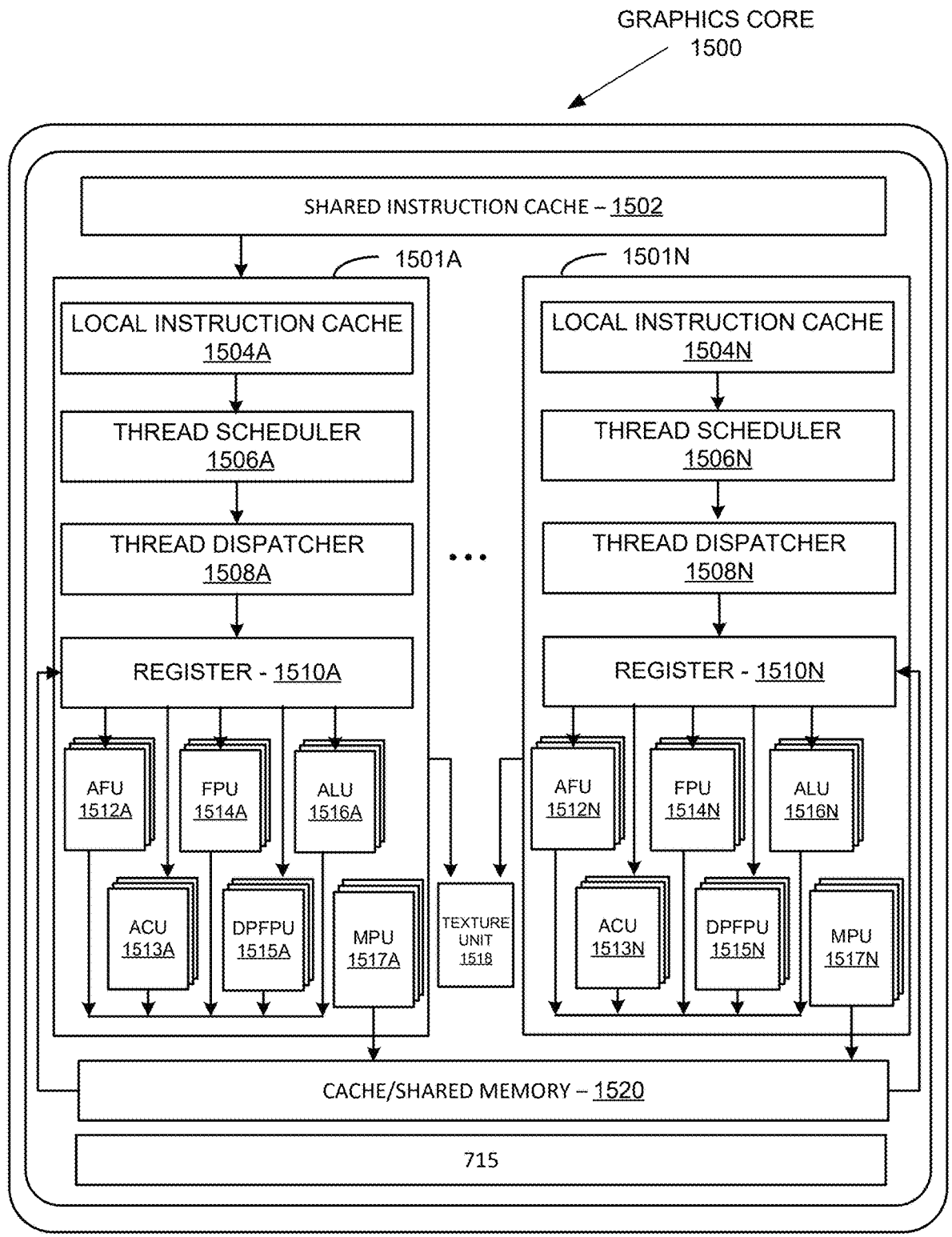
FIGS. 15A-15B illustrate additional exemplary graphics processor logic according to at least one embodiment.
Figure 15B:
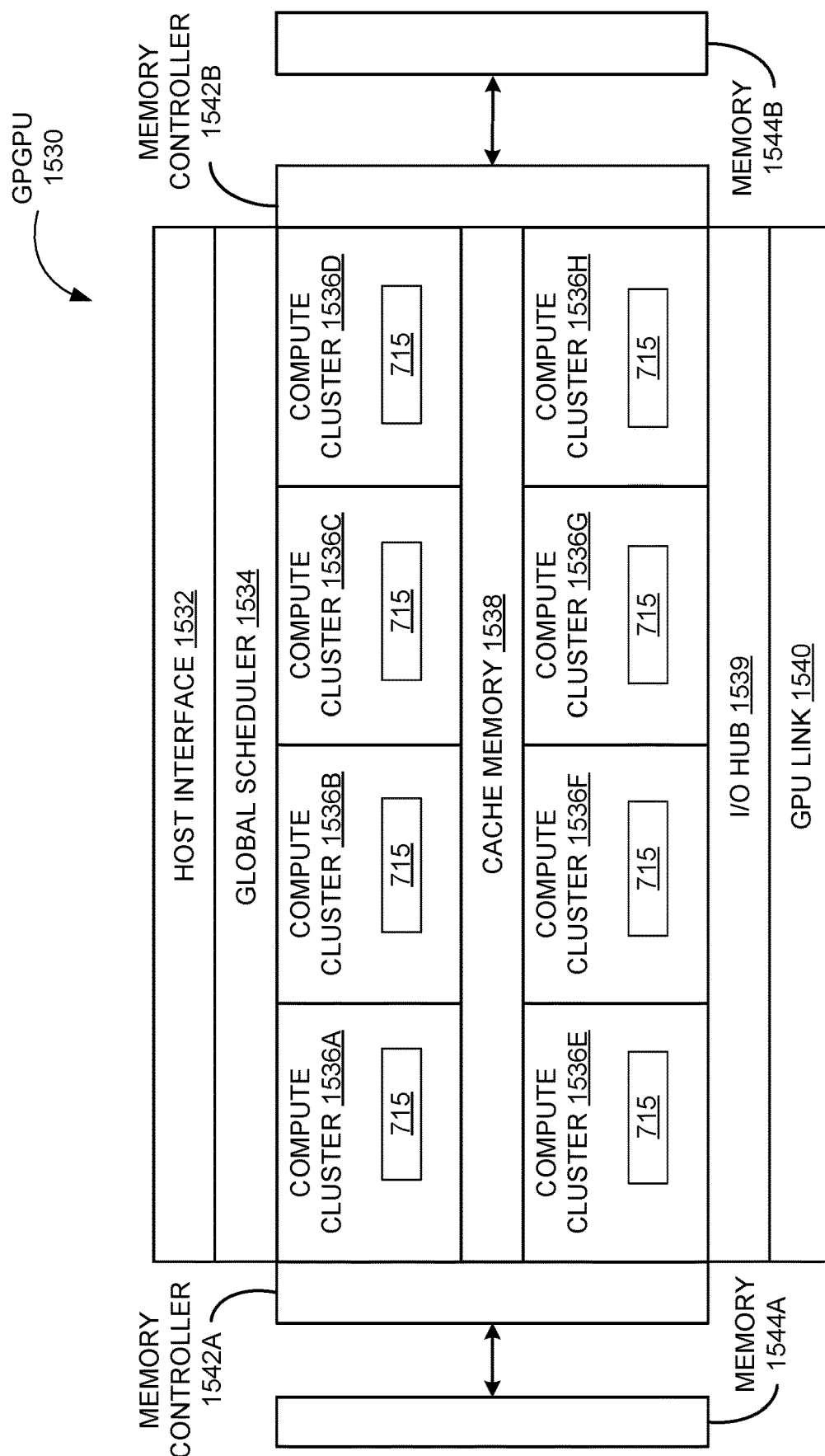

Embodiments presented herein can allow for session keys to be wrapped using a sequence of wrapping keys to provide a secure tunnel for transmission of the wrapped session keys FIGS. 15A-15B illustrate additional exemplary graphics processor logic according to embodiments described herein. FIG. 15A illustrates a graphics core 1500 that may be included within graphics processor 1310 of FIG. 13, in at least one embodiment, and may be a unified shader core 1455A-1455N as in FIG. 14B in at least one embodiment. FIG. 15B illustrates a highly-parallel general-purpose graphics processing unit ("GPGPU") 1530 suitable for deployment on a multi-chip module in at least one embodiment.

In at least one embodiment, graphics core 1500 includes a shared instruction cache 1502, a texture unit 1518, and a cache/shared memory 1520 (e.g., including L1, L2, L3, last level cache, or other caches) that are common to execution resources within graphics core 1500. In at least one embodiment, graphics core 1500 can include multiple slices 1501A-1501N or a partition for each core, and a graphics processor can include multiple instances of graphics core 1500. In at least one embodiment, each slice 1501A-1501N refers to graphics core 1500. In at least one embodiment, slices 1501A-1501N have sub-slices, which are part of a slice 1501A-1501N. In at least one embodiment, slices 1501A-1501N are independent of other slices or dependent on other slices. In at least one embodiment, slices 1501A-1501N can include support logic including a local instruction cache 1504A-1504N, a thread scheduler (sequencer) 1506A-1506N, a thread dispatcher 1508A-1508N, and a set of registers 1510A-1510N. In at least one embodiment, slices 1501A-1501N can include a set of additional function units (AFUs 1512A-1512N), floating-point units (FPUs 1514A-1514N), integer arithmetic logic units (ALUs 1516A-1516N), address computational units (ACUs 1513A-1513N), double-precision floating-point units (DPFPUs 1515A-1515N), and matrix processing units (MPUs 1517A-1517N).

In at least one embodiment, each slice 1501A-1501N includes one or more engines for floating point and integer vector operations and one or more engines to accelerate convolution and matrix operations in AI, machine learning, or large dataset workloads. In at least one embodiment, one or more slices 1501A-1501N include one or more vector engines to compute a vector (e.g., compute mathematical operations for vectors). In at least one embodiment, a vector engine can compute a vector operation in 16-bit floating point (also referred to as "FP16"), 32-bit floating point (also referred to as "FP32"), or 64-bit floating point (also referred to as "FP64"). In at least one embodiment, one or more slices 1501A-1501N includes 16 vector engines that are paired with 16 matrix math units to compute matrix/tensor operations, where vector engines and math units are exposed via matrix extensions. In at least one embodiment, a slice a specified portion of processing resources of a processing unit, e.g., 16 cores and a ray tracing unit or 8 cores, a thread scheduler, a thread dispatcher, and additional functional units for a processor. In at least one embodiment, graphics core 1500 includes one or more matrix engines to compute matrix operations, e.g., when computing tensor operations.

In at least one embodiment, one or more slices 1501A-1501N includes one or more ray tracing units to compute ray tracing operations (e.g., 16 ray tracing units per slice slices 1501A-1501N). In at least one embodiment, a ray tracing unit computes ray traversal, triangle intersection, bounding box intersect, or other ray tracing operations.

In at least one embodiment, one or more slices 1501A-1501N includes a media slice that encodes, decodes, and/or transcodes data; scales and/or format converts data; and/or performs video quality operations on video data.

In at least one embodiment, one or more slices 1501A-1501N are linked to L2 cache and memory fabric, link connectors, high-bandwidth memory (HBM) (e.g., HBM2e, HDM3) stacks, and a media engine. In at least one embodiment, one or more slices 1501A-1501N include multiple cores (e.g., 16 cores) and multiple ray tracing units (e.g., 16) paired to each core. In at least one embodiment, one or more slices 1501A-1501N has one or more L1 caches. In at least one embodiment, one or more slices 1501A-1501N include one or more vector engines; one or more instruction caches to store instructions; one or more L1 caches to cache data; one or more shared local memories (SLMs) to store data, e.g., corresponding to instructions; one or more samplers to sample data; one or more ray tracing units to perform ray tracing operations; one or more geometries to perform operations in geometry pipelines and/or apply geometric transformations to vertices or polygons; one or more rasterizers to describe an image in vector graphics format (e.g., shape) and convert it into a raster image (e.g., a series of pixels, dots, or lines, which when displayed together, create an image that is represented by shapes); one or more a Hierarchical Depth Buffer (Hiz) to buffer data; and/or one or more pixel backends. In at least one embodiment, a slice 1501A-1501N includes a memory fabric, e.g., an L2 cache.

In at least one embodiment, FPUs 1514A-1514N can perform single-precision (32-bit) and half-precision (16-bit) floating point operations, while DPFPUs 1515A-1515N perform double precision (64-bit) floating point operations. In at least one embodiment, ALUs 1516A-1516N can perform variable precision integer operations at 8-bit, 16-bit, and 32-bit precision, and can be configured for mixed precision operations. In at least one embodiment, MPUs 1517A-1517N can also be configured for mixed precision matrix operations, including half-precision floating point and 8-bit integer operations. In at least one embodiment, MPUs 1517-1517N can perform a variety of matrix operations to accelerate machine learning application frameworks, including enabling support for accelerated general matrix to matrix multiplication (GEMM). In at least one embodiment, AFUs 1512A-1512N can perform additional logic operations not supported by floating-point or integer units, including trigonometric operations (e.g., sine, cosInference and/or training logic 715 are used to perform inferencing and/or training operations associated with one or more embodiments. In at least one embodiment, inference and/or training logic 715 may be used in graphics core 1500 for inferencing or predicting operations based, at least in part, on weight parameters calculated using neural network training operations, neural network functions and/or architectures, or neural network use cases described herein.

In at least one embodiment, graphics core 1500 includes an interconnect and a link fabric sublayer that is attached to a switch and a GPU-GPU bridge that enables multiple graphics processors 1500 (e.g., 8) to be interlinked without glue to each other with load/store units (LSUs), data transfer units, and sync semantics across multiple graphics processors 1500. In at least one embodiment, interconnects include standardized interconnects (e.g., PCIe) or some combination thereof.

In at least one embodiment, graphics core 1500 includes multiple tiles. In at least one embodiment, a tile is an individual die or one or more dies, where individual dies can be connected with an interconnect (e.g., embedded multi-die interconnect bridge (EMIB)). In at least one embodiment, graphics core 1500 includes a compute tile, a memory tile (e.g., where a memory tile can be exclusively accessed by different tiles or different chipsets such as a Rambo tile), substrate tile, a base tile, a HMB tile, a link tile, and EMIB tile, where all tiles are packaged together in graphics core 1500 as part of a GPU. In at least one embodiment, graphics core 1500 can include multiple tiles in a single package (also referred to as a "multi tile package"). In at least one embodiment, a compute tile can have 8 graphics cores 1500, an L1 cache; and a base tile can have a host interface with PCIe 5.0, HBM2e, MDFI, and EMIB, a link tile with 8 links, 8 ports with an embedded switch. In at least one embodiment, tiles are connected with face-to-face (F2F) chip-on-chip bonding through fine-pitched, 36-micron, microbumps (e.g., copper pillars). In at least one embodiment, graphics core 1500 includes memory fabric, which includes memory, and is tile that is accessible by multiple tiles. In at least one embodiment, graphics core 1500 stores, accesses, or loads its own hardware contexts in memory, where a hardware context is a set of data loaded from registers before a process resumes, and where a hardware context can indicate a state of hardware (e.g., state of a GPU).

In at least one embodiment, graphics core 1500 includes serializer/deserializer (SERDES) circuitry that converts a serial data stream to a parallel data stream, or converts a parallel data stream to a serial data stream.

In at least one embodiment, graphics core 1500 includes a high speed coherent unified fabric (GPU to GPU), load/store units, bulk data transfer and sync semantics, and connected GPUs through an embedded switch, where a GPU-GPU bridge is controlled by a controller.

In at least one embodiment, graphics core 1500 performs an API, where said API abstracts hardware of graphics core 1500 and access libraries with instructions to perform math operations (e.g., math kernel library), deep neural network operations (e.g., deep neural network library), vector operations, collective communications, thread building blocks, video processing, data analytics library, and/or ray tracing operations.

Embodiments presented herein can allow for session keys to be wrapped using a sequence of wrapping keys to provide a secure tunnel for transmission of the wrapped session keys FIG. 15B illustrates a general-purpose processing unit (GPGPU) 1530 that can be configured to enable highly-parallel compute operations to be performed by an array of graphics processing units, in at least one embodiment. In at least one embodiment, GPGPU 1530 can be linked directly to other instances of GPGPU 1530 to create a multi-GPU cluster to improve training speed for deep neural networks. In at least one embodiment, GPGPU 1530 includes a host interface 1532 to enable a connection with a host processor. In at least one embodiment, host interface 1532 is a PCI Express interface. In at least one embodiment, host interface 1532 can be a vendor-specific communications interface or communications fabric. In at least one embodiment, GPGPU 1530 receives commands from a host processor and uses a global scheduler 1534 (which may be referred to as a thread sequencer and/or asynchronous compute engine) to distribute execution threads associated with those commands to a set of compute clusters 1536A-1536H. In at least one embodiment, compute clusters 1536A-1536H share a cache memory 1538. In at least one embodiment, cache memory 1538 can serve as a higher-level cache for cache memories within compute clusters 1536A-1536H.

In at least one embodiment, GPGPU 1530 includes memory 1544A-1544B coupled with compute clusters 1536A-1536H via a set of memory controllers 1542A-1542B (e.g., one or more controllers for HBM2e). In at least one embodiment, memory 1544A-1544B can include various types of memory devices including dynamic random access memory (DRAM) or graphics random access memory, such as synchronous graphics random access memory (SGRAM), including graphics double data rate (GDDR) memory.

In at least one embodiment, compute clusters 1536A-1536H each include a set of graphics cores, such as graphics core 1500 of FIG. 15A, which can include multiple types of integer and floating point logic units that can perform computational operations at a range of precisions including suited for machine learning computations. For example, in at least one embodiment, at least a subset of floating point units in each of compute clusters 1536A-1536H can be configured to perform 16-bit or 32-bit floating point operations, while a different subset of floating point units can be configured to perform 64-bit floating point operations.

In at least one embodiment, multiple instances of GPGPU 1530 can be configured to operate as a compute cluster. In at least one embodiment, communication used by compute clusters 1536A-1536H for synchronization and data exchange varies across embodiments. In at least one embodiment, multiple instances of GPGPU 1530 communicate over host interface 1532. In at least one embodiment, GPGPU 1530 includes an I/O hub 1539 that couples GPGPU 1530 with a GPU link 1540 that enables a direct connection to other instances of GPGPU 1530. In at least one embodiment, GPU link 1540 is coupled to a dedicated GPU-to-GPU bridge that enables communication and synchronization between multiple instances of GPGPU 1530. In at least one embodiment, GPU link 1540 couples with a high-speed interconnect to transmit and receive data to other GPGPUs or parallel processors. In at least one embodiment, multiple instances of GPGPU 1530 are located in separate data processing systems and communicate via a network device that is accessible via host interface 1532. In at least one embodiment GPU link 1540 can be configured to enable a connection to a host processor in addition to or as an alternative to host interface 1532.

In at least one embodiment, GPGPU 1530 can be configured to train neural networks. In at least one embodiment, GPGPU 1530 can be used within an inferencing platform. In at least one embodiment, in which GPGPU 1530 is used for inferencing, GPGPU 1530 may include fewer compute clusters 1536A-1536H relative to when GPGPU 1530 is used for training a neural network. In at least one embodiment, memory technology associated with memory 1544A-1544B may differ between inferencing and training configurations, with higher bandwidth memory technologies devoted to training configurations. In at least one embodiment, an inferencing configuration of GPGPU 1530 can support inferencing specific instructions. For example, in at least one embodiment, an inferencing configuration can provide support for one or more 8-bit integer dot product instructions, which may be used during inferencing operations for deployed neural networks.

Inference and/or training logic 715 are used to perform inferencing and/or training operations associated with one or more embodiments. In at least one embodiment, inference and/or training logic 715 may be used in GPGPU 1530 for inferencing or predicting operations based, at least in part, on weight parameters calculated using neural network training operations, neural network functions and/or architectures, or neural network use cases described herein.

Figure 16:
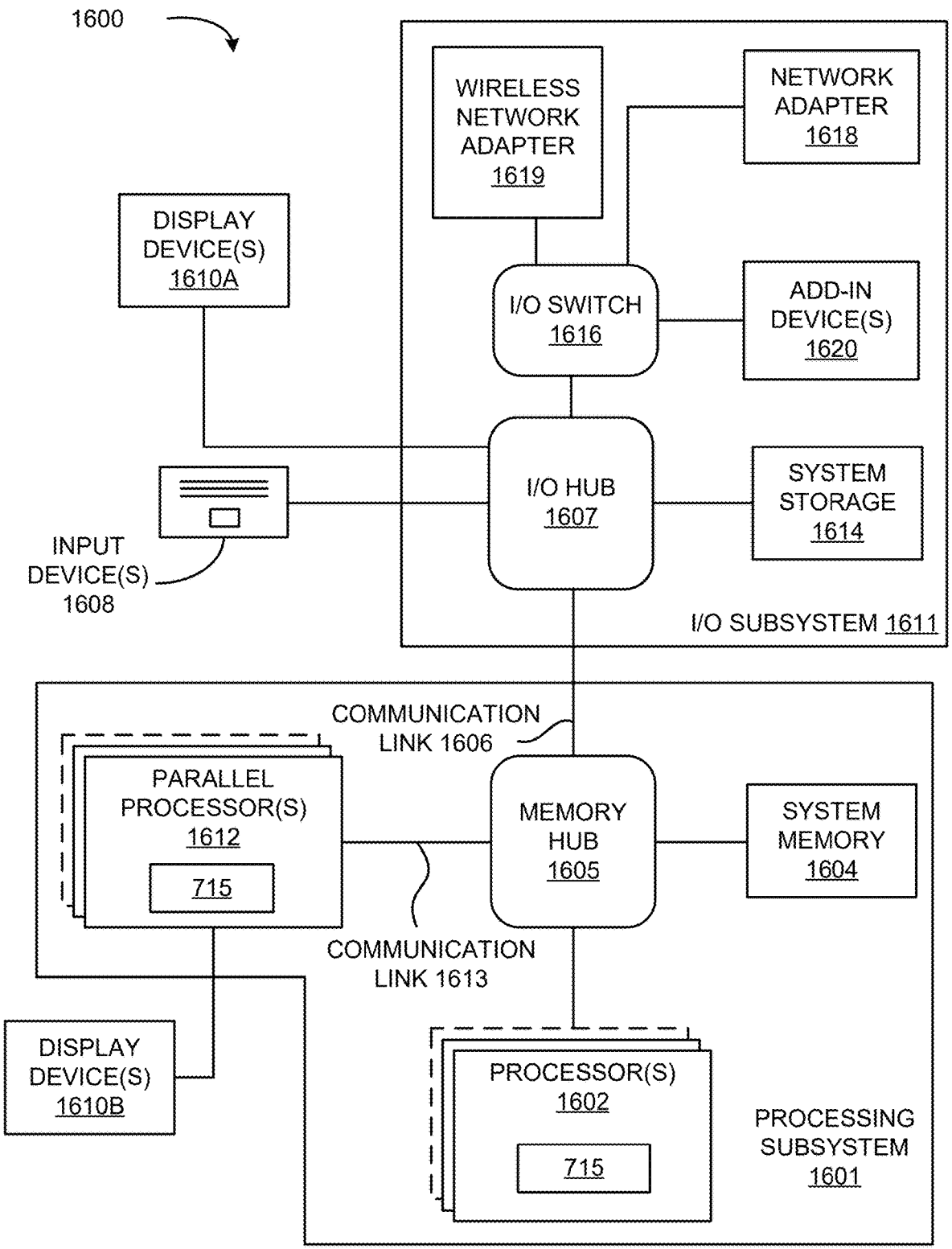
FIG. 16 illustrates a computer system, according to at least one embodiment.

Embodiments presented herein can allow for session keys to be wrapped using a sequence of wrapping keys to provide a secure tunnel for transmission of the wrapped session keys FIG. 16 is a block diagram illustrating a computing system 1600 according to at least one embodiment. In at least one embodiment, computing system 1600 includes a processing subsystem 1601 having one or more processor(s) 1602 and a system memory 1604 communicating via an interconnection path that may include a memory hub 1605. In at least one embodiment, memory hub 1605 may be a separate component within a chipset component or may be integrated within one or more processor(s) 1602. In at least one embodiment, memory hub 1605 couples with an I/O subsystem 1611 via a communication link 1606. In at least one embodiment, I/O subsystem 1611 includes an I/O hub 1607 that can enable computing system 1600 to receive input from one or more input device(s) 1608. In at least one embodiment, I/O hub 1607 can enable a display controller, which may be included in one or more processor(s) 1602, to provide outputs to one or more display device(s) 1610A. In at least one embodiment, one or more display device(s) 1610A coupled with I/O hub 1607 can include a local, internal, or embedded display device.

In at least one embodiment, processing subsystem 1601 includes one or more parallel processor(s) 1612 coupled to memory hub 1605 via a bus or other communication link 1613. In at least one embodiment, communication link 1613 may use one of any number of standards based communication link technologies or protocols, such as, but not limited to PCI Express, or may be a vendor-specific communications interface or communications fabric. In at least one embodiment, one or more parallel processor(s) 1612 form a computationally focused parallel or vector processing system that can include a large number of processing cores and/or processing clusters, such as a many-integrated core (MIC) processor. In at least one embodiment, some or all of parallel processor(s) 1612 form a graphics processing subsystem that can output pixels to one of one or more display device(s) 1610A coupled via I/O Hub 1607. In at least one embodiment, parallel processor(s) 1612 can also include a display controller and display interface (not shown) to enable a direct connection to one or more display device(s) 1610B. In at least one embodiment, parallel processor(s) 1612 include one or more cores, such as graphics cores 1500 discussed herein.

In at least one embodiment, a system storage unit 1614 can connect to I/O hub 1607 to provide a storage mechanism for computing system 1600. In at least one embodiment, an I/O switch 1616 can be used to provide an interface mechanism to enable connections between I/O hub 1607 and other components, such as a network adapter 1618 and/or a wireless network adapter 1619 that may be integrated into platform, and various other devices that can be added via one or more add-in device(s) 1620. In at least one embodiment, network adapter 1618 can be an Ethernet adapter or another wired network adapter. In at least one embodiment, wireless network adapter 1619 can include one or more of a Wi-Fi, Bluetooth, near field communication (NFC), or other network device that includes one or more wireless radios.

In at least one embodiment, computing system 1600 can include other components not explicitly shown, including USB or other port connections, optical storage drives, video capture devices, and like, may also be connected to I/O hub 1607. In at least one embodiment, communication paths interconnecting various components in FIG. 16 may be implemented using any suitable protocols, such as PCI (Peripheral Component Interconnect) based protocols (e.g., PCI-Express), or other bus or point-to-point communication interfaces and/or protocol(s), such as NV-Link high-speed interconnect, or interconnect protocols.

In at least one embodiment, parallel processor(s) 1612 incorporate circuitry optimized for graphics and video processing, including, for example, video output circuitry, and constitutes a graphics processing unit (GPU), e.g., parallel processor(s) 1612 includes graphics core 1500. In at least one embodiment, parallel processor(s) 1612 incorporate circuitry optimized for general purpose processing. In at least embodiment, components of computing system 1600 may be integrated with one or more other system elements on a single integrated circuit. For example, in at least one embodiment, parallel processor(s) 1612, memory hub 1605, processor(s) 1602, and I/O hub 1607 can be integrated into a system on chip (SoC) integrated circuit. In at least one embodiment, components of computing system 1600 can be integrated into a single package to form a system in package (SIP) configuration. In at least one embodiment, at least a portion of components of computing system 1600 can be integrated into a multi-chip module (MCM), which can be interconnected with other multi-chip modules into a modular computing system.

Inference and/or training logic 715 are used to perform inferencing and/or training operations associated with one or more embodiments. In at least one embodiment, inference and/or training logic 715 may be used in computing system 1600 for inferencing or predicting operations based, at least in part, on weight parameters calculated using neural network training operations, neural network functions and/or architectures, or neural network use cases described herein.

Figure 17A:
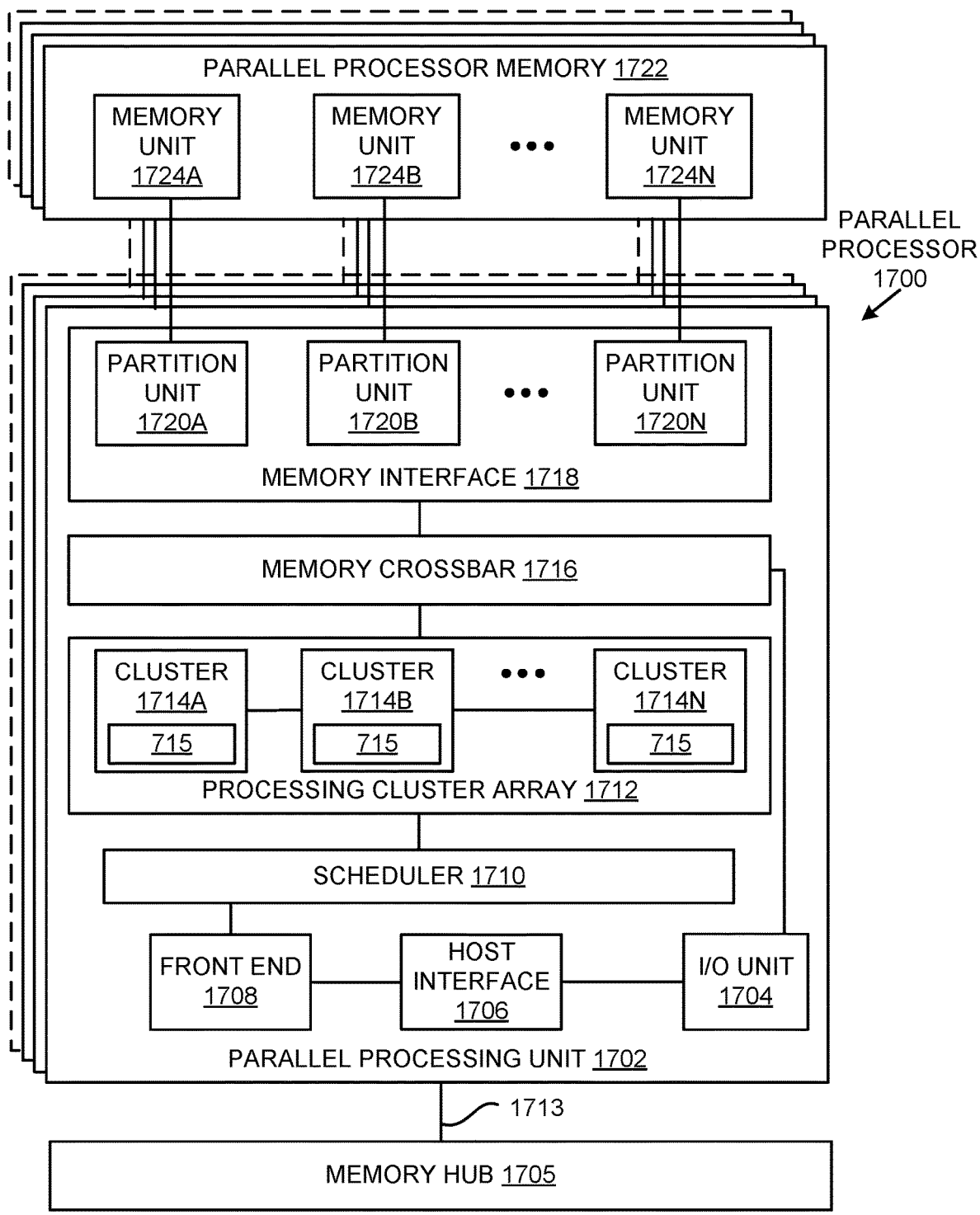
FIG. 17A illustrates a parallel processor, according to at least one embodiment.

Embodiments presented herein can allow for session keys to be wrapped using a sequence of wrapping keys to provide a secure tunnel for transmission of the wrapped session keys Processors FIG. 17A illustrates a parallel processor 1700 according to at least one embodiment. In at least one embodiment, various components of parallel processor 1700 may be implemented using one or more integrated circuit devices, such as programmable processors, application specific integrated circuits (ASICs), or field programmable gate arrays (FPGA). In at least one embodiment, illustrated parallel processor 1700 is a variant of one or more parallel processor(s) 1612 shown in FIG. 16 according to an exemplary embodiment. In at least one embodiment, a parallel processor 1700 includes one or more graphics cores 1500.

In at least one embodiment, parallel processor 1700 includes a parallel processing unit 1702. In at least one embodiment, parallel processing unit 1702 includes an I/O unit 1704 that enables communication with other devices, including other instances of parallel processing unit 1702. In at least one embodiment, I/O unit 1704 may be directly connected to other devices. In at least one embodiment, I/O unit 1704 connects with other devices via use of a hub or switch interface, such as a memory hub 1705. In at least one embodiment, connections between memory hub 1705 and I/O unit 1704 form a communication link 1713. In at least one embodiment, I/O unit 1704 connects with a host interface 1706 and a memory crossbar 1716, where host interface 1706 receives commands directed to performing processing operations and memory crossbar 1716 receives commands directed to performing memory operations.

In at least one embodiment, when host interface 1706 receives a command buffer via I/O unit 1704, host interface 1706 can direct work operations to perform those commands to a front end 1708. In at least one embodiment, front end 1708 couples with a scheduler 1710 (which may be referred to as a sequencer), which is configured to distribute commands or other work items to a processing cluster array 1712. In at least one embodiment, scheduler 1710 ensures that processing cluster array 1712 is properly configured and in a valid state before tasks are distributed to a cluster of processing cluster array 1712. In at least one embodiment, scheduler 1710 is implemented via firmware logic executing on a microcontroller. In at least one embodiment, microcontroller implemented scheduler 1710 is configurable to perform complex scheduling and work distribution operations at coarse and fine granularity, enabling rapid preemption and context switching of threads executing on processing array 1712. In at least one embodiment, host software can prove workloads for scheduling on processing cluster array 1712 via one of multiple graphics processing paths. In at least one embodiment, workloads can then be automatically distributed across processing array cluster 1712 by scheduler 1710 logic within a microcontroller including scheduler 1710.

In at least one embodiment, processing cluster array 1712 can include up to "N" processing clusters (e.g., cluster 1714A, cluster 1714B, through cluster 1714N), where "N" represents a positive integer (which may be a different integer "N" than used in other figures). In at least one embodiment, each cluster 1714A-1714N of processing cluster array 1712 can execute a large number of concurrent threads. In at least one embodiment, scheduler 1710 can allocate work to clusters 1714A-1714N of processing cluster array 1712 using various scheduling and/or work distribution algorithms, which may vary depending on workload arising for each type of program or computation. In at least one embodiment, scheduling can be handled dynamically by scheduler 1710, or can be assisted in part by compiler logic during compilation of program logic configured for execution by processing cluster array 1712. In at least one embodiment, different clusters 1714A-1714N of processing cluster array 1712 can be allocated for processing different types of programs or for performing different types of computations.

In at least one embodiment, processing cluster array 1712 can be configured to perform various types of parallel processing operations. In at least one embodiment, processing cluster array 1712 is configured to perform general-purpose parallel compute operations. For example, in at least one embodiment, processing cluster array 1712 can include logic to execute processing tasks including filtering of video and/or audio data, performing modeling operations, including physics operations, and performing data transformations.

In at least one embodiment, processing cluster array 1712 is configured to perform parallel graphics processing operations. In at least one embodiment, processing cluster array 1712 can include additional logic to support execution of such graphics processing operations, including but not limited to, texture sampling logic to perform texture operations, as well as tessellation logic and other vertex processing logic. In at least one embodiment, processing cluster array 1712 can be configured to execute graphics processing related shader programs such as, but not limited to, vertex shaders, tessellation shaders, geometry shaders, and pixel shaders. In at least one embodiment, parallel processing unit 1702 can transfer data from system memory via I/O unit 1704 for processing. In at least one embodiment, during processing, transferred data can be stored to on-chip memory (e.g., parallel processor memory 1722) during processing, then written back to system memory.

In at least one embodiment, when parallel processing unit 1702 is used to perform graphics processing, scheduler 1710 can be configured to divide a processing workload into approximately equal sized tasks, to better enable distribution of graphics processing operations to multiple clusters 1714A-1714N of processing cluster array 1712. In at least one embodiment, portions of processing cluster array 1712 can be configured to perform different types of processing. For example, in at least one embodiment, a first portion may be configured to perform vertex shading and topology generation, a second portion may be configured to perform tessellation and geometry shading, and a third portion may be configured to perform pixel shading or other screen space operations, to produce a rendered image for display. In at least one embodiment, intermediate data produced by one or more of clusters 1714A-1714N may be stored in buffers to allow intermediate data to be transmitted between clusters 1714A-1714N for further processing.

In at least one embodiment, processing cluster array 1712 can receive processing tasks to be executed via scheduler 1710, which receives commands defining processing tasks from front end 1708. In at least one embodiment, processing tasks can include indices of data to be processed, e.g., surface (patch) data, primitive data, vertex data, and/or pixel data, as well as state parameters and commands defining how data is to be processed (e.g., what program is to be executed). In at least one embodiment, scheduler 1710 may be configured to fetch indices corresponding to tasks or may receive indices from front end 1708. In at least one embodiment, front end 1708 can be configured to ensure processing cluster array 1712 is configured to a valid state before a workload specified by incoming command buffers (e.g., batch-buffers, push buffers, etc.) is initiated.

In at least one embodiment, each of one or more instances of parallel processing unit 1702 can couple with a parallel processor memory 1722. In at least one embodiment, parallel processor memory 1722 can be accessed via memory crossbar 1716, which can receive memory requests from processing cluster array 1712 as well as I/O unit 1704. In at least one embodiment, memory crossbar 1716 can access parallel processor memory 1722 via a memory interface 1718. In at least one embodiment, memory interface 1718 can include multiple partition units (e.g., partition unit 1720A, partition unit 1720B, through partition unit 1720N) that can each couple to a portion (e.g., memory unit) of parallel processor memory 1722. In at least one embodiment, a number of partition units 1720A-1720N is configured to be equal to a number of memory units, such that a first partition unit 1720A has a corresponding first memory unit 1724A, a second partition unit 1720B has a corresponding memory unit 1724B, and an N-th partition unit 1720N has a corresponding N-th memory unit 1724N. In at least one embodiment, a number of partition units 1720A-1720N may not be equal to a number of memory units.

In at least one embodiment, memory units 1724A-1724N can include various types of memory devices, including dynamic random access memory (DRAM) or graphics random access memory, such as synchronous graphics random access memory (SGRAM), including graphics double data rate (GDDR) memory. In at least one embodiment, memory units 1724A-1724N may also include 3D stacked memory, including but not limited to high bandwidth memory (HBM), HBM2e, or HDM3. In at least one embodiment, render targets, such as frame buffers or texture maps may be stored across memory units 1724A-1724N, allowing partition units 1720A-1720N to write portions of each render target in parallel to efficiently use available bandwidth of parallel processor memory 1722. In at least one embodiment, a local instance of parallel processor memory 1722 may be excluded in favor of a unified memory design that utilizes system memory in conjunction with local cache memory.

In at least one embodiment, any one of clusters 1714A-1714N of processing cluster array 1712 can process data that will be written to any of memory units 1724A-1724N within parallel processor memory 1722. In at least one embodiment, memory crossbar 1716 can be configured to transfer an output of each cluster 1714A-1714N to any partition unit 1720A-1720N or to another cluster 1714A-1714N, which can perform additional processing operations on an output. In at least one embodiment, each cluster 1714A-1714N can communicate with memory interface 1718 through memory crossbar 1716 to read from or write to various external memory devices. In at least one embodiment, memory crossbar 1716 has a connection to memory interface 1718 to communicate with I/O unit 1704, as well as a connection to a local instance of parallel processor memory 1722, enabling processing units within different processing clusters 1714A-1714N to communicate with system memory or other memory that is not local to parallel processing unit 1702. In at least one embodiment, memory crossbar 1716 can use virtual channels to separate traffic streams between clusters 1714A-1714N and partition units 1720A-1720N.

In at least one embodiment, multiple instances of parallel processing unit 1702 can be provided on a single add-in card, or multiple add-in cards can be interconnected. In at least one embodiment, different instances of parallel processing unit 1702 can be configured to interoperate even if different instances have different numbers of processing cores, different amounts of local parallel processor memory, and/or other configuration differences. For example, in at least one embodiment, some instances of parallel processing unit 1702 can include higher precision floating point units relative to other instances. In at least one embodiment, systems incorporating one or more instances of parallel processing unit 1702 or parallel processor 1700 can be implemented in a variety of configurations and form factors, including but not limited to desktop, laptop, or handheld personal computers, servers, workstations, game consoles, and/or embedded systems.

Figure 17B:
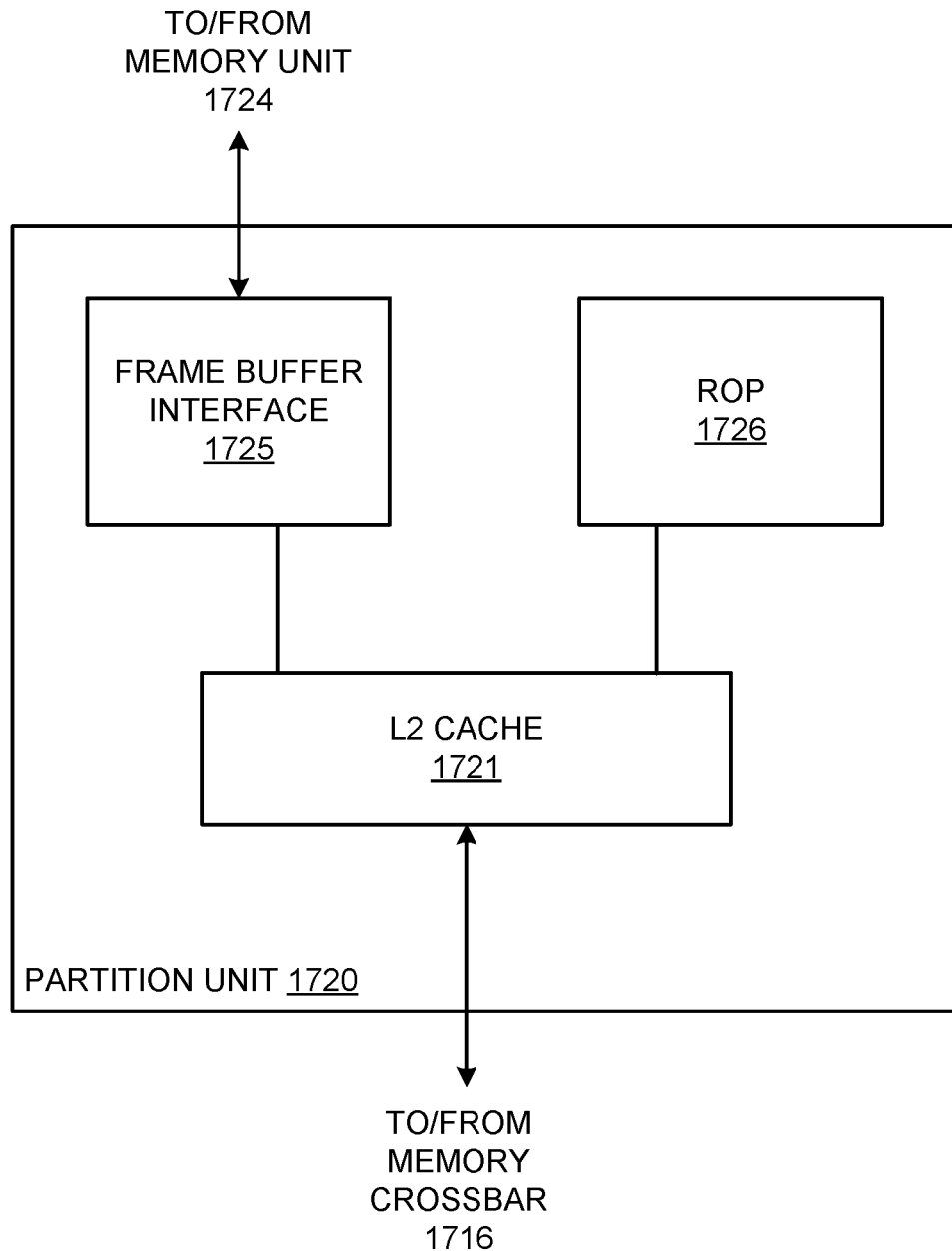
FIG. 17B illustrates a partition unit, according to at least one embodiment.

FIG. 17B is a block diagram of a partition unit 1720 according to at least one embodiment. In at least one embodiment, partition unit 1720 is an instance of one of partition units 1720A-1720N of FIG. 17A. In at least one embodiment, partition unit 1720 includes an L2 cache 1721, a frame buffer interface 1725, and a ROP 1726 (raster operations unit). In at least one embodiment, L2 cache 1721 is a read/write cache that is configured to perform load and store operations received from memory crossbar 1716 and ROP 1726. In at least one embodiment, read misses and urgent write-back requests are output by L2 cache 1721 to frame buffer interface 1725 for processing. In at least one embodiment, updates can also be sent to a frame buffer via frame buffer interface 1725 for processing. In at least one embodiment, frame buffer interface 1725 interfaces with one of memory units in parallel processor memory, such as memory units 1724A-1724N of FIG. 17A (e.g., within parallel processor memory 1722).

In at least one embodiment, ROP 1726 is a processing unit that performs raster operations such as stencil, z test, blending, etc. In at least one embodiment, ROP 1726 then outputs processed graphics data that is stored in graphics memory. In at least one embodiment, ROP 1726 includes compression logic to compress depth or color data that is written to memory and decompress depth or color data that is read from memory. In at least one embodiment, compression logic can be lossless compression logic that makes use of one or more of multiple compression algorithms. In at least one embodiment, a type of compression that is performed by ROP 1726 can vary based on statistical characteristics of data to be compressed. For example, in at least one embodiment, delta color compression is performed on depth and color data on a per-tile basis.

In at least one embodiment, ROP 1726 is included within each processing cluster (e.g., cluster 1714A-1714N of FIG. 17A) instead of within partition unit 1720. In at least one embodiment, read and write requests for pixel data are transmitted over memory crossbar 1716 instead of pixel fragment data. In at least one embodiment, processed graphics data may be displayed on a display device, such as one of one or more display device(s) 1610 of FIG. 16, routed for further processing by processor(s) 1602, or routed for further processing by one of processing entities within parallel processor 1700 of FIG. 17A.

Figure 18:
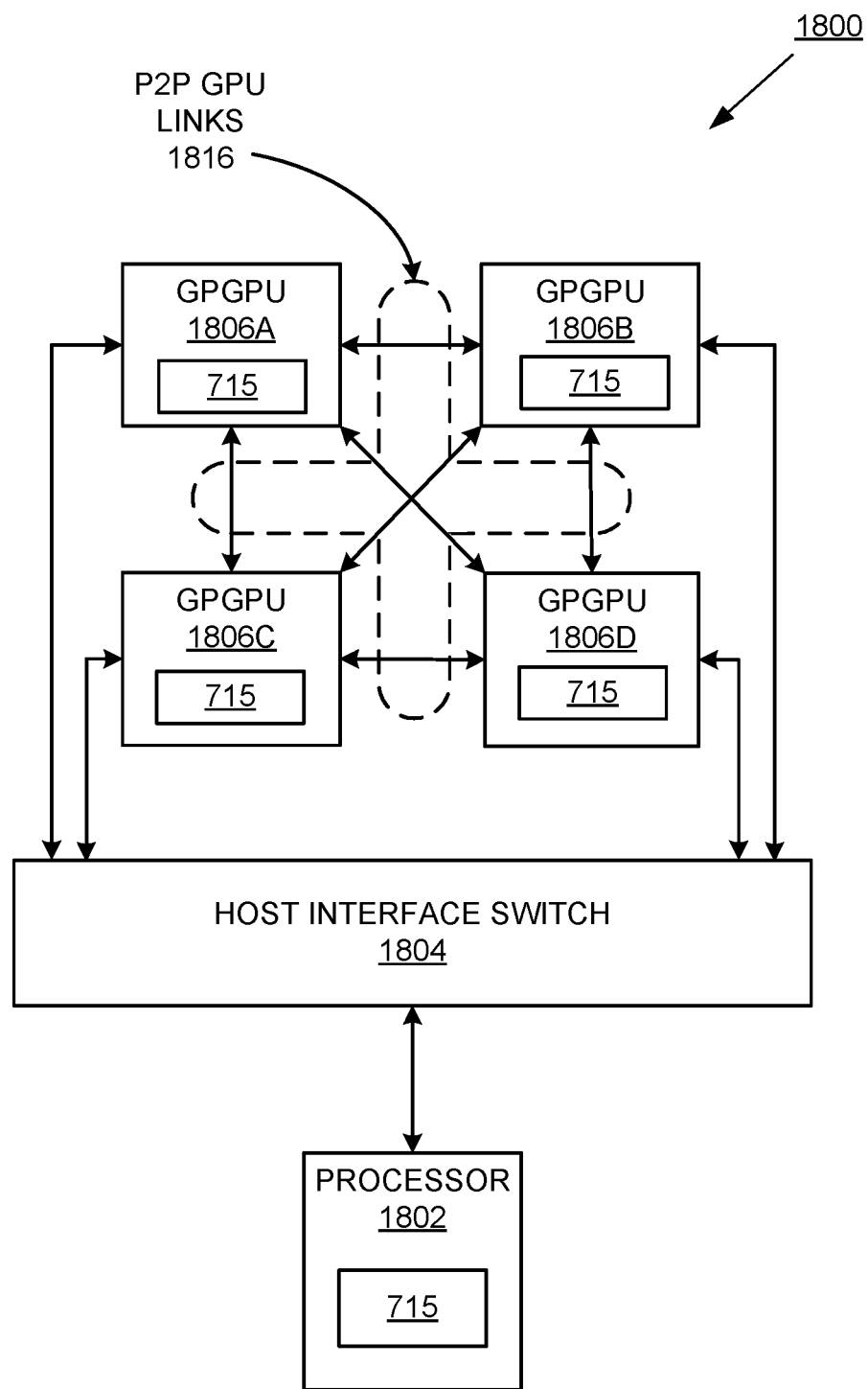
FIG. 18 illustrates a multi-graphics processing unit (GPU) system, according to at least one embodiment.

FIG. 18 illustrates a multi-GPU computing system 1800, according to at least one embodiment. In at least one embodiment, multi-GPU computing system 1800 can include a processor 1802 coupled to multiple general purpose graphics processing units (GPGPUs) 1806A-D via a host interface switch 1804. In at least one embodiment, host interface switch 1804 is a PCI express switch device that couples processor 1802 to a PCI express bus over which processor 1802 can communicate with GPGPUs 1806A-D. In at least one embodiment, GPGPUs 1806A-D can interconnect via a set of high-speed point-to-point GPU-to-GPU links 1816. In at least one embodiment, GPU-to-GPU links 1816 connect to each of GPGPUs 1806A-D via a dedicated GPU link. In at least one embodiment, P2P GPU links 1816 enable direct communication between each of GPGPUs 1806A-D without requiring communication over host interface bus 1804 to which processor 1802 is connected. In at least one embodiment, with GPU-to-GPU traffic directed to P2P GPU links 1816, host interface bus 1804 remains available for system memory access or to communicate with other instances of multi-GPU computing system 1800, for example, via one or more network devices. While in at least one embodiment GPGPUs 1806A-D connect to processor 1802 via host interface switch 1804, in at least one embodiment processor 1802 includes direct support for P2P GPU links 1816 and can connect directly to GPGPUs 1806A-D.

Figure 19:
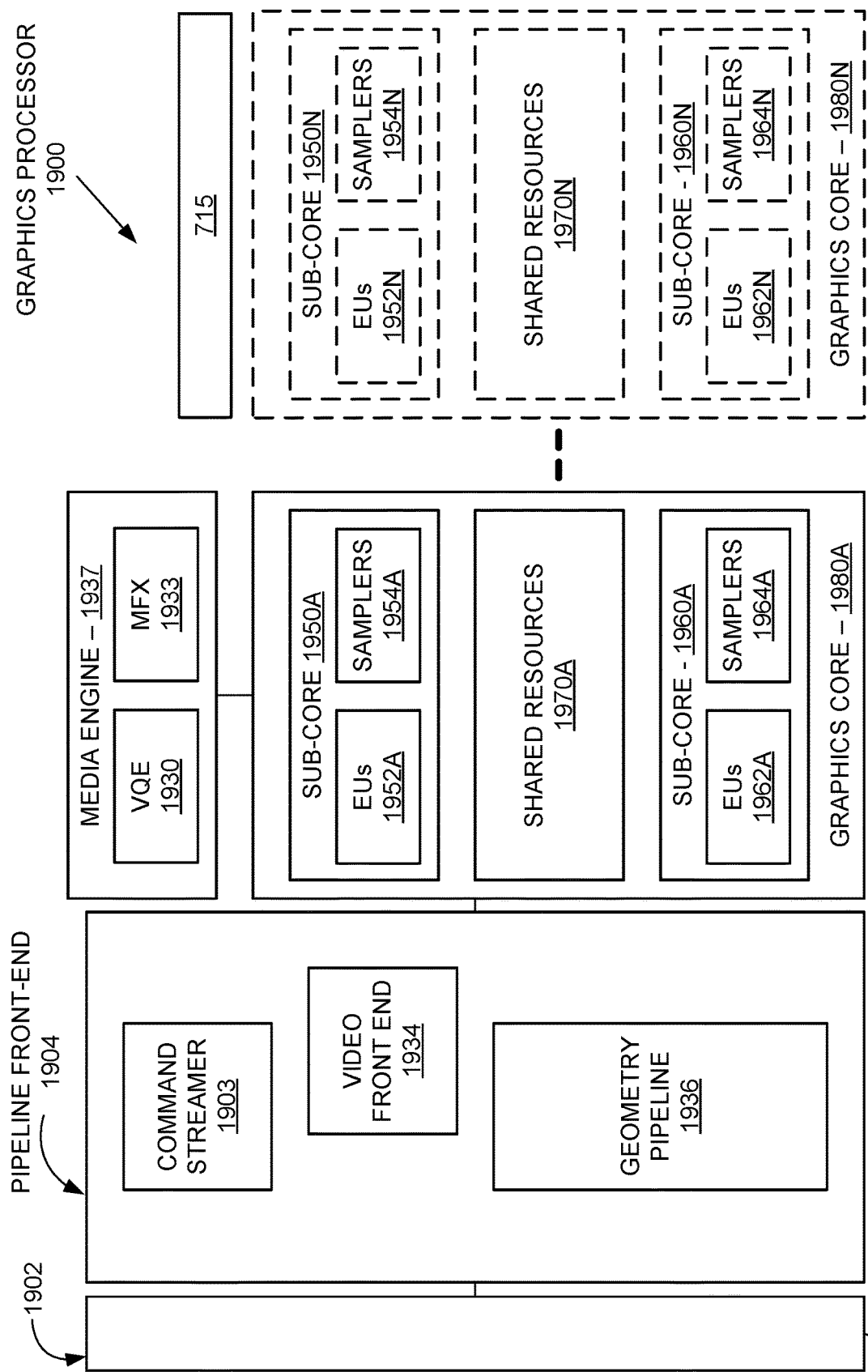
FIG. 19 illustrates a graphics processor, according to at least one embodiment.

Inference and/or training logic 715 are used to perform inferencing and/or training operations associated with one or more embodiments. In at least one embodiment, inference and/or training logic 715 may be used in multi-GPU computing system 1800 for inferencing or predicting operations based, at least in part, on weight parameters calculated using neural network training operations, neural network functions and/or architectures, or neural network use cases described herein. In at least one embodiment, multi-GPU computing system 1800 includes one or more graphics cores 1500.
Embodiments presented herein can allow for session keys to be wrapped using a sequence of wrapping keys to provide a secure tunnel for transmission of the wrapped session keys FIG. 19 is a block diagram of a graphics processor 1900, according to at least one embodiment. In at least one embodiment, graphics processor 1900 includes a ring interconnect 1902, a pipeline front-end 1904, a media engine 1937, and graphics cores 1980A-1980N. In at least one embodiment, ring interconnect 1902 couples graphics processor 1900 to other processing units, including other graphics processors or one or more general-purpose processor cores. In at least one embodiment, graphics processor 1900 is one of many processors integrated within a multi-core processing system. In at least one embodiment, graphics processor 1900 includes graphics core 1500.

In at least one embodiment, graphics processor 1900 receives batches of commands via ring interconnect 1902. In at least one embodiment, incoming commands are interpreted by a command streamer 1903 in pipeline front-end 1904. In at least one embodiment, graphics processor 1900 includes scalable execution logic to perform 3D geometry processing and media processing via graphics core(s) 1980A-1980N. In at least one embodiment, for 3D geometry processing commands, command streamer 1903 supplies commands to geometry pipeline 1936. In at least one embodiment, for at least some media processing commands, command streamer 1903 supplies commands to a video front end 1934, which couples with media engine 1937. In at least one embodiment, media engine 1937 includes a Video Quality Engine (VQE) 1930 for video and image post-processing and a multi-format encode/decode (MFX) 1933 engine to provide hardware-accelerated media data encoding and decoding. In at least one embodiment, geometry pipeline 1936 and media engine 1937 each generate execution threads for thread execution resources provided by at least one graphics core 1980.

In at least one embodiment, graphics processor 1900 includes scalable thread execution resources featuring graphics cores 1980A-1980N (which can be modular and are sometimes referred to as core slices), each having multiple sub-cores 1950A-50N, 1960A-1960N (sometimes referred to as core sub-slices). In at least one embodiment, graphics processor 1900 can have any number of graphics cores 1980A. In at least one embodiment, graphics processor 1900 includes a graphics core 1980A having at least a first sub-core 1950A and a second sub-core 1960A. In at least one embodiment, graphics processor 1900 is a low power processor with a single sub-core (e.g., 1950A). In at least one embodiment, graphics processor 1900 includes multiple graphics cores 1980A-1980N, each including a set of first sub-cores 1950A-1950N and a set of second sub-cores 1960A-1960N. In at least one embodiment, each sub-core in first sub-cores 1950A-1950N includes at least a first set of execution units 1952A-1952N and media/texture samplers 1954A-1954N. In at least one embodiment, each sub-core in second sub-cores 1960A-1960N includes at least a second set of execution units 1962A-1962N and samplers 1964A-1964N. In at least one embodiment, each sub-core 1950A-1950N, 1960A-1960N shares a set of shared resources 1970A-1970N. In at least one embodiment, shared resources include shared cache memory and pixel operation logic. In at least one embodiment, graphics processor 1900 includes load/store units in pipeline front-end 1904.

Figure 20:
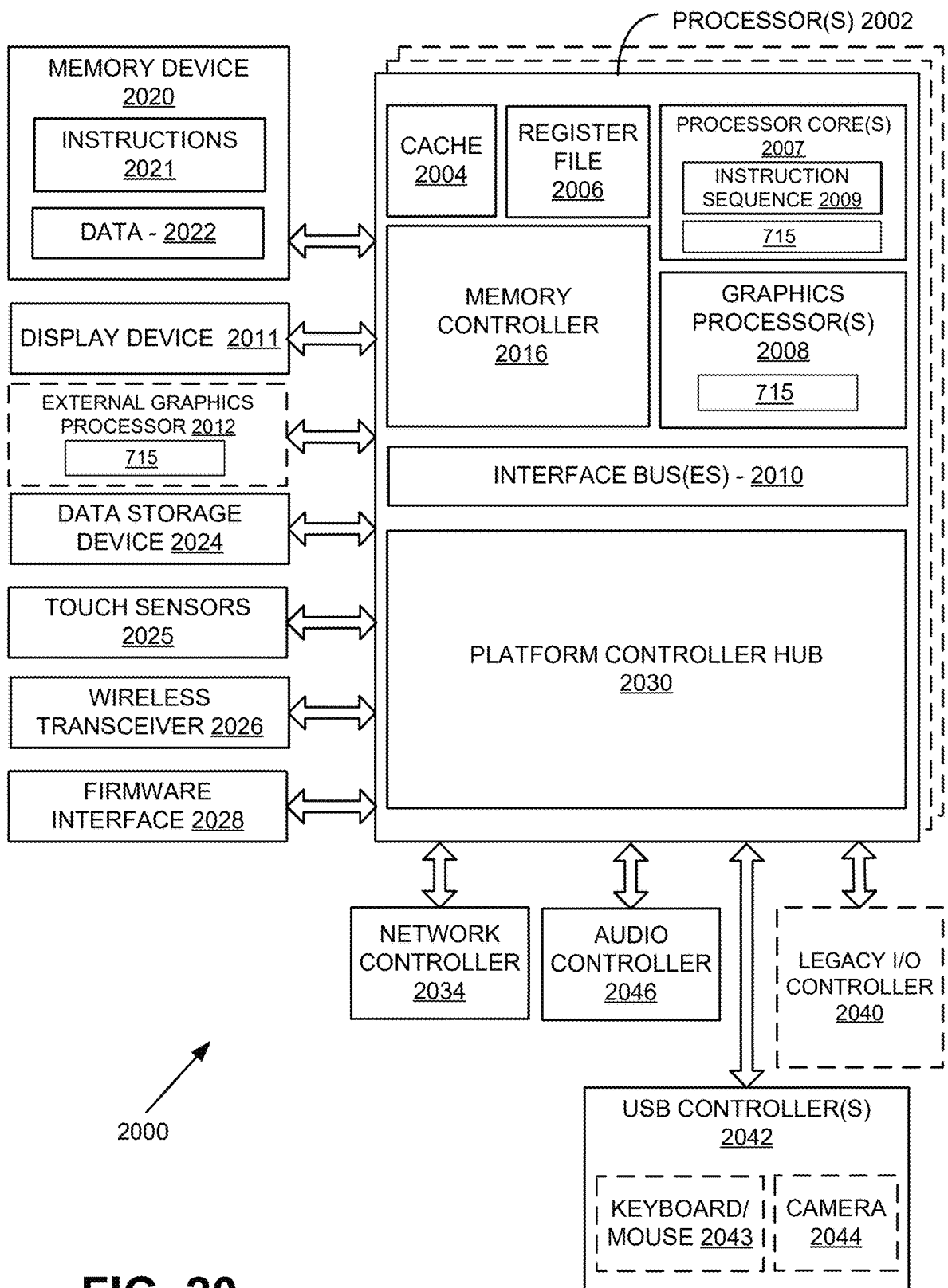
FIG. 20 illustrates at least portions of a graphics processor, according to one or more embodiments.

Inference and/or training logic 715 are used to perform inferencing and/or training operations associated with one or more embodiments. In at least one embodiment, inference and/or training logic 715 may be used in graphics processor 1900 for inferencing or predicting operations based, at least in part, on weight parameters calculated using neural network training operations, neural network functions and/or architectures, or neural network use cases described herein. Embodiments presented herein can allow for session keys to be wrapped using a sequence of wrapping keys to provide a secure tunnel for transmission of the wrapped session keys FIG. 20 is a block diagram of a processing system, according to at least one embodiment. In at least one embodiment, system 2000 includes one or more processors 2002 and one or more graphics processors 2008, and may be a single processor desktop system, a multiprocessor workstation system, or a server system having a large number of processors 2002 or processor cores 2007. In at least one embodiment, system 2000 is a processing platform incorporated within a system-on-a-chip (SoC) integrated circuit for use in mobile, handheld, or embedded devices. In at least one embodiment, one or more graphics processors 2008 include one or more graphics cores 1500.

In at least one embodiment, system 2000 can include, or be incorporated within a server-based gaming platform, a game console, including a game and media console, a mobile gaming console, a handheld game console, or an online game console. In at least one embodiment, system 2000 is a mobile phone, a smart phone, a tablet computing device or a mobile Internet device. In at least one embodiment, processing system 2000 can also include, couple with, or be integrated within a wearable device, such as a smart watch wearable device, a smart eyewear device, an augmented reality device, or a virtual reality device. In at least one embodiment, processing system 2000 is a television or set top box device having one or more processors 2002 and a graphical interface generated by one or more graphics processors 2008.

In at least one embodiment, one or more processors 2002 each include one or more processor cores 2007 to process instructions which, when executed, perform operations for system and user software. In at least one embodiment, each of one or more processor cores 2007 is configured to process a specific instruction sequence 2009. In at least one embodiment, instruction sequence 2009 may facilitate Complex Instruction Set Computing (CISC), Reduced Instruction Set Computing (RISC), or computing via a Very Long Instruction Word (VLIW). In at least one embodiment, processor cores 2007 may each process a different instruction sequence 2009, which may include instructions to facilitate emulation of other instruction sequences. In at least one embodiment, processor core 2007 may also include other processing devices, such a Digital Signal Processor (DSP).

In at least one embodiment, processor 2002 includes a cache memory 2004. In at least one embodiment, processor 2002 can have a single internal cache or multiple levels of internal cache. In at least one embodiment, cache memory is shared among various components of processor 2002. In at least one embodiment, processor 2002 also uses an external cache (e.g., a Level-3 (L3) cache or Last Level Cache (LLC)) (not shown), which may be shared among processor cores 2007 using known cache coherency techniques. In at least one embodiment, a register file 2006 is additionally included in processor 2002, which may include different types of registers for storing different types of data (e.g., integer registers, floating point registers, status registers, and an instruction pointer register). In at least one embodiment, register file 2006 may include general-purpose registers or other registers.

In at least one embodiment, one or more processor(s) 2002 are coupled with one or more interface bus(es) 2010 to transmit communication signals such as address, data, or control signals between processor 2002 and other components in system 2000. In at least one embodiment, interface bus 2010 can be a processor bus, such as a version of a Direct Media Interface (DMI) bus. In at least one embodiment, interface bus 2010 is not limited to a DMI bus, and may include one or more Peripheral Component Interconnect buses (e.g., PCI, PCI Express), memory busses, or other types of interface busses. In at least one embodiment processor(s) 2002 include an integrated memory controller 2016 and a platform controller hub 2030. In at least one embodiment, memory controller 2016 facilitates communication between a memory device and other components of system 2000, while platform controller hub (PCH) 2030 provides connections to I/O devices via a local I/O bus.

In at least one embodiment, a memory device 2020 can be a dynamic random access memory (DRAM) device, a static random access memory (SRAM) device, flash memory device, phase-change memory device, or some other memory device having suitable performance to serve as process memory. In at least one embodiment, memory device 2020 can operate as system memory for system 2000, to store data 2022 and instructions 2021 for use when one or more processors 2002 executes an application or process. In at least one embodiment, memory controller 2016 also couples with an optional external graphics processor 2012, which may communicate with one or more graphics processors 2008 in processors 2002 to perform graphics and media operations. In at least one embodiment, a display device 2011 can connect to processor(s) 2002. In at least one embodiment, display device 2011 can include one or more of an internal display device, as in a mobile electronic device or a laptop device, or an external display device attached via a display interface (e.g., DisplayPort, etc.). In at least one embodiment, display device 2011 can include a head mounted display (HMD) such as a stereoscopic display device for use in virtual reality (VR) applications or augmented reality (AR) applications.

In at least one embodiment, platform controller hub 2030 enables peripherals to connect to memory device 2020 and processor 2002 via a high-speed I/O bus. In at least one embodiment, I/O peripherals include, but are not limited to, an audio controller 2046, a network controller 2034, a firmware interface 2028, a wireless transceiver 2026, touch sensors 2025, a data storage device 2024 (e.g., hard disk drive, flash memory, etc.). In at least one embodiment, data storage device 2024 can connect via a storage interface (e.g., SATA) or via a peripheral bus, such as a Peripheral Component Interconnect bus (e.g., PCI, PCI Express). In at least one embodiment, touch sensors 2025 can include touch screen sensors, pressure sensors, or fingerprint sensors. In at least one embodiment, wireless transceiver 2026 can be a Wi-Fi transceiver, a Bluetooth transceiver, or a mobile network transceiver such as a 3G, 4G, or Long Term Evolution (LTE) transceiver. In at least one embodiment, firmware interface 2028 enables communication with system firmware, and can be, for example, a unified extensible firmware interface (UEFI). In at least one embodiment, network controller 2034 can enable a network connection to a wired network. In at least one embodiment, a high-performance network controller (not shown) couples with interface bus 2010. In at least one embodiment, audio controller 2046 is a multi-channel high definition audio controller. In at least one embodiment, system 2000 includes an optional legacy I/O controller 2040 for coupling legacy (e.g., Personal System 2 (PS/2)) devices to system 2000. In at least one embodiment, platform controller hub 2030 can also connect to one or more Universal Serial Bus (USB) controllers 2042 connect input devices, such as keyboard and mouse 2043 combinations, a camera 2044, or other USB input devices.

In at least one embodiment, an instance of memory controller 2016 and platform controller hub 2030 may be integrated into a discreet external graphics processor, such as external graphics processor 2012. In at least one embodiment, platform controller hub 2030 and/or memory controller 2016 may be external to one or more processor(s) 2002. For example, in at least one embodiment, system 2000 can include an external memory controller 2016 and platform controller hub 2030, which may be configured as a memory controller hub and peripheral controller hub within a system chipset that is in communication with processor(s) 2002.

Inference and/or training logic 715 are used to perform inferencing and/or training operations associated with one or more embodiments. In at least one embodiment portions or all of inference and/or training logic 715 may be incorporated into graphics processor 2008. For example, in at least one embodiment, training and/or inferencing techniques described herein may use one or more of ALUs embodied in a 3D pipeline. In at least one embodiment, weight parameters may be stored in on-chip or off-chip memory and/or registers (shown or not shown) that configure ALUs of graphics processor 2008 to perform one or more machine learning algorithms, neural network architectures, use cases, or training techniques described herein.

Embodiments presented herein can allow for session keys to be wrapped using a sequence of wrapping keys to provide a secure tunnel for transmission of the wrapped session keys At least one embodiment of the disclosure can be described in view of the following clauses:

1. A method, comprising:
   generating a session key using a software agent executing on a secure processor in a computing device;
   encrypting the session key using a wrapping key generated using the secure processor;
   transmitting the session key, encrypted using the wrapping key, over a system bus in the computing device;
   decrypting, at a secure key unwrap engine implemented in hardware of the computing device and receiving the session key, the session key using the wrapping key; and
   delivering the session key, in plaintext, to an inline crypto engine executing on the computing device, wherein the inline crypto-engine is allowed to use the session key to encrypt session data to be transmitted to a second device.
2. The method of clause 1, wherein the wrapping key is used to encrypt a group of session keys for a plurality of sessions.
3. The method of clause 1, further comprising:
   transmitting, over the system bus, one or more new wrapping keys to be used by the crypto-engine to encrypt future session keys.
4. The method of clause 3, wherein a key manager executing on the secure processor determines the times at which to transmit the new wrapping keys and generates the new wrapping keys to be transmitted.
5. The method of clause 1, further comprising:
   receiving an initial wrapping key agreed to according to a communication protocol;
   encrypting the wrapping key using the initial wrapping key; and
   transmitting the wrapping key, encrypted using the initial wrapping key, over the system bus to be decrypted by the secure key unwrap engine, wherein the initial wrapping key is to be received without encryption during a boot process of the computing device.
6. The method of clause 1, wherein the software agent is one of a plurality of protocol-specific software agents executing within a central root of trust on the computing device to generate session keys to be used for encryption by one of a plurality of protocol-specific inline crypto-engines.
7. The method of clause 1, further comprising:
   analyzing, using the key unwrap engine, metadata associated with the session key to determine information about the session key, the information indicating at least one of a location to route the session key, an identifier for the session key, or a type of the session key.
8. The method of clause 1, further comprising:
   analyzing, using the key unwrap engine, a status bit for a received key to determine whether a type of the received key is a session key type or a wrapping key type.
9. The method of clause 1, wherein the computing device is a network interface card (NIC) or a graphics card including one or more graphics processing units.
10. A system, comprising:
    a secure processor to generate a session key using a software agent executing on the secure processor, and further to encrypt the session key using a wrapping key generated using the secure processor;
    a system bus to transmit the session key wrapped by the wrapping key;

a key unwrap engine, implemented in hardware on the system, to receive the session key over the system bus and decrypt the session key using the wrapping key; and a crypto engine receive the decrypted session key, wherein the crypto engine is allowed to encrypt session data using the decrypted session key to be transmitted to a second device.

11. The system of clause 10, wherein the wrapping key is used to encrypt a group of session keys for a plurality of sessions.

12. The system of clause 10, wherein the secure process is further to transmit, at a series of times and over the system bus, new wrapping keys to be used by the crypto-engine to encrypt future session keys.

13. The system of clause 10, wherein the software agent is one of a plurality of protocol-specific software agents executing within a central root of trust on the system to generate session keys to be used for encryption by one of a plurality of protocol-specific inline crypto-engines executing on the system.

14. The system of clause 10, wherein the secure processor is further to receive an initial wrapping key and encrypt the wrapping key using the initial wrapping key, the secure processor further to transmit the wrapping key, encrypted using the initial wrapping key, over the system bus to be decrypted by the secure key unwrap engine and transmitted to the crypto-engine, wherein the initial wrapping key is to be received without encryption during a boot process of the computing device.

15. The system of clause 10, wherein the key unwrap engine is further to analyze metadata associated with the session key to determine information about the session key, the information indicating at least one of a location to route the session key, an identifier for the session key, or a type of the session key.

16. A key tunnel including one or more processors for receiving session keys transmitted over a system bus of a computing device, the session keys encrypted within a root of trust on the computing device using a wrapping key generated within the root of trust, the one or more processors of the key tunnel to unwrap the session keys using the wrapping key and transmit the session keys to one or more protocol-specific crypto engines for encrypting session data to be transmitted to one or more remote devices.

17. The key tunnel of clause 16, wherein the one or more processors are further to analyze metadata associated with the session key to determine where to route the session key.

18. The key tunnel of clause 16, wherein the one or more processors are further to analyze a status bit for a received key to determine whether a type of the received key is received key is a session key type or a wrapping key type.

19. The key tunnel of clause 16, wherein the root of trust is to use an initial shared secret to encrypt the wrapping key to be received by the key tunnel, wherein the initial shared secret is one of a plaintext key, an embedded key, a provisioned key shared by two or more fuse blocks, a secret received over a physical private bus, or a secret generated using a specified cryptographic scheme.

20. The key tunnel of clause 16, wherein the key tunnel is comprised in at least one of:
a system for performing simulation operations;
a system for performing simulation operations to test or validate autonomous machine applications;
a system for rendering graphical output;
a system for performing deep learning operations;
a system implemented using an edge device;
a system for generating or presenting virtual reality (VR) content;
a system for generating or presenting augmented reality (AR) content;
a system for generating or presenting mixed reality (MR) content;
a system incorporating one or more Virtual Machines (VMs);
a system implemented at least partially in a data center;
a system for performing hardware testing using simulation;
a system for synthetic data generation;
a collaborative content creation platform for 3D assets; or
a system implemented at least partially using cloud computing resources.

In at least one embodiment, a single semiconductor platform may refer to a sole unitary semiconductor-based integrated circuit or chip. In at least one embodiment, multi-chip modules may be used with increased connectivity which simulate on-chip operation, and make substantial improvements over utilizing a conventional central processing unit ("CPU") and bus implementation. In at least one embodiment, various modules may also be situated separately or in various combinations of semiconductor platforms per desires of user.

In at least one embodiment, referring back to FIG. 10, computer programs in form of machine-readable executable code or computer control logic algorithms are stored in main memory 1004 and/or secondary storage. Computer programs, if executed by one or more processors, enable system 1000 to perform various functions in accordance with at least one embodiment. In at least one embodiment, memory 1004, storage, and/or any other storage are possible examples of computer-readable media. In at least one embodiment, secondary storage may refer to any suitable storage device or system such as a hard disk drive and/or a removable storage drive, representing a floppy disk drive, a magnetic tape drive, a compact disk drive, digital versatile disk ("DVD") drive, recording device, universal serial bus ("USB") flash memory, etc. In at least one embodiment, architecture and/or functionality of various previous figures are implemented in context of CPU 1002, parallel processing system 1012, an integrated circuit capable of at least a portion of capabilities of both CPU 1002, parallel processing system 1012, a chipset (e.g., a group of integrated circuits designed to work and sold as a unit for performing related functions, etc.), and/or any suitable combination of integrated circuit(s).

In at least one embodiment, architecture and/or functionality of various previous figures are implemented in context of a general computer system, a circuit board system, a game console system dedicated for entertainment purposes, an application-specific system, and more. In at least one embodiment, computer system 1000 may take form of a desktop computer, a laptop computer, a tablet computer, servers, supercomputers, a smart-phone (e.g., a wireless, hand-held device), personal digital assistant ("PDA"), a digital camera, a vehicle, a head mounted display, a handheld electronic device, a mobile phone device, a television, workstation, game consoles, embedded system, and/or any other type of logic.

In at least one embodiment, parallel processing system 1012 includes, without limitation, a plurality of parallel processing units ("PPUs") 1014 and associated memories 1016. In at least one embodiment, PPUs 1014 are connected to a host processor or other peripheral devices via an interconnect 1018 and a switch 1020 or multiplexer. In at least one embodiment, parallel processing system 1012 distributes computational tasks across PPUs 1014 which can be parallelizable—for example, as part of distribution of computational tasks across multiple graphics processing unit ("GPU") thread blocks. In at least one embodiment, memory is shared and accessible (e.g., for read and/or write access) across some or all of PPUs 1014, although such shared memory may incur performance penalties relative to use of local memory and registers resident to a PPU 1014. In at least one embodiment, operation of PPUs 1014 is synchronized through use of a command such as _syncthreads( ), wherein all threads in a block (e.g., executed across multiple PPUs 1014) to reach a certain point of execution of code before proceeding.

In at least one embodiment, one or more techniques described herein utilize a oneAPI programming model. In at least one embodiment, a oneAPI programming model refers to a programming model for interacting with various compute accelerator architectures. In at least one embodiment, oneAPI refers to an application programming interface (API) designed to interact with various compute accelerator architectures. In at least one embodiment, a oneAPI programming model utilizes a DPC++ programming language. In at least one embodiment, a DPC++ programming language refers to a high-level language for data parallel programming productivity. In at least one embodiment, a DPC++ programming language is based at least in part on C and/or C++ programming languages. In at least one embodiment, a oneAPI programming model is a programming model such as those developed by Intel Corporation of Santa Clara, CA.

In at least one embodiment, oneAPI and/or oneAPI programming model is utilized to interact with various accelerator, GPU, processor, and/or variations thereof, architectures. In at least one embodiment, oneAPI includes a set of libraries that implement various functionalities. In at least one embodiment, oneAPI includes at least a oneAPI DPC++ library, a oneAPI math kernel library, a oneAPI data analytics library, a oneAPI deep neural network library, a oneAPI collective communications library, a oneAPI threading building blocks library, a oneAPI video processing library, and/or variations thereof.

In at least one embodiment, a oneAPI DPC++ library, also referred to as oneDPL, is a library that implements algorithms and functions to accelerate DPC++ kernel programming. In at least one embodiment, oneDPL implements one or more standard template library (STL) functions. In at least one embodiment, oneDPL implements one or more parallel STL functions. In at least one embodiment, oneDPL provides a set of library classes and functions such as parallel algorithms, iterators, function object classes, range-based API, and/or variations thereof. In at least one embodiment, oneDPL implements one or more classes and/or functions of a C++ standard library. In at least one embodiment, oneDPL implements one or more random number generator functions.

In at least one embodiment, a oneAPI math kernel library, also referred to as oneMKL, is a library that implements various optimized and parallelized routines for various mathematical functions and/or operations. In at least one embodiment, oneMKL implements one or more basic linear algebra subprograms (BLAS) and/or linear algebra package (LAPACK) dense linear algebra routines. In at least one embodiment, oneMKL implements one or more sparse BLAS linear algebra routines. In at least one embodiment, oneMKL implements one or more random number generators (RNGs). In at least one embodiment, oneMKL implements one or more vector mathematics (VM) routines for mathematical operations on vectors. In at least one embodiment, oneMKL implements one or more Fast Fourier Transform (FFT) functions.

In at least one embodiment, a oneAPI data analytics library, also referred to as oneDAL, is a library that implements various data analysis applications and distributed computations. In at least one embodiment, oneDAL implements various algorithms for preprocessing, transformation, analysis, modeling, validation, and decision making for data analytics, in batch, online, and distributed processing modes of computation. In at least one embodiment, oneDAL implements various C++ and/or Java APIs and various connectors to one or more data sources. In at least one embodiment, oneDAL implements DPC++ API extensions to a traditional C++ interface and enables GPU usage for various algorithms.

In at least one embodiment, a oneAPI deep neural network library, also referred to as oneDNN, is a library that implements various deep learning functions. In at least one embodiment, oneDNN implements various neural network, machine learning, and deep learning functions, algorithms, and/or variations thereof.

In at least one embodiment, a oneAPI collective communications library, also referred to as oneCCL, is a library that implements various applications for deep learning and machine learning workloads. In at least one embodiment, oneCCL is built upon lower-level communication middleware, such as message passing interface (MPI) and libfabrics. In at least one embodiment, oneCCL enables a set of deep learning specific optimizations, such as prioritization, persistent operations, out of order executions, and/or variations thereof. In at least one embodiment, oneCCL implements various CPU and GPU functions.

In at least one embodiment, a oneAPI threading building blocks library, also referred to as oneTBB, is a library that implements various parallelized processes for various applications. In at least one embodiment, oneTBB is utilized for task-based, shared parallel programming on a host. In at least one embodiment, oneTBB implements generic parallel algorithms. In at least one embodiment, oneTBB implements concurrent containers. In at least one embodiment, oneTBB implements a scalable memory allocator. In at least one embodiment, oneTBB implements a work-stealing task scheduler. In at least one embodiment, oneTBB implements low-level synchronization primitives. In at least one embodiment, oneTBB is compiler-independent and usable on various processors, such as GPUs, PPUs, CPUs, and/or variations thereof.

In at least one embodiment, a oneAPI video processing library, also referred to as oneVPL, is a library that is utilized for accelerating video processing in one or more applications. In at least one embodiment, oneVPL implements various video decoding, encoding, and processing functions. In at least one embodiment, oneVPL implements various functions for media pipelines on CPUs, GPUs, and other accelerators. In at least one embodiment, oneVPL implements device discovery and selection in media centric and video analytics workloads. In at least one embodiment, oneVPL implements API primitives for zero-copy buffer sharing.

In at least one embodiment, a oneAPI programming model utilizes a DPC++ programming language. In at least one embodiment, a DPC++ programming language is a programming language that includes, without limitation, functionally similar versions of CUDA mechanisms to define device code and distinguish between device code and host code. In at least one embodiment, a DPC++ programming language may include a subset of functionality of a CUDA programming language. In at least one embodiment, one or more CUDA programming model operations are performed using a oneAPI programming model using a DPC++ programming language.

In at least one embodiment, any application programming interface (API) described herein is compiled into one or more instructions, operations, or any other signal by a compiler, interpreter, or other software tool. In at least one embodiment, compilation comprises generating one or more machine-executable instructions, operations, or other signals from source code. In at least one embodiment, an API compiled into one or more instructions, operations, or other signals, when performed, causes one or more processors such as graphics processors 1410 and 1440, graphics cores 1500, parallel processor 1700, processors 1802, processors 2002, or any other logic circuit further described herein to perform one or more computing operations.

It should be noted that, while example embodiments described herein may relate to a CUDA programming model, techniques described herein can be utilized with any suitable programming model, such HIP, oneAPI, and/or variations thereof.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one embodiment, use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items). In at least one embodiment, number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. In at least one embodiment, set of non-transitory computer-readable storage media comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

In at least one embodiment, an arithmetic logic unit is a set of combinational logic circuitry that takes one or more inputs to produce a result. In at least one embodiment, an arithmetic logic unit is used by a processor to implement mathematical operation such as addition, subtraction, or multiplication. In at least one embodiment, an arithmetic logic unit is used to implement logical operations such as logical AND/OR or XOR. In at least one embodiment, an arithmetic logic unit is stateless, and made from physical switching components such as semiconductor transistors arranged to form logical gates. In at least one embodiment, an arithmetic logic unit may operate internally as a stateful logic circuit with an associated clock. In at least one embodiment, an arithmetic logic unit may be constructed as an asynchronous logic circuit with an internal state not maintained in an associated register set. In at least one embodiment, an arithmetic logic unit is used by a processor to combine operands stored in one or more registers of the processor and produce an output that can be stored by the processor in another register or a memory location.

In at least one embodiment, as a result of processing an instruction retrieved by the processor, the processor presents one or more inputs or operands to an arithmetic logic unit, causing the arithmetic logic unit to produce a result based at least in part on an instruction code provided to inputs of the arithmetic logic unit. In at least one embodiment, the instruction codes provided by the processor to the ALU are based at least in part on the instruction executed by the processor. In at least one embodiment combinational logic in the ALU processes the inputs and produces an output which is placed on a bus within the processor. In at least one embodiment, the processor selects a destination register, memory location, output device, or output storage location on the output bus so that clocking the processor causes the results produced by the ALU to be sent to the desired location.

In the scope of this application, the term arithmetic logic unit, or ALU, is used to refer to any computational logic circuit that processes operands to produce a result. For example, in the present document, the term ALU can refer to a floating point unit, a DSP, a tensor core, a shader core, a coprocessor, or a CPU.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. In at least one embodiment, process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or interprocess communication mechanism.

Although descriptions herein set forth example implementations of described techniques, other architectures may be used to implement described functionality, and are intended to be within scope of this disclosure. Furthermore, although specific distributions of responsibilities may be defined above for purposes of description, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A method, comprising:
generating a session key using a software agent executing on a secure processor in a computing device;
encrypting the session key using a wrapping key generated using the secure processor;
transmitting the session key, encrypted using the wrapping key, over a system bus to a secure key unwrap engine implemented in a hardware of the computing device;
decrypting, at the secure key unwrap engine, the session key using the wrapping key; and
delivering the session key, in plaintext, to an inline crypto engine executing on the computing device, wherein the inline crypto engine is allowed to use the session key to encrypt session data to be transmitted to a second device.

2. The method of claim 1, wherein the wrapping key is used to encrypt a group of session keys for a plurality of sessions.

3. The method of claim 1, further comprising:
transmitting, over the system bus, one or more new wrapping keys to be used by the crypto engine to encrypt future session keys.

4. The method of claim 3, wherein a key manager executing on the secure processor determines one or more times at which to transmit the new wrapping keys and generates the new wrapping keys to be transmitted.

5. The method of claim 1, further comprising:
receiving an initial wrapping key agreed to according to a communication protocol;
encrypting the wrapping key using the initial wrapping key; and
transmitting the wrapping key, encrypted using the initial wrapping key, over the system bus to be decrypted by the secure key unwrap engine, wherein the initial wrapping key is to be received without encryption during an early execution process of the computing device.

6. The method of claim 1, wherein the software agent is one of a plurality of protocol-specific software agents executing within a central root of trust on the computing device to generate session keys to be used for encryption by one of a plurality of protocol-specific inline crypto engines.

7. The method of claim 1, further comprising:
analyzing, using the key unwrap engine, metadata associated with the session key to determine information about the session key, the information indicating at least one of a location to route the session key, an identifier for the session key, or a type of the session key.

8. The method of claim 1, further comprising:
analyzing, using the key unwrap engine, a status bit for a received key to determine whether a type of the received key is a session key type or a wrapping key type.

9. The method of claim 1, wherein the computing device is a network interface card (NIC) or a graphics card including one or more graphics processing units.

10. A system, comprising:
a secure processor to generate a session key using a software agent executing on the secure processor, and further to encrypt the session key using a wrapping key generated using the secure processor;
a system bus to transmit the session key wrapped by the wrapping key within hardware on the system;
a key unwrap engine, implemented in the hardware on the system, to receive the session key over the system bus and decrypt the session key using the wrapping key; and
a crypto engine to receive the decrypted session key, wherein the crypto engine is allowed to encrypt session data using the decrypted session key to be transmitted to a second device.

11. The system of claim 10, wherein the wrapping key is used to encrypt a group of session keys for a plurality of sessions.

12. The system of claim 10, wherein the secure process is further to transmit, at a series of times and over the system bus, new wrapping keys to be used by the crypto engine to encrypt future session keys.

13. The system of claim 10, wherein the software agent is one of a plurality of protocol-specific software agents executing within a central root of trust on the system to generate session keys to be used for encryption by one of a plurality of protocol-specific inline crypto engines executing on the system.

14. The system of claim 10, wherein the secure processor is further to receive an initial wrapping key and encrypt the wrapping key using the initial wrapping key, the secure processor further to transmit the wrapping key, encrypted using the initial wrapping key, over the system bus to be decrypted by the key unwrap engine and transmitted to the crypto engine, wherein the initial wrapping key is to be received without encryption during an early execution process of a computing device.

15. The system of claim 10, wherein the key unwrap engine is further to analyze metadata associated with the session key to determine information about the session key, the information indicating at least one of a location to route the session key, an identifier for the session key, or a type of the session key.

16. A key tunnel including one or more processors for receiving session keys transmitted over a system bus of a computing device, the session keys encrypted within a root of trust on the computing device using a wrapping key generated within the root of trust, the one or more processors of the key tunnel to unwrap the session keys within the computing device using the wrapping key and transmit the session keys to one or more protocol-specific crypto engines within the computing device for encrypting session data to be transmitted to one or more remote devices.

17. The key tunnel of claim 16, wherein the one or more processors are further to analyze metadata associated with the session key to determine where to route the session key.

18. The key tunnel of claim 16, wherein the one or more processors are further to analyze a status bit for a received key to determine whether a type of the received key is a session key type or a wrapping key type.

19. The key tunnel of claim 16, wherein the root of trust is to use an initial shared secret to encrypt the wrapping key to be received by the key tunnel, wherein the initial shared secret is one of a plaintext key, an embedded key, a provisioned key shared by two or more fuse blocks, a secret received over a physical private bus, or a secret generated using a specified cryptographic scheme.

20. The key tunnel of claim 16, wherein the key tunnel is comprised in at least one of:
a system for performing simulation operations;
a system for performing simulation operations to test or validate autonomous machine applications;

a system for rendering graphical output;
a system for performing deep learning operations;
a system implemented using an edge device;
a system for generating or presenting virtual reality (VR) content;
a system for generating or presenting augmented reality (AR) content;
a system for generating or presenting mixed reality (MR) content;
a system incorporating one or more Virtual Machines (VMs);
a system implemented at least partially in a data center;
a system for performing hardware testing using simulation;
a system for synthetic data generation;
a collaborative content creation platform for 3D assets; or
a system implemented at least partially using cloud computing resources.

* * * * *